US007623154B2

(12) United States Patent
Yamasaki

(10) Patent No.: US 7,623,154 B2
(45) Date of Patent: Nov. 24, 2009

(54) ELECTRONIC BLURRING CORRECTION APPARATUS

(75) Inventor: Masafumi Yamasaki, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 541 days.

(21) Appl. No.: 11/472,067

(22) Filed: Jun. 21, 2006

(65) Prior Publication Data

US 2007/0003261 A1 Jan. 4, 2007

(30) Foreign Application Priority Data

| Jun. 30, 2005 | (JP) | ............................. 2005-192624 |
| Jul. 29, 2005 | (JP) | ............................. 2005-221760 |
| Aug. 25, 2005 | (JP) | ............................. 2005-244687 |
| Sep. 26, 2005 | (JP) | ............................. 2005-278748 |

(51) Int. Cl.
*H04N 5/228* (2006.01)

(52) U.S. Cl. ............................. 348/208.6; 348/208.12; 348/304

(58) Field of Classification Search ......... 348/294–324, 348/248, 226.1, 221.1, 230.1; 396/52–56
See application file for complete search history.

(56) References Cited

U.S. PATENT DOCUMENTS

| 5,144,449 | A | * | 9/1992 | Ishida et al. ................. 348/302 |
| 5,438,364 | A | * | 8/1995 | Maeshima et al. ........ 348/223.1 |
| 5,517,243 | A | * | 5/1996 | Kudo et al. .................. 348/296 |
| 5,764,611 | A | * | 6/1998 | Watanabe .................... 386/113 |
| 5,835,137 | A | * | 11/1998 | McKeown ............... 348/208.4 |
| 6,219,468 | B1 | * | 4/2001 | Yukawa et al. .............. 382/312 |
| 6,441,851 | B1 | * | 8/2002 | Yonemoto ................... 348/294 |
| 6,507,365 | B1 | * | 1/2003 | Nakamura et al. .......... 348/296 |
| 6,515,703 | B1 | * | 2/2003 | Suzuki et al. ................ 348/317 |
| 6,757,015 | B2 | * | 6/2004 | Inokuma et al. ............. 348/273 |
| 6,778,210 | B1 | * | 8/2004 | Sugahara et al. ......... 348/208.4 |
| 6,903,764 | B2 | * | 6/2005 | Kusaka ..................... 348/208.6 |
| 7,027,087 | B2 | * | 4/2006 | Nozaki et al. ........... 348/231.99 |
| 7,042,507 | B2 | * | 5/2006 | Sato et al. ............... 348/333.11 |
| 7,340,160 | B2 | * | 3/2008 | Kamimura et al. ............ 396/52 |
| 7,432,953 | B2 | * | 10/2008 | Washisu .................. 348/208.5 |

(Continued)

FOREIGN PATENT DOCUMENTS

JP 06-046316 2/1994

(Continued)

*Primary Examiner*—Tuan V Ho
*Assistant Examiner*—Don Nguyen
(74) *Attorney, Agent, or Firm*—Straub & Pokotylo; John C. Pokotylo

(57) ABSTRACT

The present invention provides an electronic blurring correction apparatus, comprising: a solid-state image-capturing device having a plurality of pixels arranged in a matrix form; an angular speed sensor which detects blurring of an optical image formed on the solid-state image-capturing device; and a CPU which computes an optimum exposure time, time-divides this exposure time so that the time-divided exposure time becomes equal to or shorter than limit exposure time which is determined according to the focal distance for a shooting lens and in which blurring does not occur, and causes the solid-state image-capturing device to perform exposure a plurality of times, wherein the solid-state image-capturing device uses a horizontal transfer register and a vertical transfer register provided therein to shift and correct relative blurring among a plurality of images obtained in time-shared shooting, adds up the plurality of images after the blurring is corrected, and thereafter outputs the corrected images.

25 Claims, 30 Drawing Sheets

U.S. PATENT DOCUMENTS

| | | | |
|---|---|---|---|
| 2001/0010554 A1* | 8/2001 | Yoshida | 348/312 |
| 2004/0095472 A1* | 5/2004 | Yoshida et al. | 348/208.12 |
| 2006/0110147 A1* | 5/2006 | Tomita et al. | 396/55 |
| 2006/0132623 A1* | 6/2006 | Nozaki et al. | 348/231.99 |
| 2006/0216008 A1* | 9/2006 | Iwanaga | 396/52 |

FOREIGN PATENT DOCUMENTS

| | | |
|---|---|---|
| JP | 08-148667 | 6/1996 |
| JP | 10-336510 | 12/1998 |
| JP | 2001-086398 | 3/2001 |
| JP | 2002-135659 | 5/2002 |
| JP | 2002-287197 | 10/2002 |
| JP | 2004-056581 | 2/2004 |

* cited by examiner

FIG.17

| EXPOSURE TIME | | F NUMBER | | ISO SENSITIVITY | | BRIGHTNESS | | $\frac{F^2}{T} = 2^{Ev}$ | |
|---|---|---|---|---|---|---|---|---|---|
| T (sec) | Tv | F | Av | S | Sv | B (Cd/ft²) | Bv | $\frac{F^2}{T}$ | Ev |
| 1 | 0 | 0 | 0 | 3 | 0 | 0.32 | 0 | 1 | 0 |
| 1/2 | 1 | 1.4 | 1 | 6 | 1 | 0.64 | 1 | 2 | 1 |
| 1/4 | 2 | 2 | 2 | 12 | 2 | 1.25 | 2 | 4 | 2 |
| 1/8 | 3 | 2.8 | 3 | 25 | 3 | 2.50 | 3 | 8 | 3 |
| 1/15 | 4 | 4 | 4 | 50 | 4 | 5.00 | 4 | 16 | 4 |
| 1/30 | 5 | 5.6 | 5 | 100 | 5 | 10.0 | 5 | 32 | 5 |
| 1/60 | 6 | 8 | 6 | 200 | 6 | 20.0 | 6 | 64 | 6 |
| 1/125 | 7 | 11 | 7 | 400 | 7 | 40.0 | 7 | 128 | 7 |
| 1/250 | 8 | 16 | 8 | 800 | 8 | 80.0 | 8 | 256 | 8 |
| 1/500 | 9 | 22 | 9 | 1,600 | 9 | 160 | 9 | 512 | 9 |
| 1/1,000 | 10 | 32 | 10 | 3,200 | 10 | 320 | 10 | 1,024 | 10 |
| | | | | 6,400 | 11 | 640 | 11 | 2,048 | 11 |
| | | | | 12,500 | 12 | 1,250 | 12 | 4,096 | 12 |
| | | | | | | | | 8,192 | 13 |
| | | | | | | | | 16,384 | 14 |
| | | | | | | | | 32,768 | 15 |
| | | | | | | | | 65,536 | 16 |
| | | | | | | | | 131,072 | 17 |
| | | | | | | | | 262,144 | 18 |
| | | | | | | | | 524,288 | 19 |

ELECTRONIC BLURRING CORRECTION APPARATUS

This application claims benefit of Japanese Application No. 2005-192624 filed in Japan on Jun. 30, 2005, Japanese Application No. 2005-221760 filed in Japan on Jul. 29, 2005, Japanese Application No. 2005-244687 filed in Japan on Aug. 25, 2005, and Japanese Application No. 2005-278748 filed in Japan on Sep. 26, 2005, the contents of which are incorporated by this reference.

BACKGROUND OF THE INVENTION

1. Field of the Invention

The present invention relates to an electronic blurring correction apparatus which electronically corrects blurring of an image formed on a solid-state image-capturing device.

2. Description of the Related Art

Among the image-capturing apparatuses for capturing a static image or dynamic image using a solid-state image-capturing device, there are quite a number of image-capturing apparatuses which can be held in hand to capture an image. In such image-capturing apparatuses, when, for example, the brightness of a subject is low, camera shake occurs easily because the shutter speed is slow. Further, in in-car cameras and the like as well, blurring can occur due to vibration of the vehicle during running.

Various technologies for correcting such blurring are proposed in the prior art, and several typical examples of those technologies are described hereinafter.

(1) Electronic blurring correction (Japanese Patent Application Laid-Open No. H6-46316 and the like)

In electronic blurring correction, an effective pixel region is made considerably smaller than the largest pixel region capable of capturing images by using an image-capturing device. When shooting using a digital camera equipped with an electronic blurring correction function, a shot image is temporarily recorded in a buffer memory first instead of being recorded immediately in a memory card. The digital camera shoots the next image immediately without pausing for a time interval. As with the first shot image, this second shot image is also recorded in the buffer memory first instead of being recorded immediately in the memory card. At this moment, if the position of the subject in the second shot image is misaligned (blurred) with the subject in the first shot image, the digital camera compares the first image with the second image, shifts the data region to be used so that the subject is fit in the screen in the same picture composition, and makes thus obtained region an effective pixel region in the second image. By using such a technology, image data can be recorded so that misalignment of the position of the subject is not caused between the images (i.e. blurring is not caused between the images).

(2) Optical blurring correction (Japanese Patent Application Laid-Open No. H10-336510 and the like)

The mainstream technology in optical blurring correction is a system in which when a vibrating gyroscope senses a movement of the camera, a part of the lens is moved in a direction of canceling blurring of a position where light reaches. By using such a technology, even when blurring might occur by a movement of the camera, the position of light reaching the image-capturing device first after the shutter is opened, and the position of light reaching the image-capturing device immediately before the shutter is closed can be made the same position to prevent blurring.

(3) Sensor shift blurring correction (Japanese Patent Application Laid-Open No. 2004-56581)

Sensor shift blurring correction is a technology for correcting blurring by moving an image-capturing device by the amount of blurring of the position where light reaches on an image capturing area, when a movement of the camera is sensed by a vibrating gyroscope. This technology has an advantage that blurring correction can be performed without basically causing deterioration of an image since part of the lens is not moved. This technology has a further advantage that blurring correction can be performed even when using a conventional interchangeable lens in which the blurring correction technology is not considered, since this technology can be applied in the camera main body of a camera with interchangeable lenses.

(4) Japanese Patent Application Laid-Open No. 2001-86398

In the image-capturing apparatus described in this patent application, a plurality of images, which are captured at exposure time intervals in which blurring does not occur, are read from an image-capturing device and stored in a buffer memory, and after image blurring (misalignment of the image positions) among the plurality of images stored in the buffer memory are corrected, the corrected images are added up to generate an image with no blurring. This technology is to perform electronic blurring correction and thus has an advantage that a complex mechanical mechanism is not required.

Incidentally, Japanese Patent Application Laid-Open No. H8-148667 describes a photoconductive film-stacked type solid-state image-capturing device. In the photoconductive film-stacked type CCD using such a technology, a photoconductive film for accumulating photoelectrically converted charges or converted charges is stacked on a CCD which performs horizontal scanning and vertical scanning, and a transparent electrode is further stacked on this photoconductive film.

However, the electronic blurring correction technology described above is a technology for preventing blurring of the composition or the position of a subject in a successive plurality of image data items, and is not a technology for correcting blurring which occurs only in the captured image. Specifically, even if blurring occurs in each image due to, for example, long exposure time, this technology cannot prevent such blurring, and thus cannot be effectively applied directly to blurring correction of a static image.

On the other hand, although optical blurring correction described above can be applied to blurring correction of a static image, the design is extremely complicated and the costs are high. Moreover, although blurring can be corrected, chromatic aberration, for example, increases to a certain degree, whereby the occurrence of deterioration on the optical performance is observed in viewing closely. Furthermore, unlike the electronic blurring correction technology, it is necessary to incorporate a mechanism for moving the lens, thus it is difficult to achieve reduction of the size of the digital camera or the like incorporated with such a mechanism. In addition, when applying this technology to, for example, a camera with interchangeable lenses, at least a part of the blurring correction mechanism needs to be incorporated in the lens side, thus the conventional interchangeable lens which does not respond to the blurring correction mechanism cannot perform blurring correction.

Sensor shift blurring correction described above is to drive the image-capturing device mechanistically, thus, as with the abovementioned optical blurring correction, it is difficult to achieve reduction of the size of the digital camera or the like incorporated with such a mechanism. Furthermore, if the image-capturing device is large, the amount of movement of the lens is also large, it is inevitable that the size of the mechanism increases. In addition, although it is important to move the image-capturing device only on an image-capturing plane surface which is perpendicular to the optical axis of a lens, it is difficult to prevent the occurrence of backlash, tilt of the image-capturing device with respect to the optical axis, and rotation of the image-capturing device around the optical axis.

Moreover, in the technology described in Japanese Patent Application Laid-Open No. 2001-86398 described above, readout of image data from the image-capturing device needs to be performed a plurality of times in order to obtain image data of one image. The more the number of pixels constituting the image-capturing device, the longer the time required for such readout from the image-capturing device. To cite a specific example, when reading out a pixel signal from an image-capturing device with 6 million pixels in a period of 30 [MHz], it requires 200 [ms] to only read out the signals of all pixels once. Therefore, when performing readout a plurality of times, time which is the integral multiple of 200 [ms] (or more) is required. On the other hand, for example, in a 35 mm film camera, if the focal length of a lens is f [mm], the maximum exposure time for roughly suppressing the occurrence of blurring is 1/f [seconds], which is empirically known. For example, when using a standard 50 [mm] shooting lens, the maximum exposure time is 20 [ms]. However, even 200 [ms] taken for reading out the image signals once from the image-capturing device is extremely long compared to the maxim exposure time of 20 [ms], thus reading out the signals a plurality of times takes considerably a long time. For this reason, it is considered that the technology described in this patent application is practical only in the limited conditions such as a small number of pixels of the image-capturing device and the long maximum exposure time for roughly suppressing the occurrence of blurring (for example, the short focal length of the shooting lens).

Therefore, it is desired to provide an electronic blurring correction apparatus capable of performing blurring correction in response to a broad range of shutter speeds, and a solid-state image-capturing device capable of adding up, at high speed, a plurality of images obtained at different times, without requiring a mechanical mechanism.

SUMMARY OF THE INVENTION

An object of the present invention is to provide an electronic blurring correction apparatus capable of performing blurring correction in response to a broad range of shutter speeds, without requiring a mechanical mechanism.

In brief, the present invention is an electronic blurring correction apparatus for correcting blurring of an image formed on an image-capturing area of a solid-state image-capturing device having a plurality of pixels arranged in a matrix form, to produce an image after blurring correction, the electronic blurring correction apparatus comprising: an image-capturing optical system for forming an image on the image-capturing area of the solid-state image-capturing device; a blurring detection portion which detects blurring of the image; an exposure amount control portion which controls the exposure amount of the solid-state image-capturing device; an image-capturing portion which captures a plurality of images with a predetermined exposure amount by means of the solid-state image-capturing device on the basis of control performed by the exposure amount control portion; a first transfer register which stores a first image captured by the image-capturing portion and transfers the first image in a first direction; a second transfer register which stores a second image captured at different time than the first image and transfers the second image in a second direction perpendicular to the first direction; an addition portion which adds up the first image and the second image after relatively shifting the first image and the second image in the first transfer register and the second transfer register respectively, and stores the added images in the first transfer register or the second transfer register; and a readout portion which reads out charges of pixels added up by the addition portion, from the solid-state image-capturing device.

The above and other objects, features and advantages of the invention will become more clearly understood from the following description referring to the accompanying drawings.

BRIEF DESCRIPTION OF THE DRAWINGS

FIG. 17 is a chart showing a reference value of each element related to exposure and a reference value of an exponent of the exposure, in Embodiment 1;

DETAILED DESCRIPTION OF THE PREFERRED EMBODIMENTS

Embodiments of the present invention are described hereinafter with reference to the drawings.

Before explaining the embodiments in detail, first the principle for performing blurring correction is explained simply.

For example, suppose that optimum exposure time (total exposure time) obtained by performing optical measurement of a subject is $1/15$ seconds. Also, suppose that blurring occurs in such an exposure time (shutter speed) of $1/15$ seconds. On the other hand, suppose that blurring does not occur or that blurring which may occur can substantively be ignored if the exposure time (shutter speed) is $1/125$ seconds. In such a case, the abovementioned total exposure time of $1/15$ seconds is time-shared by the exposure time of $1/125$ seconds, and shooting is performed 8 times as a result of thus obtained time-shared exposure. 8 images which are obtained by carrying out this time-shared shooting are added up, whereby a single image is obtained by an optimum exposure time of $1/15$ seconds. However, blurring is not corrected simply by adding up the images shot in the time-shared exposure of $1/125$ seconds, thus blurring of each of the images shot in the time-shared exposure is corrected, and then added up. At this moment, if a time interval between the time-shared exposures is long, continuous shooting cannot be performed in high speed exposure time during which blurring does not occur. Therefore, in the embodiments described hereinafter, in a solid-state image-capturing device blurring is corrected at high speeds and images obtained after correction are added up.

Specifically, first of all, an image shot by time-shared exposure is stored in a second transfer register provided in an image-capturing device, and an image shot by the next time-shared exposure is stored in a first transfer register provided in the image-capturing device. Then, on the basis of blurring amount detected by a blurring detection portion, either one of the first transfer register or second transfer register is shifted in an X direction, and the other one is shifted in a Y direction. Thereafter, both of the images are added up and then stored in the second transfer register. Subsequently, an image shot by the next time-shared exposure is stored in the first transfer register, and the above-described correction and addition are repeated until the total exposure amount becomes optimum.

The embodiments of the present invention are described hereinafter with reference to the drawings.

Embodiment 1

Figure 1:
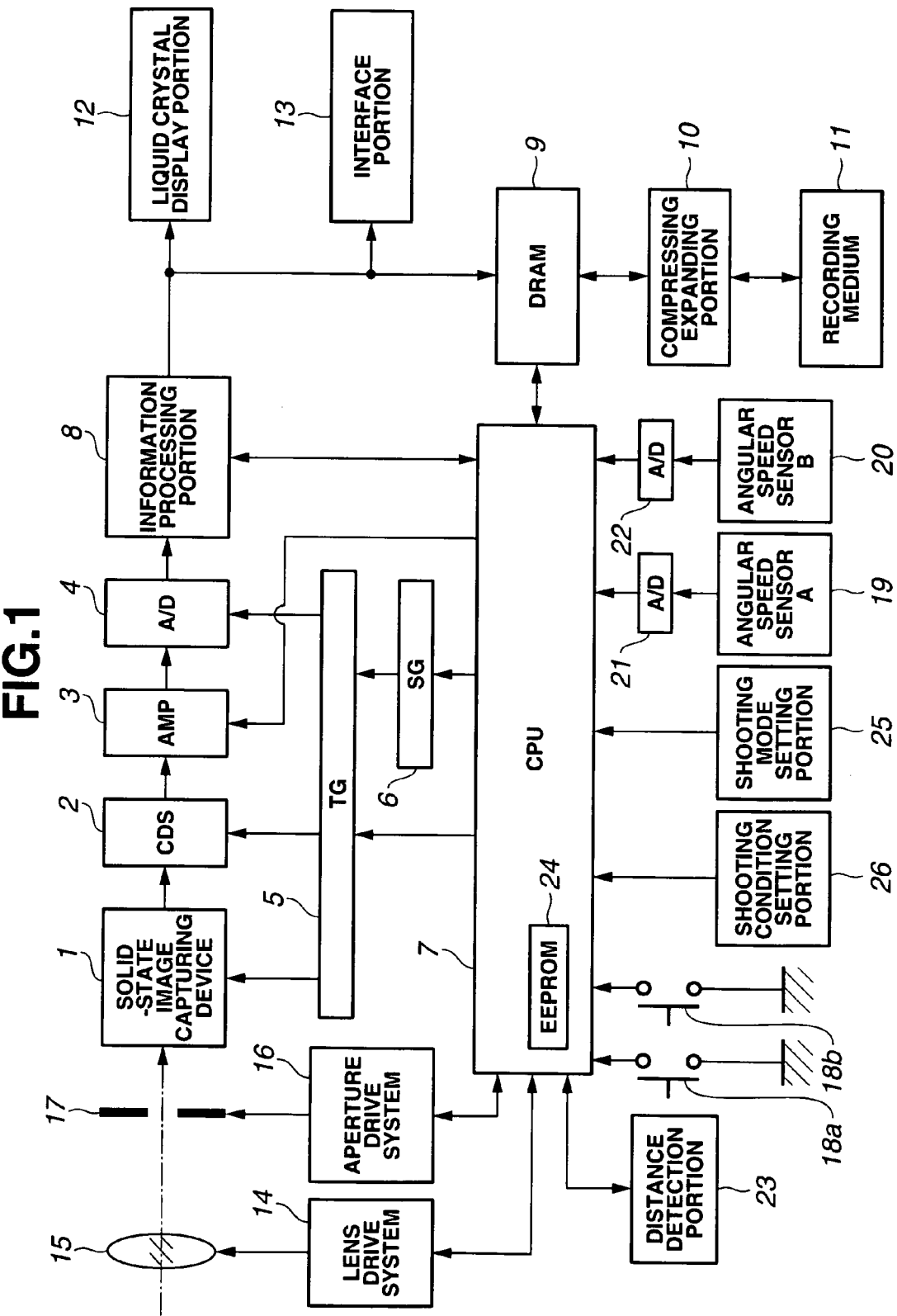
FIG. 1 is a block diagram showing mainly an electronic configuration of a digital camera in Embodiment 1 of the present invention.

FIG. 1 through FIG. 24 show Embodiment 1, in which FIG. 1 is a block diagram showing mainly an electronic configuration of a digital camera. In the present embodiment an electronic blurring correction apparatus is applied to the digital camera.

This digital camera comprises a solid-state image-capturing device (abbreviated to "image-capturing device" accordingly, hereinafter) 1, a correlated double sampling (CDS) circuit 2, a gain control amplifier (AMP) 3, an A/D converter 4, a timing generator (TG) 5, a signal generator (SG) 6, a CPU 7, an information processing portion 8, a DRAM 9, a compression/expansion portion 10, a recording medium 11, a liquid crystal display portion 12, an interface portion 13, a lens drive system 14, a shooting lens 15, an aperture driving system 16, an aperture 17, a first release switch 18a, a second release switch 18b, an angular speed sensor (angular speed sensor A) 19, an angular speed sensor (angular speed sensor B) 20, an A/D converter 21, and A/D converter 22, a distance detection portion 23, a EEPROM 24 incorporated in the CPU 7, a shooting mode setting portion 25, and a shooting condition setting portion 26.

The shooting lens 25 is an image-capturing optical system for forming an image of a subject on an image-capturing area of the image-capturing device 1.

Figure 2:
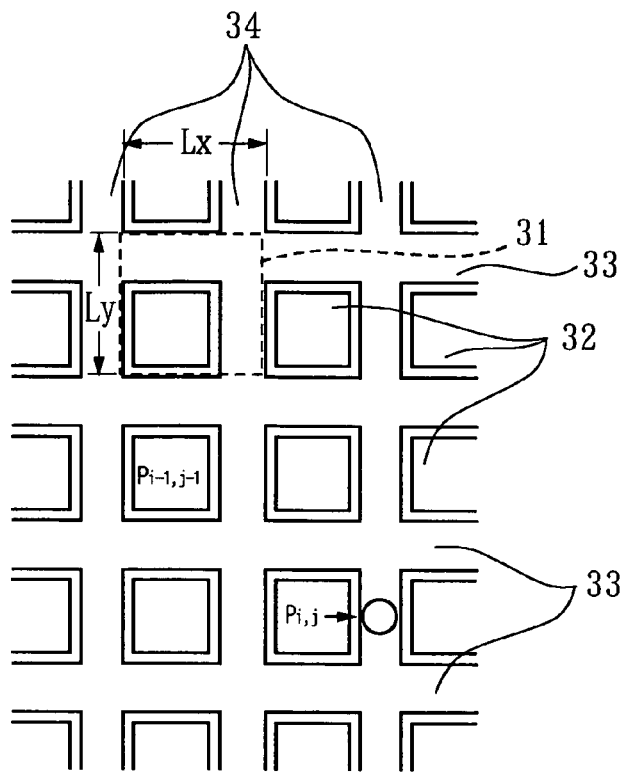
FIG. 2 is a figure showing a state in which a charge accumulated in a photodiode is transferred to a vertical transfer CCD as a first pixel charge, in Embodiment 1.

The aperture 17 is an optical aperture for adjusting the amount of light by regulating a range of passage of an image-forming light beam from the shooting lens 15, and also is a part of the shooting optical system The image-capturing device 1 photoelectrically converts the image of the subject formed by the shooting lens 15 via the aperture 17, and outputs the converted image as an electric signal. As shown in FIG. 2 and the like, the image-capturing device 1 comprises a photodiode 32 which photoelectrically converts and accumulates an image, a horizontal transfer CCD 33 for transferring, in a horizontal direction, a charge read out from the photodiode 32, and a vertical transfer CCD 34 for transferring, in a vertical direction, a charge read out from the photodiode 32. The pixel charge which is photoelectrically converted and accumulated in the photodiode 32 is read by either the horizontal transfer CCD 33 or the vertical transfer CCD 34. Further, charges which had been added so far are stored in the other one of the horizontal transfer CCD 33 or the vertical transfer CCD 34. A pixel charge which is newly read is transferred just by the amount of correcting the blurring amount in the reading transfer CCD in the transfer CCD direction. Similarly, the charges which had been added so far are transferred just by the amount of correcting the blurring amount in the transfer CCD in which they are stored in the transfer CCD direction. After such shifting for correcting the blurring amount is carried out, the pixel charge which is newly read and the charges which had been added so far are added up in the intersection of the horizontal transfer CCD 33 and the vertical transfer CCD 34, whereby a new added charge in which relative blurring correction is performed is generated. Specifically, the image-capturing device 1 is an image addition portion. The final added charge thus obtained in the above manner is a charge constituting an image with corrected blurring. A detailed configuration or operation of such image-capturing device 1 is described hereinafter.

The TG 5 supplies a transfer pulse for driving the image-capturing device 1 and constitutes a shooting control portion.

The CDS 2 is driven in accordance with a sample-and-hold pulse supplied from the TG 5, and eliminates reset noise by performing a correlated double sampling process or other process on an image signal which is output from the image-capturing device 1.

The SG 6 generates a synchronizing signal and outputs it to the TG 5 on the basis of control performed by the CPU 7, and constitutes the shooting control portion.

The gain control amplifier (AMP) 3 amplifies an analog signal which is output from the CDS 2. The gain of the gain control amplifier (AMP) 3 is set to a gain corresponding to an ISO (International Organization for Standardization) sensitivity Sv, thus the gain control amplifier (AMP) 3 is an ISO sensitivity change portion.

The A/D converter 4 is an analog/digital conversion portion which converts an analog signal output from the gain control amplifier (AMP) 3 to a digital signal in accordance with a signal supplied from the TG 5.

The information processing portion 8 processes a pixel signal which is output from the A/D converter 4, and generates image data. The information processing portion 8 comprises an effective region extraction portion having a function of extracting an image data item in which blurring is corrected optimally, from among image data items which are output from the image-capturing device 1.

The DRAM 9 temporarily stores the image data output from the information processing portion 8, and further temporarily stores image data which is obtained by expanding compressed image data, which is read out from the recording medium 11, by means of the compression/expansion portion 10.

The compression/expansion portion 10 compresses the image data stored in the DRAM 9 and expands the compressed image data which is read out from the recording medium 11.

The recording medium 11 is a recording portion which records the image data compressed by the compression/expansion portion 10, and serves as, for example, a nonvolatile recording medium.

The liquid crystal display portion 12 displays the image data output from the information processing portion 8 or the expanded image data output from the DRAM 9. The liquid crystal display portion 12 also serves as a display portion for performing various warning display processes and the like as described hereinafter.

The interface portion 13 is an interface having a terminal for communicating data with an external apparatus such as a monitor and a personal computer. The image data and the like supplied from the information processing portion 8 or the DRAM 9 can be output to the external apparatus via the interface portion 13, or, according to the circumstances, the image data can be retrieved into an apparatus from the external apparatus.

The lens drive system 14 receives a command from the CPU 7 on the basis of a subject distance detected by the distance detection portion 23, and thereby drives the shooting lens 15 to a focused position. Such a process is known as so-called auto-focus control. It should be noted here that auto-focus control is performed on the basis of a output from the distance detection portion 23, but using the CPU 7 a high-frequency component may be extracted into a brightness component of the image data of one frame (one screen) stored in the DRAM 9, by means of a high-pass filter or the like, to calculate an AF evaluation value corresponding to an outline component or the like of the high-frequency region side by calculating a cumulative added value of the extracted high-frequency component, and to perform focal point detection on the basis of the AF evaluation value.

The aperture drive system 16 is an aperture control portion which, after the CPU 7 as a photometry portion performs exposure computation on the basis of the image data stored in the DRAM 9, receives a command based on the result from the CPU 7, and thereby drives the aperture 17 to change an opening diameter. Such a process is known as so-called AE (automatic exposure) control.

The angular speed sensor 19 is for detecting angular speed when the digital camera is rotated around an X-axis direction as the center of rotation, the X-axis direction being the right-side direction of a horizontal direction when viewing the digital camera from the subject side (see FIG. 19), and serves as a blurring detection portion.

On the other hand, the angular speed sensor 20 is for detecting angular speed when the digital camera is rotated around a Y-axis direction as the center of rotation, the Y-axis direction being an upward direction of a vertical direction of the digital camera (see FIG. 19), and serves as a blurring detection portion.

The A/D converter 21 is to convert an analog signal representing the angular speed detected by the angular speed sensor 19 to a digital signal at a predetermined time interval (sampling interval).

Similarly, the A/D converter 22 is to convert an analog signal representing the angular speed detected by the angular speed sensor 20 to a digital signal at a predetermined time interval (sampling interval).

The CPU 7 performs a time integration process on the digital signal obtained by conversion of the A/D converter 21. This time-integrated digital signal is equivalent to the amount of rotation of the digital camera when rotated around the abovementioned X-axis as the center of rotation. Moreover, whether the rotation direction around the X-axis is the right-hand direction or left-hand direction is determined by whether the analog output signal of the angular speed sensor 19 is positive or negative.

Similarly, the CPU 7 performs a time integration process on the digital signal obtained by conversion of the A/D converter 22. This time-integrated digital signal is equivalent to the amount of rotation of the digital camera when rotated around the abovementioned Y-axis as the center of rotation. Moreover, whether the rotation direction around the Y-axis is the right-hand direction or left-hand direction is determined by whether the analog output signal of the angular speed sensor 20 is positive or negative.

The first release switch 18a is the first stage of the release switch which is constituted by automatic reset type double switch for inputting a command for an image-capturing operation. When the release switch is pressed to turn on the first release switch 18a, a range operation or photometric operation is carried out.

The second release switch 18b is the second stage of the release switch which is constituted by the automatic reset type double switch for inputting a command for an image-capturing operation. When the release switch is further pressed to turn on the second release switch 18b, the image-capturing operation is performed by the image-capturing device 1, whereby the image data described above is generated, compressed, and then recorded in the recording medium 11.

The distance detection portion 23 is for detecting a distance to the subject, and a known configuration can be employed accordingly.

The shooting mode setting portion 25 is for selecting any of a shutter priority shooting mode, an aperture priority shooting mode, and a program shooting mode.

The shooting condition setting portion 26 is for setting various shooting conditions such as the shutter speed (exposure time), aperture value, ISO sensitivity and the like.

The CPU 7 incorporates the EEPROM 24 as a nonvolatile memory for storing the relationship between an exposure value Ev and a Tv (exposure time APEX value) and Av (aperture APEX value) for optimally performing exposure control, as a program diagram. This EEPROM 24 can also store other information required in the digital camera accordingly.

A signal from the first release switch 18a, a signal from the second release switch 18b, a signal from the angular speed sensor 19 via the A/D converter 21, a signal from the angular speed sensor 20 via the A/D converter 22, a signal from the shooting mode setting portion 25, and a signal from the shooting condition setting portion 26 are input to the CPU 7. The CPU 7 outputs a command to the TG 5 and the SG 6.

Furthermore, the CPU 7 is reciprocally connected to the information processing portion 8, the DRAM 9, the lens drive system 14, the aperture drive system 16, and the distance detection portion 23, and serves as a control portion for controlling the entire digital camera having these components.

Specifically, the CPU 7 performs auto-focus control and AE control as described above, and also performs switching of the drive mode of the image-capturing device 1 on the basis of signals instructing to retrieve static images from the first release switch 18a and the second release switch 18b. Moreover, the CPU 7 further performs control for changing the opening of the aperture 17 or exposure time control of the image-capturing device 1. The CPU 7 then sets the shooting mode of the digital camera on the basis of an input from the shooting mode setting portion 25, and sets the shooting condition related to the digital camera, on the basis of an input from the shooting condition setting portion 26. In addition, the CPU 7 also performs blurring amount computation and the like on the basis of outputs from the angular speed sensor 19, 20. Therefore, the CPU 7 serves as a blurring detection portion, an exposure amount control portion, an aperture control portion, a recording portion, a photometry portion, an exposure information computation portion, a first exposure time generation portion, a second exposure time generation portion, an exposure time control portion, an aperture value setting portion, an accumulated charge amount control portion, and a shooting control portion.

Figure 3:
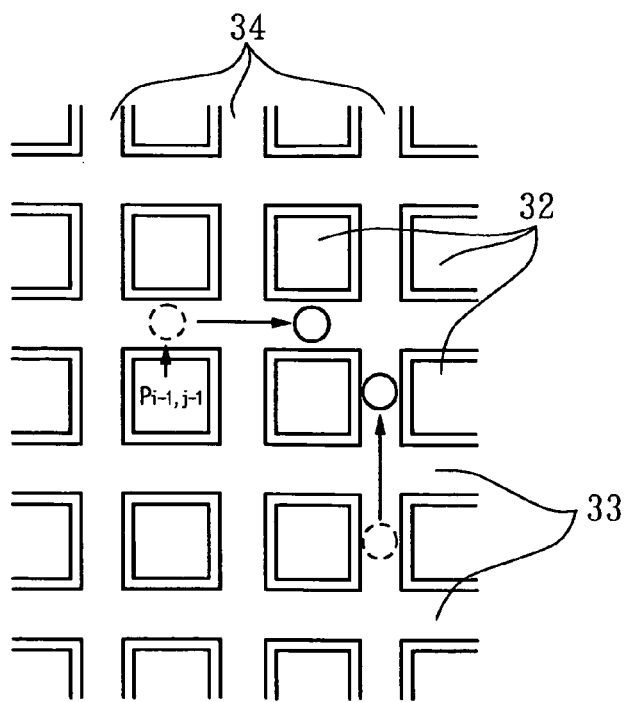
FIG. 3 is a figure showing a state in which a charge accumulated in the photodiode is transferred to a horizontal transfer CCD as a second pixel charge and is further transferred in a horizontal direction after the first pixel charge is read out, and the first pixel charge is transferred in a vertical direction, in Embodiment 1.
Figure 4:
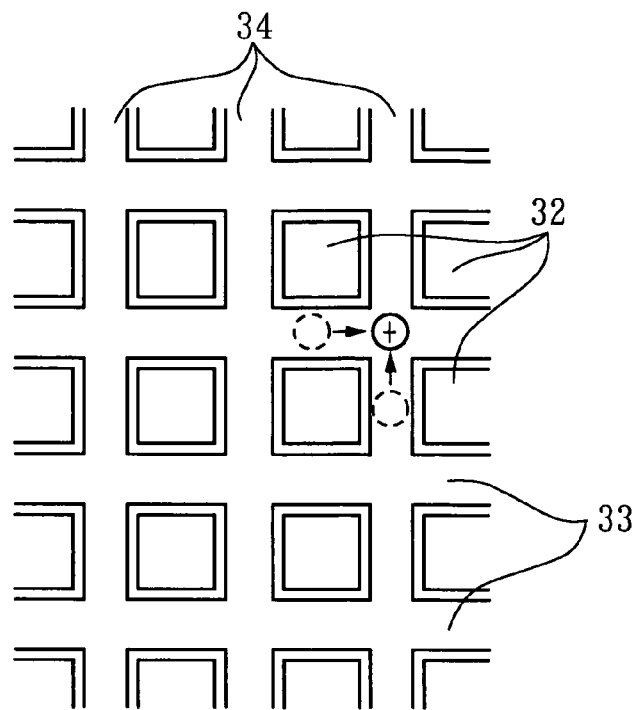
FIG. 4 is a figure showing a state in which the first pixel charge and the second pixel charge are added up in Embodiment 1.
Figure 5:
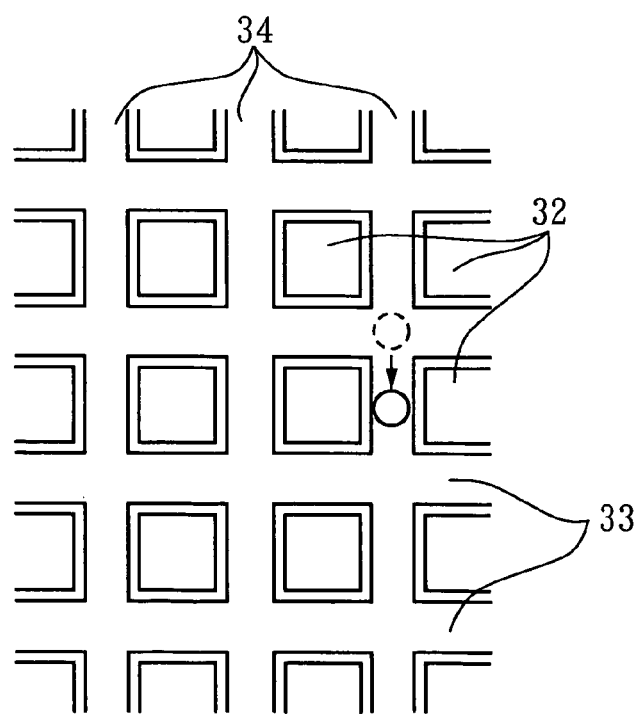
FIG. 5 is a figure showing a state in which the added charges are withdrawn to a charge holding portion of the vertical transfer CCD in the same pixel, in Embodiment 1.

Next, an operation of the image-capturing device 1 is described with reference to FIG. 2 through FIG. 5. FIG. 2 is a figure showing a state in which a charge accumulated in the photodiode is transferred to the vertical transfer CCD as a first pixel charge, FIG. 3 is a figure showing a state in which a charge accumulated in the photodiode is transferred to the horizontal transfer CCD as a second pixel charge and is further transferred in a horizontal direction after the first pixel charge is read out, and the first pixel charge is transferred in a vertical direction, FIG. 4 is a figure showing a state in which the first pixel charge and the second pixel charge are added up, and FIG. 5 is a figure showing a state in which the added charges are withdrawn to a charge holding portion of the vertical transfer CCD in the same pixel.

In the image-capturing device 1 a plurality of photodiodes 32 generating charges in response to a light beam from a subject are arranged in a matrix form, and these photodiodes 32 arranged in a matrix form constitute a photoelectric conversion portion.

Furthermore, the image-capturing device 1 has the horizontal transfer CCD 33 which is a horizontal transfer register disposed in the form of a line so as to be adjacent to each line of the photodiode 32 of the photoelectric conversion portion, and serves as a blurring correction portion and an addition portion. The horizontal transfer CCD 33 stores a first image obtained by reading a charge generated in the photodiode 32 and transfers the first image in the horizontal direction.

Moreover, the image-capturing device 1 has the vertical transfer CCD 34 which is a vertical transfer register disposed in the form of a column so as to be adjacent to each column of the photodiode 32 of the photoelectric conversion portion, and serves as a blurring correction portion and an addition portion. The vertical transfer CCD 34 stores a second image related to an added charge obtained by adding charges which are obtained at times before the first image is obtained, and transfers this second image in the vertical direction.

An electrode portion, which is disposed on the intersection of the horizontal transfer CCD 33 and the vertical transfer CCD 34 (electrodes $\phi V0$, $\phi H0$ shown in FIG. 6), functions as an addition portion for performing analog addition of the first image and the second image.

It should be noted here that the plurality of photodiodes 32 are arranged in a matrix form in a longitudinal direction and a cross wise direction perpendicular to the longitudinal direction, but the arrangement is not limited to this arrangement as long as a substantial matrix shape is formed. For example, the photodiodes 32 may be arranged in one direction and other direction which diagonally intersects with the one direction, to form a matrix shape. At this moment, the horizontal transfer CCD 33 and the vertical transfer CCD 34 may be disposed in directions so that they intersect with each other diagonally. Furthermore, the shape of each photodiode 32 is not limited to a square or rectangular shape, thus various shapes such as a parallelogram shape, triangular shape, hexagonal shape, and the like are possible.

One pixel 31 in the image-capturing device 1 comprises one photodiode 32, a part of the horizontal transfer CCD 33 and a part of the vertical transfer CCD 34 which are adjacent to this photodiode 32. It should be noted that the structure of a transfer electrode of this image-capturing device 1 is described hereinafter. Therefore, an electrode contained in this one pixel of the image-capturing device 1 is also described hereinafter. Moreover, regarding the size of the pixel 31, the length in the horizontal direction (cross wise direction) is Lx, and the length in the vertical direction (longitudinal direction) is Ly.

Operations of the image-capturing device 1 with such a configuration are schematically described.

Hereinafter, a photodiode disposed on an upper left corner of the image-capturing device 1 is denoted as P1, 1, and a photodiode disposed on the $i^{th}$ (i is an integer of 1 or more) position to the right in the horizontal section and the $j^{th}$ (j is an integer of 1 or more) position toward the lower side in the vertical section is denoted as Pi, j.

FIG. 2 shows that a charge of the photodiode Pi, j (a first pixel charge), which is photoelectrically converted and accumulated (shown by a circle mark in the figure), is first shifted (read out) to the vertical transfer CCD 34 adjacent to the photodiode Pi, j. It should be noted that FIG. 2 shows only the first pixel charge related to the photodiode Pi, j, but charges of all other photodiodes, which are photoelectrically converted and accumulated for the same amount of time, are similarly shifted to the vertical transfer CCD 34 simultaneously.

FIG. 3 shows that a charge of the photodiode Pi-1, j-1 (a second pixel charge), which is photoelectrically converted and accumulated immediately after the first pixel charge, is shifted (read out) first to the horizontal transfer CCD 33 adjacent to the photodiode Pi-1, j-1. It should be noted that FIG. 3 shows only the second pixel charge related to the photodiode Pi-1, j-1, but charges of all other photodiodes, which are photoelectrically converted and accumulated for the same amount of time, are similarly shifted to the horizontal transfer CCD 33 simultaneously. Here, suppose that light from the subject, which reaches the photodiode Pi, j at the time of accumulation of the first pixel charge, is moved, at the time of accumulation of the second pixel charge, to a position for reaching the photodiode Pi-1, j-1 due to camera shake. This change of the position that light reaches is discovered for the first time when accumulation of the second pixel charge is ended. Therefore, in the state shown in FIG. 2, the first pixel charge is not yet transferred but is only held (stored) in the vertical transfer CCD 34. However, after the second pixel charge is read out, the change of the position that the light reaches is discovered by outputs of the angular speed sensor 19, 20, thus the positional relationship between the first pixel charge and the second pixel charge related to the same subject light can be found, and, in order to perform addition as described hereinafter, the both pixel charges are transferred to adjacent positions (positions inside the same pixel 31). Specifically, FIG. 3 shows an example in which the second pixel charge is transferred, on the horizontal transfer CCD 33, by the amount of one pixel toward the right on the paper, while the first pixel charge is transferred, on the vertical transfer CCD 34, by the amount of one pixel upward on the paper. The transfer of pixel charges by the amount of one or more pixels by the horizontal transfer CCD 33, and the transfer of pixel charges by the amount of one or more pixels by the vertical transfer CCD 34 cannot be performed simultaneously in the configuration shown in FIG. 6, which is described hereinafter (of course, a configuration may be made so that simultaneous transfer of the pixel charges can be performed (for example, the horizontal transfer CCD 33 and the vertical transfer CCD 34 may be provided independently on different positions in the direction of the thickness of the image-capturing device 1, and the addition portion may be further provided independently)), thus either one of the pixel charges is transferred first, and thereafter the other pixel charge is transferred. It should be noted that transfer of the first pixel charge and transfer of the second pixel charge are performed in the same manner as described above in which pixel charges for the all photodiodes are transferred. In order to perform the transfer by the horizontal transfer CCD 33 and the transfer by the vertical transfer CCD 34, arrangement of the transfer electrodes needs to be contrived so that the charge inside the horizontal transfer CCD 33 and the charge inside the vertical transfer CCD 34 do not interact with each other at the intersection of the both transfer CCDs. This arrangement is described hereinafter.

FIG. 4 shows a state in which the first pixel charge and the second pixel charge are shifted to the intersection of the horizontal transfer CCD 33 and the vertical transfer CCD 34 and added up in the intersection (addition is indicated with "+" in FIG. 4). It goes without saying that this addition is performed on the first pixel charge related to the all photodiodes and a second added charge related to the all photodiodes.

Accordingly, after the first image (the image configured with all first pixel charges) and the second image shot continuously immediately after the first image (the image configured with all second pixel charges) are shifted by the amount of blurring, in other words, after blurring is corrected, the first image and the second image are combined.

It should be noted that when the third and the subsequent time-share image is newly read out, an image equivalent to the first image is an added image obtained by adding the previous time-shared images (an image obtained by sequentially correcting and adding the image between the first time-shared image and a time-shared image immediately before the latest time-shared image), thus, by performing the operation shown in FIG. 4, the relative blurring amount between a new time-shared image (an image configured with all new pixel charges) and the added image is corrected, and thereafter the new image and the added image are combined.

FIG. 5 shows a state in which the pixel charges which are added in the intersection of the horizontal transfer CCD 33 and the vertical transfer CCD 34 are transferred (withdrawn) to a charge holding portion of the vertical transfer CCD 34, for example, in the same pixel. The intersection is used in both horizontal transfer and vertical transfer, thus if the added charges remain in the intersection, addition to a pixel charge which is read out subsequently cannot be performed.

Therefore, here, charges after addition are withdrawn once to the charge holding portion of the vertical transfer CCD 34. Accordingly, by allowing the horizontal transfer CCD 33 to read the next pixel charge, addition of pixels can be performed in the same manner described above.

It should be noted here that the charges after addition are transferred (withdrawn) to the charge holding portion of the vertical transfer CCD 34 in the same pixel but may be transferred (withdrawn) to a charge holding portion of the horizontal transfer CCD 33 in the same pixel instead. At this moment, the next pixel charge is read out by the vertical transfer CCD 34. Moreover, pixel charges after addition are not necessarily withdrawn in the same pixel.

Therefore, not only the examples shown in FIG. 2 through FIG. 5, but also other examples are possible: the added charge may be stored in either one of the storage portions of the horizontal transfer CCD 33 and the vertical transfer CCD 34, and the new pixel charge may be read and stored by the other one of the storage portions of the horizontal transfer CCD 33 and the vertical transfer CCD 34.

As described above, the following sequence is repeated: shifting of an image to the horizontal transfer CCD→transfer of charges for relative blurring correction→addition of charges→withdrawing the added charge from the intersection of the horizontal transfer CCD and the vertical transfer CCD. However, regarding the time-shared image obtained by the first time-shared exposure of a plurality of time-shared exposures, it is sufficient to execute the same sequence by taking the blurring amount as 0 and the added value of the charge of the vertical transfer CCD as 0.

It should be noted that although FIG. 2 through FIG. 5 show examples in which a new time-shared image is shifted by the amount of one pixel toward the left and one pixel upward with respect to the added image, generally the new time-shared image is moved in the horizontal direction and the vertical direction by the appropriate number of pixels corresponding to the shifted amount. Explanation in this regard is provided hereinafter with reference to FIG. 13 through FIG. 22 and the like.

Figure 6:
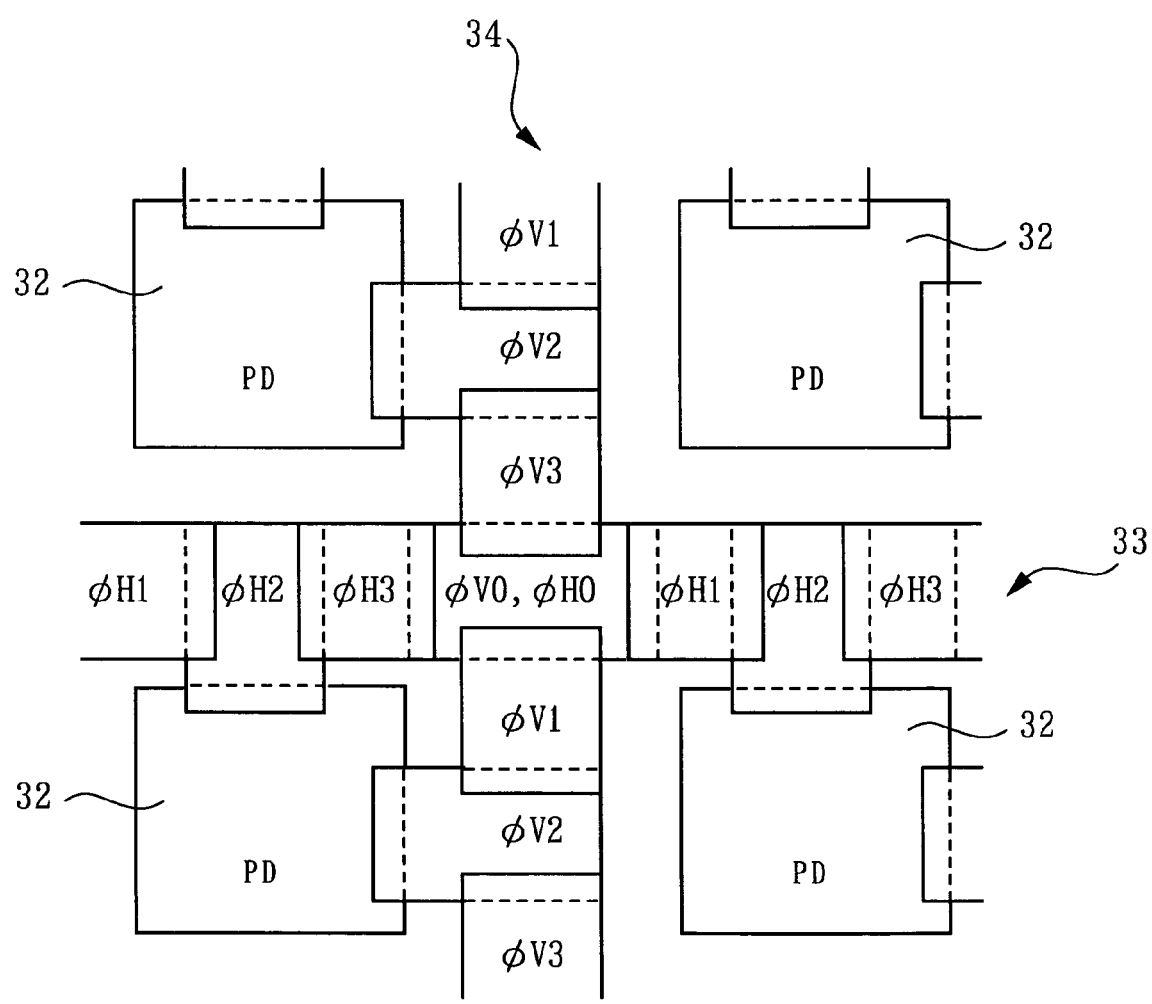
FIG. 6 is a figure showing a configuration of the photodiodes and electrodes provided in a solid-state image-capturing device of Embodiment 1.

Next, FIG. 6 is a figure showing a configuration of the photodiodes and electrodes provided in the solid-state image-capturing device.

Each of the electrodes shown in FIG. 6 is constituted by polysilicon, and adjacent electrodes are disposed with an interlayer insulating layer therebetween. The adjacent electrodes are disposed so that end faces thereof are partially overlapped on each other when viewed from a direction perpendicular to the image-capturing area. In FIG. 6 the end faces of the electrodes shown with dashed lines indicate that the end face portions of the electrodes are disposed on lower portions of other electrodes.

Further, the electrodes which apply the same drive pulse are connected to each other by a predetermined wiring layer via a contact portion. However, in FIG. 6 illustration of the wiring between the electrodes is omitted to clarify the arrangement of the electrodes.

As described above, in the image-capturing device 1 the plurality of (substantively a number of) photodiodes (described as "PD" in FIG. 6) 32 are arranged in a matrix form.

One pixel has one photodiode 32, four electrodes constituting the horizontal transfer CCD 33, i.e. $\phi H1$, $\phi H2$, $\phi H3$ and $\phi H0$ sequentially from the left to the right, and four electrodes constituting the vertical transfer CCD 34, i.e. $\phi V0$, $\phi V1$, $\phi V2$, and $\phi V3$ from the top to the bottom.

It should be noted that $\phi V0$ through $\phi V3$ and $\phi H0$ through $\phi H3$ indicate drive pulses for charge transfer as described hereinafter, and a description such as "transfer electrode $\phi V0$" means "electrode which applies a drive pulse of $\phi V0$".

The vertical transfer electrode $\phi V2$ and the horizontal transfer electrode $\phi H2$ inside each of the transfer electrode described above also serves as a read electrode for reading the charge of the photodiode 32. Moreover, these vertical transfer electrode $\phi V2$ and horizontal transfer electrode $\phi H2$ are electrodes constituting the abovementioned charge holding portions. Specifically, the vertical transfer electrode $\phi V2$ is not adjacent to any of the electrodes $\phi H0$, $\phi H1$, $\phi H2$ and $\phi H3$ constituting the horizontal transfer CCD 33, thus, by taking the $\phi V1$ and $\phi V3$ as VL (for example, −5[V]) and $\phi V2$ as VM (for example, 0[V]), transfer can be performed by the horizontal transfer CCD 33 while holding an added charge under the vertical transfer electrode $\phi V2$ (the charge under the vertical transfer electrode $\phi V2$ is not mixed with a charge to be transferred to the horizontal transfer CCD 33). Similarly, the horizontal transfer electrode $\phi H2$ is not adjacent to any of the electrodes $\phi V0$, $\phi V1$, $\phi V2$ and $\phi V3$ constituting the vertical transfer CCD 34, thus, by taking the $\phi H1$ and $\phi H3$ as VL and $\phi H2$ as VM, transfer can be performed by the vertical transfer CCD 34 while holding an added charge under the horizontal transfer electrode $\phi H2$ (the charge under the horizontal transfer electrode $\phi H2$ is not mixed with a charge to be transferred to the vertical transfer CCD 34). In order to achieve a function of avoiding such mixing of the charges, the image-capturing device 1 is configured such that, for one pixel, four electrodes for vertical direction transfer and four electrodes for horizontal direction transfer are disposed.

Moreover, the transfer electrode disposed in the intersection of the vertical transfer CCD 34 and the horizontal transfer CCD 33 uses both the vertical transfer electrode $\phi V0$ and the horizontal transfer electrode $\phi H0$. Therefore, although these electrodes are the same, these electrodes are accordingly referred to as "vertical transfer electrode $\phi V0$", "horizontal transfer electrode $\phi H0$", or "transfer electrodes $\phi V0$, $\phi H0$" or the like as usage. The transfer electrodes $\phi V0$, $\phi H0$ are not only used for transfer of charges in the vertical direction or the horizontal direction, but also function as the abovementioned addition portions for adding the charge of the electrode $\phi H2$ and electrode $\phi V2$, which is held in either one of the charge holding portions, and the charge of the electrode $\phi H2$ and electrode $\phi V2$, which is newly read by either one of CCDs from the photodiode 32.

It should be noted that the vertical transfer CCD 34 having the vertical transfer electrodes $\phi V0$, +V1, $\phi V2$ and $\phi V3$ is called "vertical transfer register", and the horizontal transfer CCD 33 having the horizontal transfer electrodes $\phi H0$, $\phi H1$, $\phi H2$ and $\phi H3$ is called "horizontal transfer register". The vertical transfer register and the horizontal transfer register both have a function of holding (storing) and transferring charges, as described above.

Figure 7:
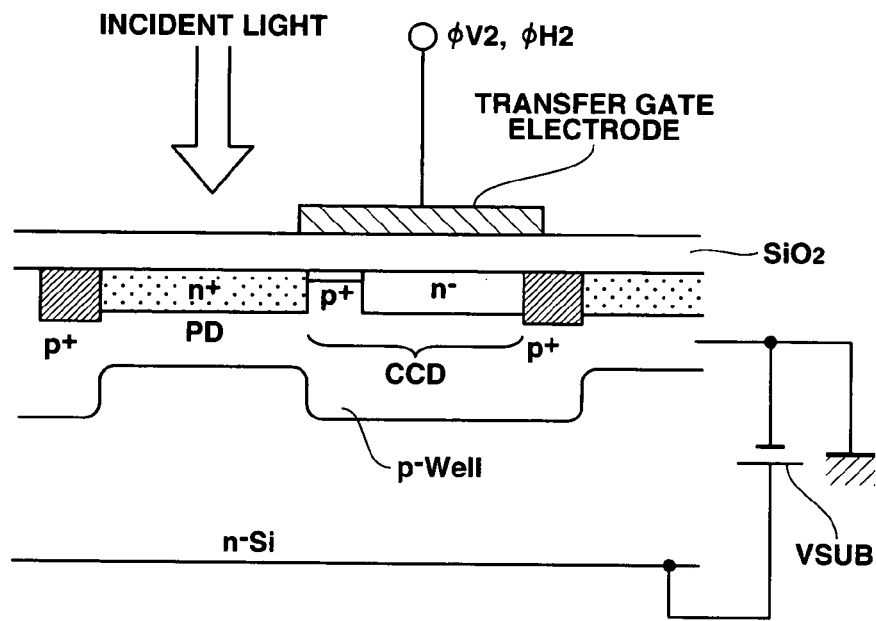
FIG. 7 is a cross-sectional view for explaining that an image-capturing device has a longitudinal overflow structure in Embodiment 1.

Further, in the present embodiment there is a possibility that charges of pixels exceed the storage capacitors of the transfer registers and overflow, since the charges of the pixels obtained by shooting an image a plurality of times are added up. Hereinafter, a configuration for preventing such occurrence is described with reference to FIG. 7 and FIG. 8. FIG. 7 is a cross-sectional view for explaining that the image-capturing device has a longitudinal overflow structure, and FIG. 8 is a figure showing a state in which reverse bias voltage is changed in accordance with the number of time-shared exposures, and the accumulated charge amount by which an overflow occurs is controlled.

If intense light enters the photodiode, excessive charges overflowing from the photodiode sometimes flow into the adjacent photodiode. In order to prevent this blooming phenomenon, various devices have been conventionally employed. In the present embodiment, since charges are added up inside the image-capturing device 1, even when the exposure amount in each of m (m is an integer of 1 or more) number of time-shared shootings is set to 1/m of the exposure in normal shooting, there is a possibility that the charges of an image obtained by adding the time-shared images largely exceed the transfer capacity of the vertical transfer CCD. Therefore, it is required to prevent the charges of the image after addition from exceeding the transfer capability of the vertical transfer CCD.

For this purpose, in the present embodiment a CCD solid-state image-capturing device having a longitudinal overflow structure is employed. As shown in FIG. 7, this constitutes photodiodes (PD) in a p-type diffused region (p-well) which is created on a surface of an n-type substrate (for example, n-type silicon substrate), and brings the p-well into a complete depleted state by means of reverse bias voltage VSUB present between the p-well and the n-type substrate.

Figure 8:
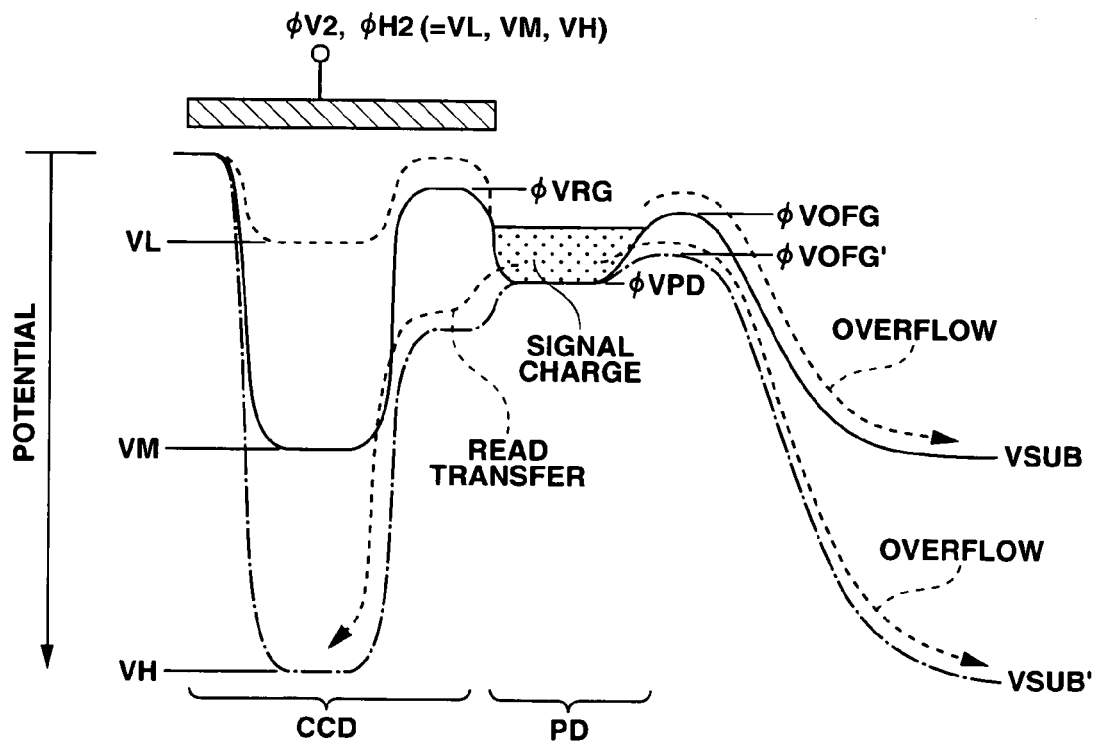
FIG. 8 is a figure showing a state in which reverse bias voltage is changed in accordance with the number of time-shared exposures, and the accumulated charge amount by which an overflow occurs is controlled, in Embodiment 1.

As shown in FIG. 8, a gate for reading out from the photodiodes (PD) into the vertical transfer CCD or the horizontal transfer CCD is common as the vertical transfer electrode φV2 (or horizontal transfer electrode φH2). A potential φVRG of the read gate is lower than a potential φVPD of the photodiode by a predetermined potential when a low voltage (VL) or medium voltage (VM) is applied to the transfer electrode. On the other hand, when pulse of a high voltage (VH) is applied to the transfer electrode, the potential φVRG of the read gate becomes higher than the potential φVPD of the photodiode, and a signal charge inside the photodiode is read by the vertical transfer CCD or horizontal transfer CCD.

At this moment, the vertical transfer CCD or the horizontal transfer CCD needs to perform operation for ejecting excessive charges when intense light enters, since the charge amount to be handled, which is the maximum transferable charge amount, is limited. Such excessive signal charges are absorbed into the substrate through a passage of n+pn in the longitudinal direction (direction of the thickness of the substrate) before overflowing to the transfer CCDs or other photodiodes. Specifically, a potential φVOFG of the p-well at which overflow is performed, is set higher than the read gate voltage φVRG when the voltage of the transfer electrode which also serves as the read gate is VM (0[V]) or VL (−5 [V]). Accordingly, the blooming phenomenon in which the excessive charges overflow to the vertical transfer CCD or the horizontal transfer CCD when accumulated is prevented.

Moreover, in the present embodiment, the reverse bias voltage VSUB between the p-well and the n-type substrate is set to a voltage higher than when normal shooting is performed (the reverse bias voltage VSUB' shown in FIG. 8), in accordance with m (selected in step S214 of FIG. 14 described hereinafter) which is the number of times that the time-shared shooting is performed (specifically, VSUB' depends on m). Accordingly, excessive charges exceeding 1/m of the maximum charge amount accumulated in the photodiode at the time of normal shooting is ejected to the substrate, when the potential of the p-well at which overflow is performed is φVOFG' (>φVOFG). In this manner, even when images obtained in the m number of time-shared shooting are added up, the total charge amount after addition can be controlled to be less than or equal to the handled charge amount of the vertical transfer CCD or the horizontal transfer CCD.

Figure 9:
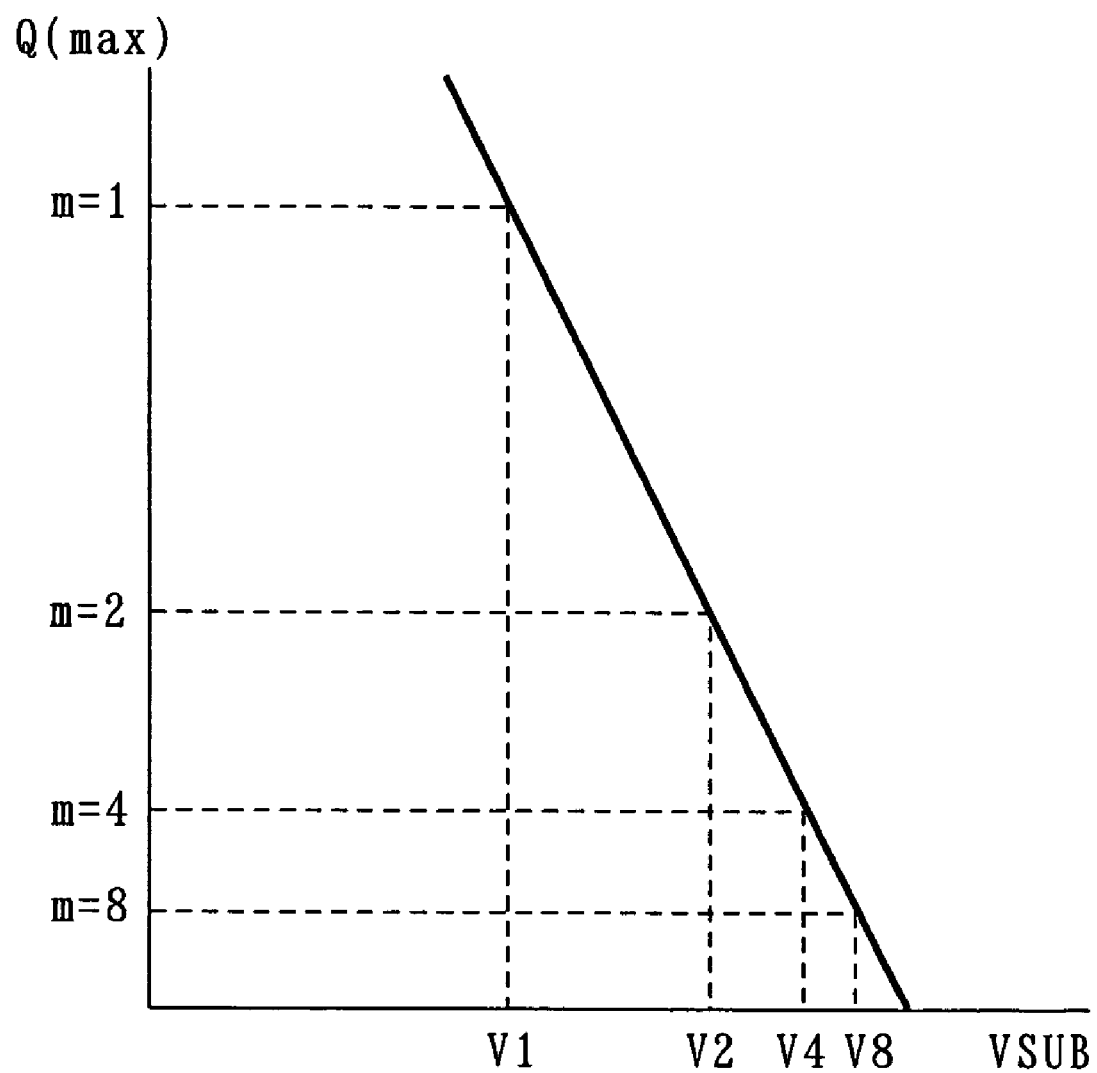
FIG. 9 is a diagram showing several examples of a state in which the maximum value Q (max) of the accumulated charge amount of the photodiode, which is changed by substrate voltage VSUB, is set in accordance with the number of times (m) that time-shared shooting is performed, in Embodiment 1.

FIG. 9 is a diagram showing several examples of a state in which the maximum value Q (max) of the accumulated charge amount of the photodiode 32, which is changed by the substrate voltage VSUB, is set in accordance with m which is the number of times that time-shared shooting is performed. In FIG. 9 the horizontal axis is the substrate voltage VSUB and the vertical axis is the maximum value Q(max) of the accumulated charge amount of the photodiode 32.

In the present embodiment, 10 different values between 1 through 10 can be set for m which is the number of times that time-shared shooting is performed (FIG. 9 shows an example where m=1, 2, 4, 8. At this moment, VSUB is a value V1, V2, V4, or V8 as shown in the figure), and the m, which can be selected as the number of times that this time-shared shooting is performed, is stored in, for example, the EEPROM 24 in advance. When the maximum value Q(max) of the accumulated charge amount of the photodiode 32 is 1 when m=1, it becomes 1/m with respect to each m when m is a value between 2 through 10 (it should be noted that, even when m is set to be 11 or above, the rule that Q(max) is 1/m can be applied). Moreover, m=1 corresponds to the maximum value of the accumulated charge amount of the photodiode 32 in the case of normal shooting (shooting which is not time-shared shooting).

The reason that the maximum value of m is set to 10 is that, if a larger value is set, it becomes difficult to keep S/N of the image data at a high value.

Moreover, the technology of the present embodiment is to perform the m number of time-shared shooting to add up images at blurring limit exposure time TLimit (the blurring limit exposure time TLimit is, as described hereinafter in detail, exposure time where the occurrence of blurring can be substantively ignored). Therefore, if the longest exposure time for restraining the occurrence of blurring is TExp0, in the present embodiment the TExp0 is m(max)·TLimit. Here, m(max) is the maximum value of m, and m(max)=10 is obtained as described in the present embodiment. Concretely speaking, when the focal distance of a shooting lens, which is converted to a 35 mm film camera basis, is 300 mm, the blurring limit exposure time TLimit is a shutter speed of approximately 1/300 seconds, and the longest exposure time TExp0 which can correct blurring is approximately 1/30 seconds.

In this manner, if the value of m is large, blurring correction can be performed for long time exposure, but if the value of m is too large there is a possibility that the S/N of the image data becomes low, as described above. Therefore, it is preferred that the value of m be determined in consideration of a balance among the stability of control, S/N of an image obtained by time-shared shooting, and the like. For this reason, in the present embodiment the maximum value of m is set to 10, but the maximum value is not limited to this value.

Figure 10:
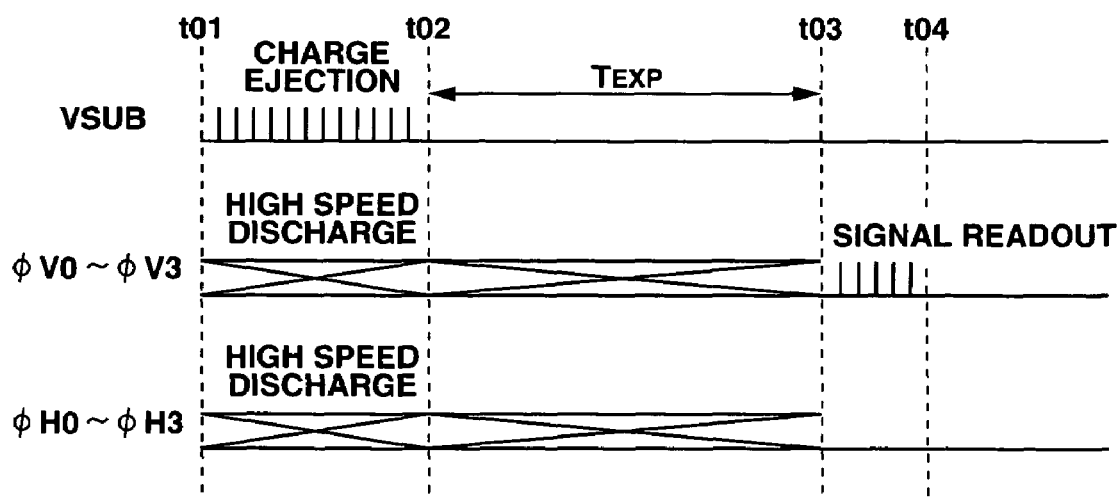
FIG. 10 is a timing chart showing a basic operation of the solid-state image-capturing device at the time of image-capturing, in Embodiment 1.

FIG. 10 is a timing chart showing a basic operation of the solid-state image-capturing device 1 at the time of image-capturing.

In FIG. 10, the VSUB is a substrate application high voltage pulse for forcibly ejecting the charges accumulated in the photodiodes 32 to a semiconducting substrate (substrate). Further, φV0 through φV3 are four-phase vertical transfer pulses, and φH0 through φH3 are four-phase horizontal transfer pulses.

When a shooting operation is started, a high voltage pulse is applied to the VSUB between a time t01 which is a predetermined timing to an exposure (charge accumulation) start time t02, and at the same time a high frequency vertical transfer pulse is applied to the φV0 through φV3 and a high frequency horizontal transfer pulse is applied to the φH0 through φH3. Consequently, the charges accumulated in the photodiodes 32, the charges remaining in the horizontal transfer CCD 33, and the charges remaining in the vertical transfer CCD 34 are all ejected.

Thereafter, when a signal for starting exposure operation is received, application of a high voltage pulse to the VSUB is stopped at the time t02, whereby charge corresponding to the intensity of the received light is accumulated in the photodiodes 32. Accumulation of the charges in the photodiodes 32 is performed continuously in the exposure time TExp between the time t02 to time t03. Then, this exposure time TExp is time-divided into time intervals so that blurring does not occur, and each time-shared image is repeatedly transferred and added up in response to blurring, whereby data of a single image of the exposure time TExp during which blurring correction is performed is obtained. This operation of the image-capturing device 1 during the exposure time TExp is described hereinafter in more detail.

Figure 12:
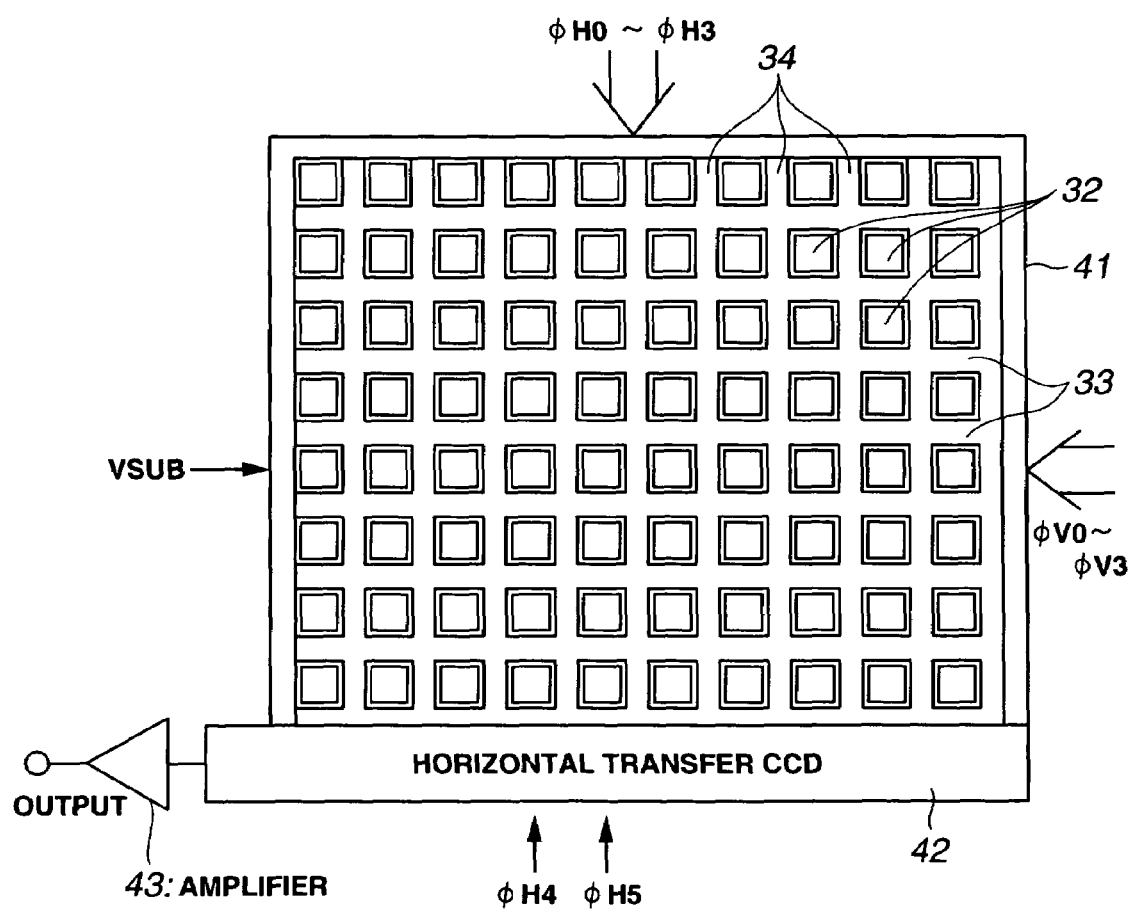
FIG. 12 is a figure showing a patterned configuration of the entire solid-state image-capturing device of Embodiment 1.

When exposure is ended at the time t03, the images after blurring correction, which are accumulated in the vertical transfer CCD 34, are read out from the image-capturing device 1 at normal read speed via the vertical transfer CCD 34 and a horizontal transfer CCD 42 which is a readout portion and transfer portion for outputting an image from the image-capturing area to the outside (see FIG. 12).

Figure 11:
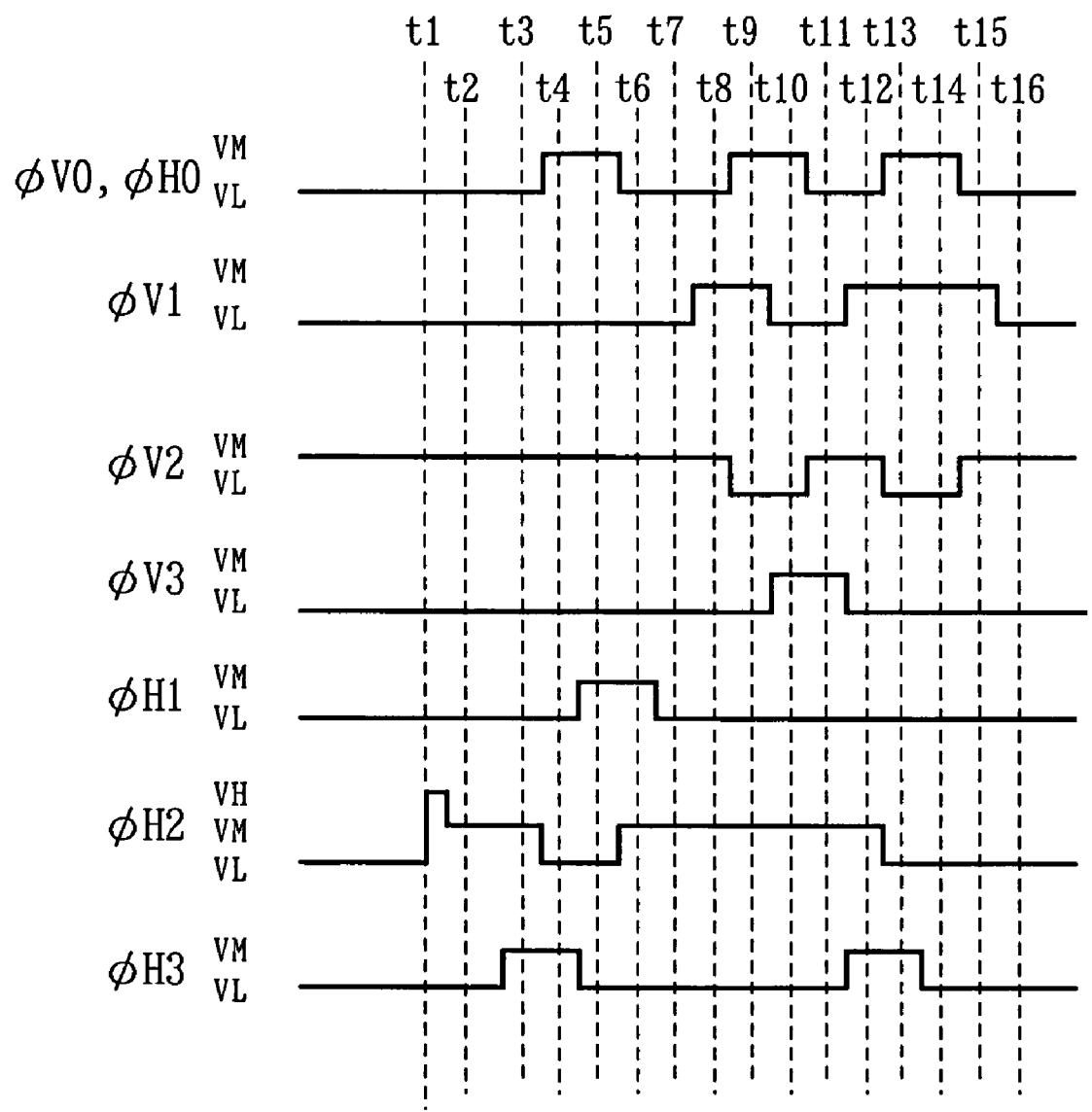
FIG. 11 is a timing chart showing a state of a signal which is applied to each electrode when the pixel charges are read out from the photodiode and transferred and added within the solid-state image-capturing device, in Embodiment 1.

FIG. 11 is a timing chart showing a state of a signal which is applied to each electrode when the pixel charges are read out from the photodiode and transferred and added within the solid-state image-capturing device. It should be noted that the figure shows an example in which the operations described with reference to FIG. 2 through FIG. 5 are performed by the image-capturing device 1 having the configuration shown in FIG. 6. Moreover, since the electrodes $\phi V0$ and $\phi H0$ are common, the electrodes are collectively described in FIG. 11.

Suppose that the charges which are already added up are stored in the charge holding portion (under the electrode $\phi V2$) of the vertical transfer CCD 34 by the time t1, and that the latest time-shared exposure is ended at the time t1. However, when the time t1 is a point of time at which the first time-shared exposure of the plurality of time-shared exposures is ended, if the charge added and stored in the vertical transfer CCD 34 is 0 as described above, the time t1 can be generalized.

When a predetermined exposure time elapses at the time t1, a high voltage (transfer pulse) VH (15 [V]) for reading is applied to the electrode $\phi H2$. At this moment, the electrode $\phi V2$ which holds added charges is set to a medium voltage VM (0 [V]), and the other electrodes $\phi V0$, $\phi V1$, $\phi V3$, $\phi H1$, and $\phi H3$ are all set to a low voltage VL (−5 [V]). Accordingly, charges accumulated in the photodiodes 32 are shifted to under the electrode $\phi H2$ of the horizontal transfer CCD 33. Once this shifting is performed, the voltage applied to the electrode $\phi H2$ becomes the medium voltage VM (0 [V]), and read charges are held (accumulated) under the electrode $\phi H2$ (see FIG. 3).

The voltage applied to the electrode $\phi H2$ changes from the high voltage VH (15 [V]) to the medium voltage VM (0 [V]), and at the same time accumulation of charges for the next shooting is started in the photodiodes 32. Specifically, the next time-shared shooting is started.

Thereafter, at the timing when the time t2 is elapsed, the medium voltage VM is applied to the electrode $\phi H3$. Accordingly, the charges held under the electrode $\phi H2$ are partially transferred to under the electrode $\phi H3$, and held under potential wells under the both electrodes $\phi H2$ and $\phi H3$ (simply referred to as "under the electrode(s)" hereinafter).

Next, at the timing when the time t3 is elapsed, the electrode $\phi H2$ is set to the low voltage VL. Accordingly, the charges held under the both electrodes $\phi H2$ and $\phi H3$ are all transferred to under the electrode $\phi H3$ and held under this electrode $\phi H3$.

Immediately after the electrode $\phi H2$ is set to the low voltage VL, the electrode $\phi H0$ (electrode $\phi V0$) is set to the medium voltage VM. Accordingly, the charges held under the electrode $\phi H3$ are partially transferred to under the electrode $\phi H0$, and held under the both electrodes $\phi H3$ and $\phi H0$.

Thereafter, at the timing when time t4 is elapsed, the electrode $\phi H3$ is set to the low voltage VL. Accordingly, the charges held under the both electrodes $\phi H3$ and $\phi H0$ are all transferred to under the electrode $\phi H0$ and held under this electrode $\phi H0$.

Immediately after the electrode $\phi H3$ is set to the low voltage VL, the electrode $\phi H1$ is set to the medium voltage VM. Accordingly, the charges held under the electrode $\phi H0$ are partially transferred to under the electrode $\phi H1$ of an adjacent pixel, and held under the both electrodes $\phi H0$ and $\phi H1$.

At the timing when time t5 is elapsed, the electrode $\phi H0$ is set to the low voltage VL. Accordingly, the charges held under the both electrodes $\phi H0$ and $\phi H1$ are all transferred to under the electrode $\phi H1$ and held under this electrode $\phi H1$.

Immediately after the electrode $\phi H0$ is set to the low voltage VL, the electrode $\phi H2$ is set to the medium voltage VM. Accordingly, the charges held under the electrode $\phi H1$ are partially transferred to under the electrode $\phi H2$, and held under the both electrodes $\phi H1$ and $\phi H2$.

Thereafter, at the timing when time t6 is elapsed, the electrode $\phi H1$ is set to the low voltage VL. Accordingly, the charges held under the both electrodes $\phi H1$ and $\phi H2$ are all transferred to under the electrode $\phi H2$ and held under this electrode $\phi H2$.

In this manner, the charges held under the electrode $\phi H2$ of a pixel present in the horizontal transfer CCD 33 are transferred to the electrode $\phi H2$ of an adjacent pixel on the right in the following manner:

under electrode $\phi H2 \rightarrow$ under electrode $\phi H3 \rightarrow$ under electrode $\phi H0 \rightarrow$ under electrode $\phi H1 \rightarrow$ under electrode $\phi H2$.

The charges under the electrode $\phi H2$ of this adjacent pixel are held (stored) continuously under this electrode $\phi H2$ until the timing when time t11 is elapsed (see FIG. 3).

It should be noted that the above has described an operation in which the charges are transferred by the amount of one pixel by the horizontal transfer CCD 33 in the right direction (see FIG. 3), but, more generally, when transferring the charges by the amount of n (n is an integer of 1 or more) pixels, the signals of $\phi H0$ through $\phi H3$ described above may be repeatedly applied n number of times. Moreover, the charges can be transferred by the horizontal transfer CCD 33 in the left direction as well. At this moment, a signal which is time-reversed from the above signals may be applied to each of the electrodes $\phi H0$ through $\phi H3$. When transferring the charges by the amount of n pixels in the left direction, this time-reversed signal is repeatedly applied to each of the electrodes $\phi H0$ through $\phi H3$ n number of times.

Subsequently, at the timing when time t7 is elapsed, the electrode $\phi V1$ is set to the medium voltage VM. Accordingly, the added charges held under the electrode $\phi V2$ are partially transferred to under the electrode $\phi V1$, and held under the both electrodes $\phi V2$ and $\phi V1$.

Thereafter, at the timing when time t8 is elapsed, the electrode $\phi V2$ is set to the low voltage VL. Accordingly, the charges held under the both electrodes $\phi V2$ and $\phi V1$ are all transferred to under the electrode $\phi V1$, and held under this electrode $\phi V1$.

Immediately after the electrode $\phi V2$ is set to the low voltage VL, the electrode $\phi V0$ (electrode $\phi H0$) is set to the medium voltage VM. Accordingly, the charges held under the electrode $\phi V1$ are partially transferred to under the electrode $\phi V0$, and held under the both electrodes $\phi V1$ and $\phi V0$.

Next, at the timing when time t9 is elapsed, the electrode $\phi V1$ is set to the low voltage VL. Accordingly, the charges held under the both electrodes $\phi V1$ and $\phi V0$ are all transferred to under the electrode $\phi V0$, and held under this electrode $\phi V0$.

Immediately after the electrode $\phi V1$ is set to the low voltage VL, the electrode $\phi V3$ is set to the medium voltage VM. Accordingly, the charges held under the electrode $\phi V0$ are partially transferred to under the electrode $\phi V3$, and held under the both electrodes $\phi V0$ and $\phi V3$.

At the timing when time t10 is elapsed, the electrode $\phi V0$ is set to the low voltage VL. Accordingly, the charges held under the both electrodes $\phi V0$ and $\phi V3$ are all transferred to under the electrode $\phi V3$, and held under this electrode $\phi V3$.

Immediately after the electrode $\phi V0$ is set to the low voltage VL, the electrode $\phi V2$ is set to the medium voltage VM. Accordingly, the charges held under the electrode $\phi V3$ are partially transferred to under the electrode $\phi V2$, and held under the both electrodes $\phi V3$ and $\phi V2$.

Thereafter, at the timing when time t11 is elapsed, the electrode φV3 is set to the low voltage VL. Accordingly, the charges held under the both electrodes φV3 and φV2 are all transferred to under the electrode φV2, and held under this electrode φV2.

In this manner, the charges held under the electrode φV2 of a pixel present in the vertical transfer CCD 34 are transferred to the electrode φV2 of an adjacent pixel above in the following manner:

under electrode φV2→under electrode φV1→under electrode φV0→under electrode φV3→under electrode φV2.

It should be noted that the above has described an operation in which the charges are transferred by the amount of one pixel by the vertical transfer CCD 34 in the upward direction (see FIG. 3), but, more generally, when transferring the charges by the amount of n (n is an integer of 1 or more) pixels, the signals of φV0 through φV3 described above may be repeatedly applied n number of times. Moreover, the charges can be transferred by the vertical transfer CCD 34 in the downward direction as well. At this moment, a signal which is time-reversed from the above signals may be applied to each of the electrodes φV0 through φV3. When transferring the charges by the amount of n pixels in the downward direction, this time-reversed signal is repeatedly applied to each of the electrodes φV0 through φV3 n number of times.

Immediately after the electrode φV3 is set to the low voltage VL at the timing when the time t11 is elapsed, the electrode φV1 is set to the medium voltage VM. Accordingly, the charges held under the electrode φV2 are partially transferred to under the electrode φV1, and held under the both electrodes φV2 and φV1.

At the same time, the electrode φH3 is set to the medium voltage VM. Accordingly, the charges held under the electrode φH2 are partially transferred to under the electrode φH3, and held under the both electrodes φH2 and φH3.

At the timing when time t12 is elapsed, the electrode φV2 is set to the low voltage VL. Accordingly, the charges held under the both electrodes φV2 and φV1 are all transferred to under the electrode φV1, and held under this electrode φV1.

At the same time, the electrode φH2 is set to the low voltage VL. Accordingly, the charges held under the both electrodes φH2 and φH3 are all transferred to under the electrode φH3, and held under this electrode φH3.

Immediately after the electrode φV2 is set to the low voltage VL and the electrode φH2 is set to the low voltage VL, the electrodes φV0, φH0 are set to the medium voltage VM. Accordingly, the charges held under the electrode φV1 are partially transferred to under the electrodes φV0, φH0 and the electrode φH3, and the charges held under the electrode φH3 are partially transferred to under the electrodes φV0, φH0 and the electrode φV1. Therefore, mixing (addition) of the charges occurs at this point of time (see FIG. 4).

Thereafter, at the timing when time t13 is elapsed, the electrode φH3 is set to the low voltage VL. Accordingly, the charges held under the electrode φH3, the electrodes φV0, φH0, and the electrode φV1 are held only under the electrodes φV0, φH0, and the electrode φV1.

Subsequently, at the timing when time t14 is elapsed, the electrodes φV0, φH0 are set to the low voltage VL. Accordingly, the charges held under the electrodes φV0, φH0, and the electrode φV1 are all transferred to under the electrode φV1, and held under this electrode φV1.

Immediately after the electrodes φV0, φH0 are set to the low voltage VL, the electrode φV2 is set to the medium voltage VM. Accordingly, the charges held under the electrode φV1 are partially transferred to under the electrodes φV2, and held under the both electrodes φV1 and φV2.

At the timing when time t15 is elapsed, the electrode φV1 is set to the low voltage VL. Accordingly, the charges held under the both electrodes φV1 and φV2 are all transferred to under the electrode φV2, and held under this electrode φV2 (see FIG. 5). This state continues at time t16, and it is understood that the added charges are held under the electrode φV2.

The charges which are added up at the timing when the time t12 is elapsed are transferred to and stored under the electrode φV2 inside the same pixel, whereby addition of the stored image and the image obtained by the next time-shared exposure can be performed in the same sequence. In this manner, addition is performed, while correcting blurring of the images, which is caused by shooting a plurality of times, and eventually an image with no blurring ("no blurring" means that blurring can be substantively ignored) can be obtained at the exposure time TExp.

As described above, the images stored in the horizontal transfer CCD 33 are transferred by the amount of blurring in the horizontal direction, whereby relative blurring in the horizontal direction is corrected. Moreover, the images stored in the vertical transfer CCD 34 are transferred by the amount of blurring in the vertical direction, whereby relative blurring in the vertical direction is corrected. For this reason, to the potential wells under each of the electrodes of the horizontal transfer CCD 33 and the vertical transfer CCD 34, charges are transferred from the adjacent potential wells a number of times. Therefore, the charges which are transferred to the both ends of the horizontal transfer CCD 33 and the both ends of the vertical transfer CCD 34 are not transferred to anywhere and accumulated in these ends. The accumulated charges eventually exceed a level where the charges can be accumulated in the potential wells, and flow into the adjacent potential well, causing deterioration of the images. As a method for solving such a problem, there is considered a method of increasing the capacity of the potential wells, which are present under the electrodes of the both ends of the horizontal transfer CCD 33 and the both ends of the vertical transfer CCD 34, so that saturation of the charges is prevented. However, the amount of charges to be accumulated is different in accordance with the brightness of a subject or the amount of blurring, thus potential wells with quite large capacity are necessary in order to prevent saturation of the charges in all cases.

Figure 32:
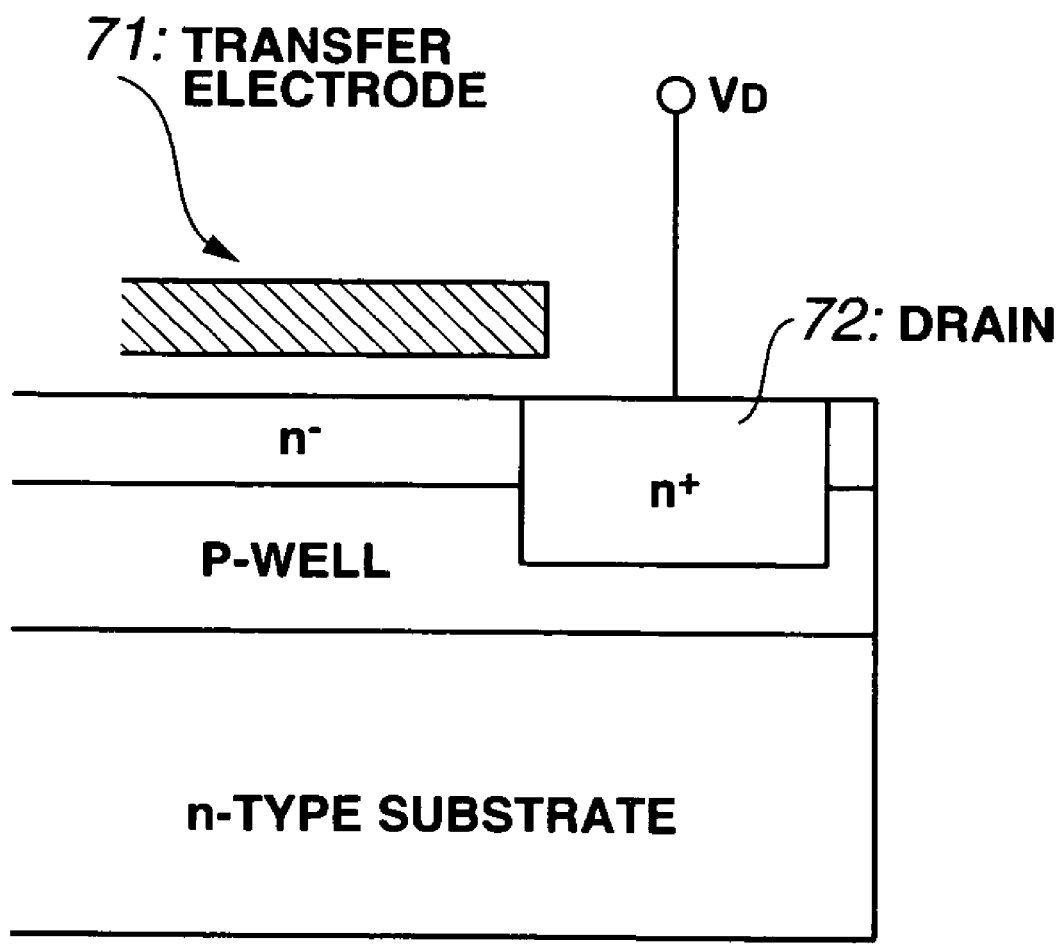
FIG. 32 is a figure showing a configuration for ejecting, to a drain, the charges which are transferred to an end portion of the horizontal transfer CCD and an end portion of the vertical transfer CCD, in Embodiment 1.

Therefore, in the present embodiment, as shown in FIG. 32, an n + diffused region drain 72 is provided adjacent to a transfer electrode 71 on an end portion of the horizontal transfer CCD 33 and on an end portion of the vertical transfer CCD 34, and charges transferred to a potential well under the transfer electrode 71 are ejected via a drain 72. Here, FIG. 32 is a figure showing a configuration for ejecting, to the drain 72, the charges which are transferred to the end portion of the horizontal transfer CCD 33 and the end portion of the vertical transfer CCD 34.

Of the transfer electrodes on both ends of the vertical transfer CCD 34, the one facing the horizontal transfer CCD 42 (see FIG. 12) cannot be provided with the same ejection mechanism. Thus, for this electrode facing the horizontal transfer CCD 42, the horizontal transfer CCD 42 is driven while blurring correction is performed, whereby charges which are sent from the vertical transfer CCD 34 are ejected to an output portion of the horizontal transfer CCD 42.

FIG. 12 is a figure showing a patterned configuration of the entire solid-state image-capturing device. It should be noted that the solid-state image-capturing device 1 suitable for practical use comprises, for example, several hundred thousand through several million pixels. However, since all of the pixels cannot be illustrated, FIG. 12 shows a pattern configuration of the number pixels less than the above numbers.

An image-capturing area 41 is an image-capturing portion and a photoelectric conversion portion comprising the photodiodes 32, horizontal transfer CCDs 33, and vertical transfer CCD 34s as shown in FIG. 2 through FIG. 5 and FIG. 6.

The horizontal transfer CCD 42 is disposed on a position in the horizontal direction against which the vertical transfer CCDs 34 of the image-capturing area 41 abut. As with a normal CCD image-capturing device (i.e. for example, a CCD image-capturing device which does not comprise the horizontal transfer CCD 33 described above), this horizontal transfer CCD 42 is for reading out images added up in the vertical transfer CCDs 34 of the image-capturing area 41, to the outside, during between time t04 to time t04 in FIG. 10. It should be noted that horizontal transfer pulses φH4, φH5, which are different from those in the case of the horizontal transfer CCD 33, are applied to the horizontal transfer CCD 42.

On the output side of the horizontal transfer CCD 42, an amplifier 43 for amplifying an analog signal transferred from the horizontal transfer CCD 42 is disposed. Accordingly, signals amplified by the amplifier 43 are output from the image-capturing device 1.

Figure 13:
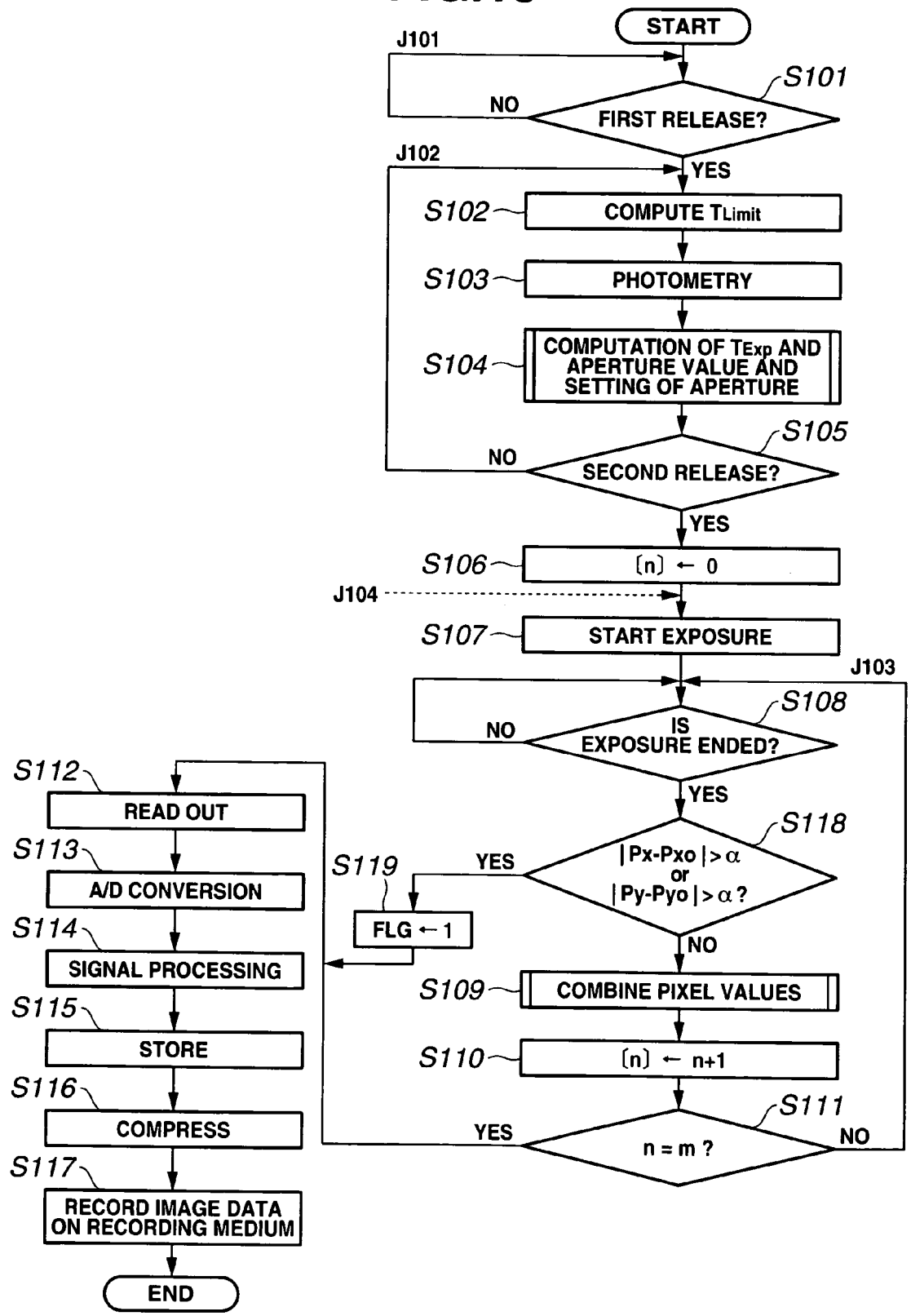
FIG. 13 is a flowchart showing a process performed when capturing an image by means of the digital camera and recording the image, in Embodiment 1.

Next, FIG. 13 is a flowchart showing a process performed when capturing an image by means of the digital camera and recording the image.

When the digital camera is powered on (for example, when the battery is replaced), or when an operation start switch (for example, a power switch), which is not shown, is operated, operation of this digital camera is started.

When the process is started, predetermined initial value setting and the like are performed, and thereafter, first of all, it is determined whether or not the first release switch 18a is closed by a release operation of a photographer (step Here, when the first release switch 18a is not closed, the process is diverted to J101 to similarly repeat detection of the first release switch 18a. However, actually display or other operation of detecting a state of unshown key input is performed between J101 and the step S101, but descriptions of such general operations are omitted accordingly here and hereinafter.

When it is detected in step S101 that the first release switch 18a is closed, the blurring limit exposure time TLimit is computed (step S102). The blurring limit exposure time TLimit is a time at which the blurring amount from starting of exposure supposedly reaches the tolerance limit blurring.

The blurring limit exposure time TLimit is described here. As the rules of longtime experience with a so-called Leica frame (also known as "double frame") camera with the size of 24 mm by 36 mm (43.28 mm diagonal) in 35 mm film cameras, it is known that if the focal distance of the shooting lens in millimeters is f, the blurring limit exposure time TLimit is TLimit 1/f (seconds). In the present embodiment, this empirical rule is applied in consideration of the size of a shooting frame which is set to be within an effective image-capturing area of the image-capturing device of the digital camera. In the following explanation, descriptions of the unit mm are omitted accordingly, and only numeric values are denoted.

An image-capturing range (shooting angle of view) of a subject using a digital camera is inversely proportional to the focal distance of the shooting lens and is proportional to the size of a frame, thus a relative image magnification with respect to the frame is proportional to the focal point and inversely proportional to the size of the frame. Therefore, image blurring (which is relative with respect to the frame) is also inversely proportional to the size of the frame. Hence, it is only necessary to apply an equation in which the above-mentioned empirical rule is multiplied by conversion factor corresponding to the ratio of the frame size. In this case, it is necessary to consider the difference in aspect ratio, but diagonal conversion is used in the digital camera of the present embodiment.

If the length of the diagonal of the shooting frame is d [mm], TLimit is expressed by the following Equation 1.

$$T_{Limit} \cong \frac{1}{\left(\frac{43.28 \times f}{d}\right)} \quad \text{[Equation 1]}$$

It should be noted that the denominator (43.28×f/d) in Equation 1 is a value obtained by converting the focal distance f of the shooting lens of the digital camera into a focal distance of the shooting lens of a Leica frame film camera in the same angle of view.

As is clear from Equation 1, for the blurring limit exposure time TLimit, when the shooting lens 15 of the digital camera is a fixed focal distance shooting lens, only a single value corresponding to its focal distance is applied, but if the lens shooting 15 is a zoom lens, a different value corresponding to the focal distance needs to be applied.

It should be noted that, for the blurring limit exposure time TLimit, it is not always necessary to use the values provided in Equation 1, thus, in short, it is only necessary to use the exposure time in which blurring substantively does not occur. Therefore, the blurring limit exposure time TLimit may be basically any value as long as it is shorter than the exposure time obtained by Equation 1.

Next, the brightness of the subject is optically measured (step S103). In this optical measurement the brightness of the subject is computed by monitoring the level of an image signal which is repeatedly output from the image-capturing device 1. Specifically, the image signals readout from the image-capturing device 1 are processed by the CDS 2, amplified by the gain control amplifier 3, thereafter converted into a digital value by the A/D converter 4, and then stored temporarily in the DRAM 9 via the information processing portion 8. Out of the image signals stored in the DRAM 9, an image signal in a predetermined region in the vicinity of the center portion, for example, of the entire image is read out by the CPU 7, and an averaging value of the level of the image signal is obtained. The CPU 7 then computes the brightness of the subject (Bv) on the basis of the obtained averaging value.

Subsequently, the CPU 7 computes the shutter speed value (exposure time) TExp required for obtaining optimum exposure and an aperture value of the aperture 17, and executes a subroutine (see FIG. 14) for performing setting of the aperture of the aperture 17 by means of the aperture drive system 16 on the basis of the result of computation (step S104).

Figure 14:
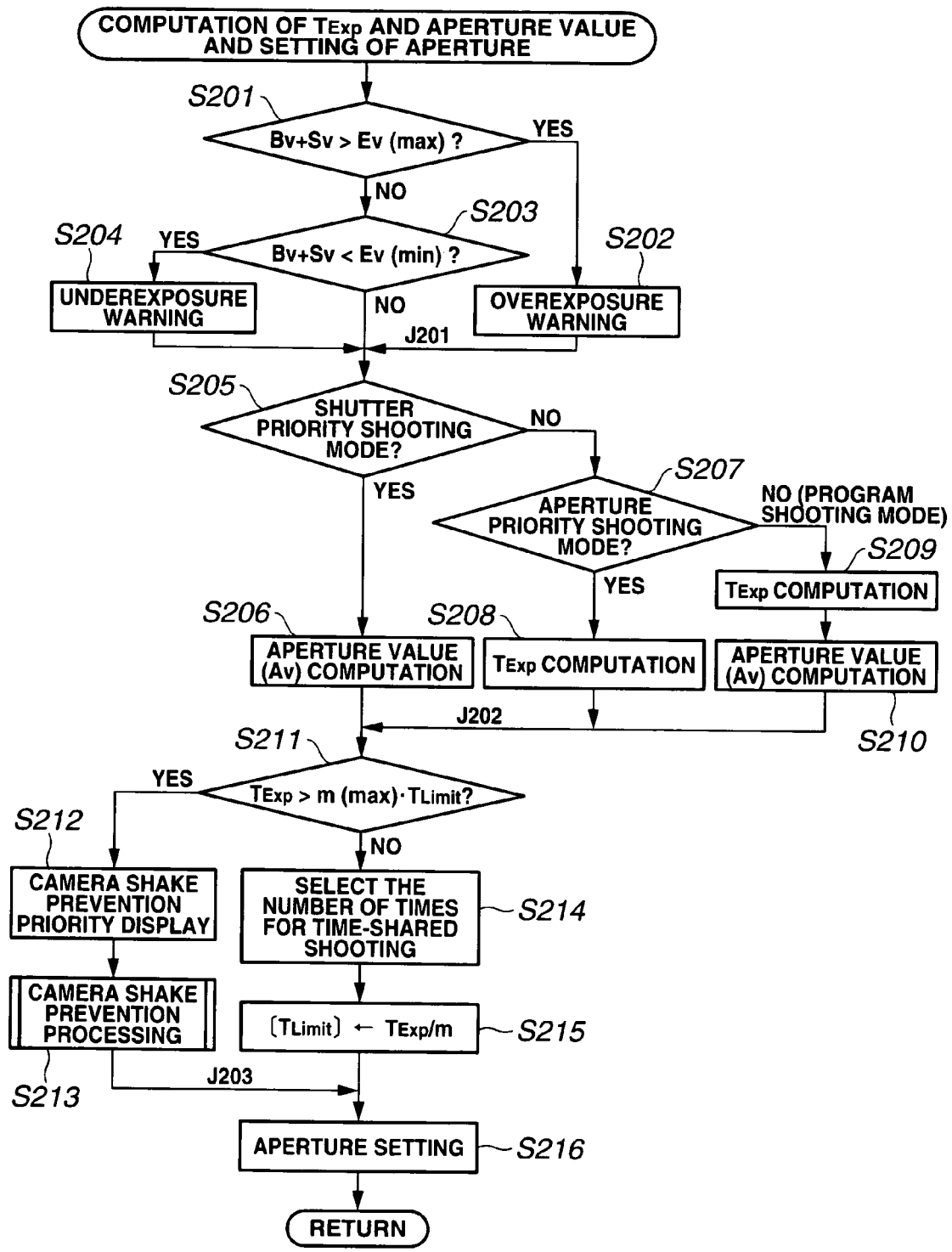
FIG. 14 is a flowchart showing a subroutine for computation of a TExp and aperture value and for aperture setting, in Embodiment 1.

FIG. 14 is a flowchart showing the subroutine for computation of the TExp and aperture value and for aperture setting.

In the subroutine shown in FIG. 14, warning display is performed in the case of an exposure value at which the digital camera cannot be controlled, and camera shake is prevented even when the shooting mode is set to any of the shutter priority shooting mode, the aperture priority shooting mode, and the program shooting mode. Moreover, in this subroutine, when the exposure time is supposedly longer than the exposure time (threshold) during which camera shake may occur, warning display is performed in advance and the shooting mode is automatically set to the mode for prioritizing camera shake prevention to perform shooting.

When shifting to this subroutine, first of all, it is determined whether (Bv+Sv)>Ev(max) is obtained (step S201). Here, Bv (Brightness value) is the brightness of the subject represented by an exponent based on the APEX (Additive System of Photographic Exposure) formula, Sv (Sensitive value) is an ISO sensitive as an apex value, Ev (Exposure value) is an exposure value as an apex value, and Ev(max) is the maximum value of the exposure value as an apex value at which the digital camera can be controlled. Furthermore, when the exposure time as an apex value is Tv (Time value) and the aperture value (F number) as an apex value is Av (Aperture value), the following equation is established.

$$Ev=Tv+Av=Bv+Sv$$

Therefore, the brightness (Bv) of the subject obtained in optical measurement and the ISO sensitivity (Sv) which is set by the shooting condition setting portion 26 are known, the exposure value (Ev) is determined, whereby Tv and Av can be computed. FIG. 17 is a chart showing a reference value of each element related to exposure and a reference value of an exponent of the exposure.

If it is determined in the step S201 that (Bv+Sv)>Ev(max) is established, over exposure warning is performed (step S202). Over exposure warning is executed by, for example, performing warning display in the liquid crystal display portion 12, or by issuing a warning beep via an unshown speaker or the like, along with displaying of warnings. Once such warning is performed, thereafter the process is shifted to J201.

Further, if it is determined in the step S201 that Bv+Sv>Ev (max) is not established, next it is determined whether Bv+Sv<Ev(min) is established (step S203). Here, Ev(min) is the minimum value of the exposure value as an apex value at which the digital camera can be controlled.

If it is determined in the step S203 that Bv+Sv<Ev(min) is established, under exposure warning is performed (step S204). Under exposure warning as well is executed by, as with the over exposure warning described above, performing warning display in the liquid crystal display portion 12, or by issuing a warning beep via the unshown speaker or the like, along with displaying of warnings. Once such warning is performed, thereafter the process is shifted to J201.

If it is determined in the step S203 that Bv+Sv<Ev(min) is not established, or if the process is shifted from the step S202 or the step S204 through J201, it is determined whether the digital camera is set to the shutter priority shooting mode (step S205).

Here, if the digital camera is set to the shutter priority shooting mode, the aperture value (Av) is computed by means of Av=Bv+Sv−Tv (step S206).

On the other hand, if it is determined in the step S205 that the shutter priority shooting mode is not set, it is determined whether the digital camera is set to the aperture priority shooting mode (step S207).

Here, if the aperture priority shooting mode is set, the exposure time TExp is computed (S208). It should be noted that the exposure time TEXp corresponds to Tv, thus the apex value Tv of the exposure time is obtained by Tv=Bv+Sv−Av, and the apex value is converted into the actual exposure time TExp to obtain the exposure time TExp. After this process is ended, the process is shifted to J202.

Figure 18:
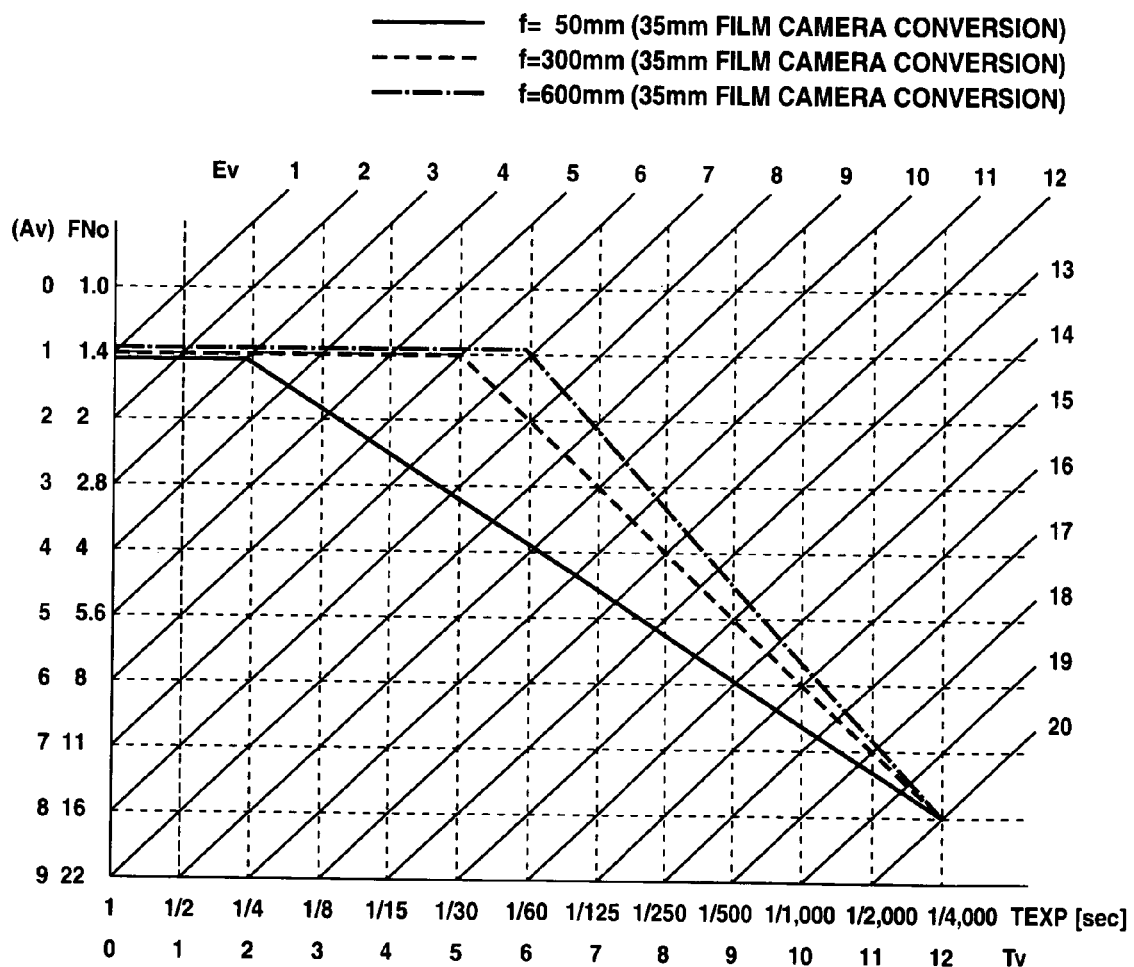
FIG. 18 is a program diagram showing several examples corresponding to the focal distance of a shooting lens, in Embodiment 1.

If it is determined in the step S207 that the digital camera is not set to the aperture priority shooting mode, it means that the digital camera is set to the program shooting mode, thus the exposure time TExp is obtained with reference to the program diagram shown in FIG. 18 (step S209), and the aperture value (Av) is obtained with reference to this program diagram (step S210).

FIG. 18 is a program diagram showing several examples corresponding to the focal distance of the shooting lens 15.

As shown in FIG. 18, this program diagram is designed such that, in the case of the same exposure value Ev, the longer the focal distance of the shooting lens 15, the shorter the exposure time TExp is obtained, whereby the aperture value becomes small (the opening of the aperture becomes large). This is because the longer the focal distance of the shooting lens 15, the larger the effect of camera shake is obtained in the image-capturing area of the image-capturing device 1, so the occurrence of camera shake is constrained by reducing an exposure time TExp. It should be noted that FIG. 18 shows an example of a digital camera in which the aperture value (F number) corresponding to the maximum opening of the aperture is 1.4, the aperture value (F number) corresponding to the minimum opening of the aperture is 16, and the fastest shutter speed is 1/4000 seconds. However, the focal distance f of the lens is in a numerical value converted into that of the 35 mm film camera.

Once the process of the step S210 is ended in this manner, the process proceeds to J202 thereafter.

Once any of the processes S206, S208, and S210 is ended, it is determined whether TExp>m(max) TLimit is established (S211). Here, m represents the number of times that the time-shared exposure is performed as described above, and can be only any of the values between 1 through 10 (m is an integer). This m is stored in the memory (ROM (abovementioned EEPROM 24, for example)) installed in the CPU 7 in advance. Also, m(max) is the maximum value of m as described above, and m(max)=10.

If it is determined in this step S211 that TExp>m(max) TLimit is established, camera shake prevention priority display is performed (step S212). In this camera shake prevention priority display, the exposure time (Tv) or the aperture value (Av) which is set in the shooting mode is changed regardless of which shooting mode is set, and display of camera shake prevention priority is performed and notified to the user. Specifically, when TExp>m(max)·TLimit, the blurring limit exposure time TLimit is exceeded by the value obtained by dividing the exposure time TExp, which is set by the photographer, by the maximum number m(max) of the time-shared exposure, thus prevention of blurring cannot be ensured. Therefore, in the next step S213, the exposure time is fixed to a limit exposure time m(max)·TLimit at which camera shake can be effectively prevented, and the aperture value (Av) is changed, thus the set values of each shooting mode cannot be used (particularly, the shutter speed (exposure time), which is set in the shutter priority shooting mode, is changed, or the aperture value, which is set in the aperture priority shooting mode, is changed). Accordingly, the camera shake prevention priority display is performed and notified in order to avoid confusion such as the shutter speed or aperture value set by the photographer is changed without warning.

After the camera shake prevention priority display is performed in this manner, a subroutine for a camera shake prevention priority process is performed (step S213).

Figure 16:
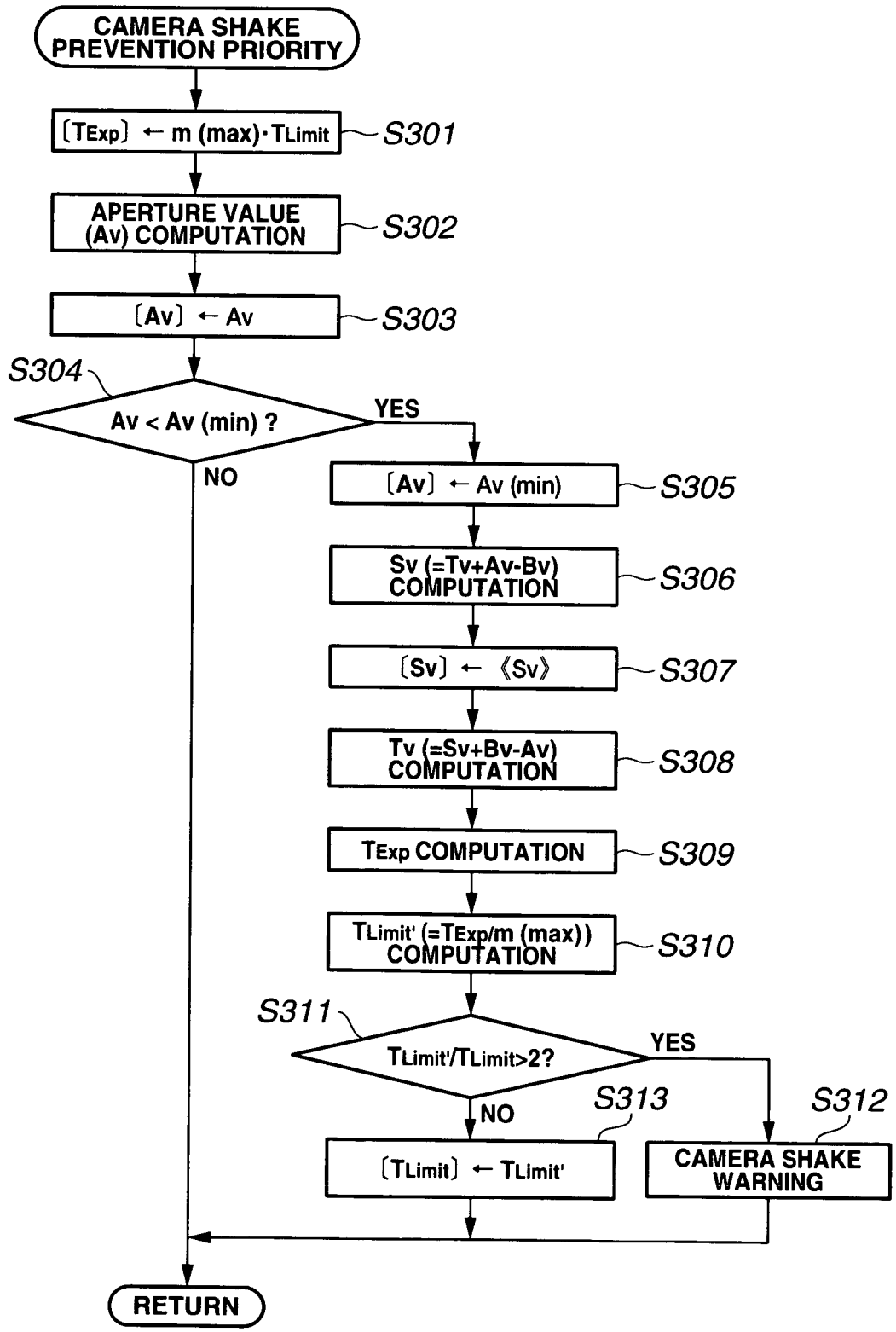
FIG. 16 is a flowchart showing a subroutine for a camera shake prevention priority process, in Embodiment 1.

Here, an operation of the subroutine of the camera shake prevention priority process in the step S213 is explained with reference to FIG. 16. FIG. 16 is a flowchart showing the subroutine for the camera shake prevention priority process.

In this subroutine, first of all, m(max)·TLimit is stored in a memory [TExp] (step S301). Here, [] means the memory for storing the data in the parentheses.

Next, the aperture value Av is computed on the basis of Av=Bv+Sv−Tv (step S302). It should be noted that Tv used in this computation in the step S302 is the apex value of the TExp stored in the memory [TExp] in the step S301. Then, the computed aperture value Av is stored in a memory [Av] (step S303).

Subsequently, it is determined whether Av<Av(min) is established (step S304). Here, Av(min) is the minimum value of the aperture value (corresponds to a value when the aperture is opened to the maximum).

If it is determined in this step S304 that Av<Av(min) is established, the aperture value (Av) computed in the step S302 is an aperture value which cannot be actually set as the aperture 17, thus Av(min) is stored in the memory [Av] again (step S305).

Then, the ISO sensitivity Sv is computed on the basis of Tv+Av−Bv (step S306).

This ISO sensitivity Sv corresponds to the gain of the gain control amplifier 3. For example, if the gain is 1 when the ISO sensitivity is 100, the gain becomes 2 when the ISO sensitivity is 200. If the gain becomes too large, noise becomes distinct, thus an appropriate gain is practically set as an upper limit, and, as a specific example, an ISO sensitivity of 800 (gain 8) or 1600 (gain 16) is the upper limit. The value of the ISO sensitivity Sv actually cannot be set to a continuous value but a graduated value, hence the ISO sensitivity Sv is, out of the Svs that can be set, a value <<Sv>> proximate to the Sv obtained in the step S306. Thus obtained <<Sv>> is stored in a memory [Sv] (step S307).

Next, the exposure time Tv corresponding to Sv, Bv, and Av is obtained by means of Tv=Sv+Bv−Av (step S308).

Subsequently, the apex value Tv of the exposure time obtained in the step S308 is converted to the actual exposure time TExp (step S309).

Thereafter, TLimit' (=TExp/m(max)) is computed (step S310). This TLimit' can be larger or smaller than the TLimit obtained in the step S301.

Then, it is determined whether TLimit'/TLimit is larger than 2 (step S311). If it is determined that TLimit'/TLimit is larger than 2, this means that the exposure time in the time-shared exposure is at least the twice the blurring limit exposure time TLimit, whereby blurring largely exceeds the tolerance level, and this fact is displayed as a camera shake warning on the liquid crystal display portion 12. When displaying this camera shake warning, a warning beep or the like may be issued via the unshown speaker or the like.

If it is determined in the step S311 that TLimit'/TLimit is equal to or less than 2, TLimit' is stored in a memory [TLimit] (step S313).

If it is determined in the step S304 that Av<Av(min) is not established, when the process of the step S312 is ended, or when the process of the step S313 is ended, the process returns from the subroutine shown in FIG. 16 to the process shown in FIG. 14.

Returning to the explanation of FIG. 14, when the process returns from the subroutine for the camera shake prevention priority process shown in FIG. 16 to the process shown in FIG. 14, the following process is performed in J203.

If it is determined in the step S211 that TExp>m(max) TLimit is not established, the time-shared exposure time m is selected (step S214). Specifically, TExp/TLimit is computed, m (an integer of 1 through 10) which is equal to or larger than and proximate to TExp/TLimit is selected. For example, if the value of TExp/TLimit is 2.5, m=3 is set, and if the value of TExp/TLimit is 4, m=4 is set.

Next, TExp/m is stored in a memory [TLimit] (step S215). By newly computing TLimit from TExp/m and controlling the exposure time in the time-shared shooting on the basis of this blurring limit exposure time TLimit, an optimum exposure amount of an image obtained after time-share shooting and addition can be obtained. Moreover, the reason that m (a integer of 1 through 10), which is larger than and proximate to TExp/TLimit, is selected when TExp/TLimit is not an integer in the step S214 is to prevent the new TLimit obtained in the step S215 from becoming larger than the blurring limit exposure time.

In the step S213 when the process returns from the subroutine for the camera shake prevention priority process, or when the process of the step S215 is ended, the aperture 17 is driven by means of the aperture drive system 16 to set the aperture such that an aperture opening corresponding to the aperture value stored in the memory [Av] is obtained (step S216).

Thereafter, the process returns from the subroutine shown in FIG. 14 to the process shown in FIG. 13.

It should be noted that in the process shown in FIG. 14, if it is determined in the step S211 that TExp>m(max)·TLimit is established, Av (aperture value) or the ISO sensitivity is corrected so as to obtain TExp≦m(max)·TLimit. When using such means, although blurring can be suppressed to a sufficiently satisfying level, the shooting mode intended by the photographer is not faithfully reflected. Specifically, even when the photographer selects, for example, the shutter priority shooting mode to shoot an image, the shutter speed (exposure time) becomes faster than the intended shutter speed, whereby shooting which reflects intended image generation may not be performed.

Figure 15:
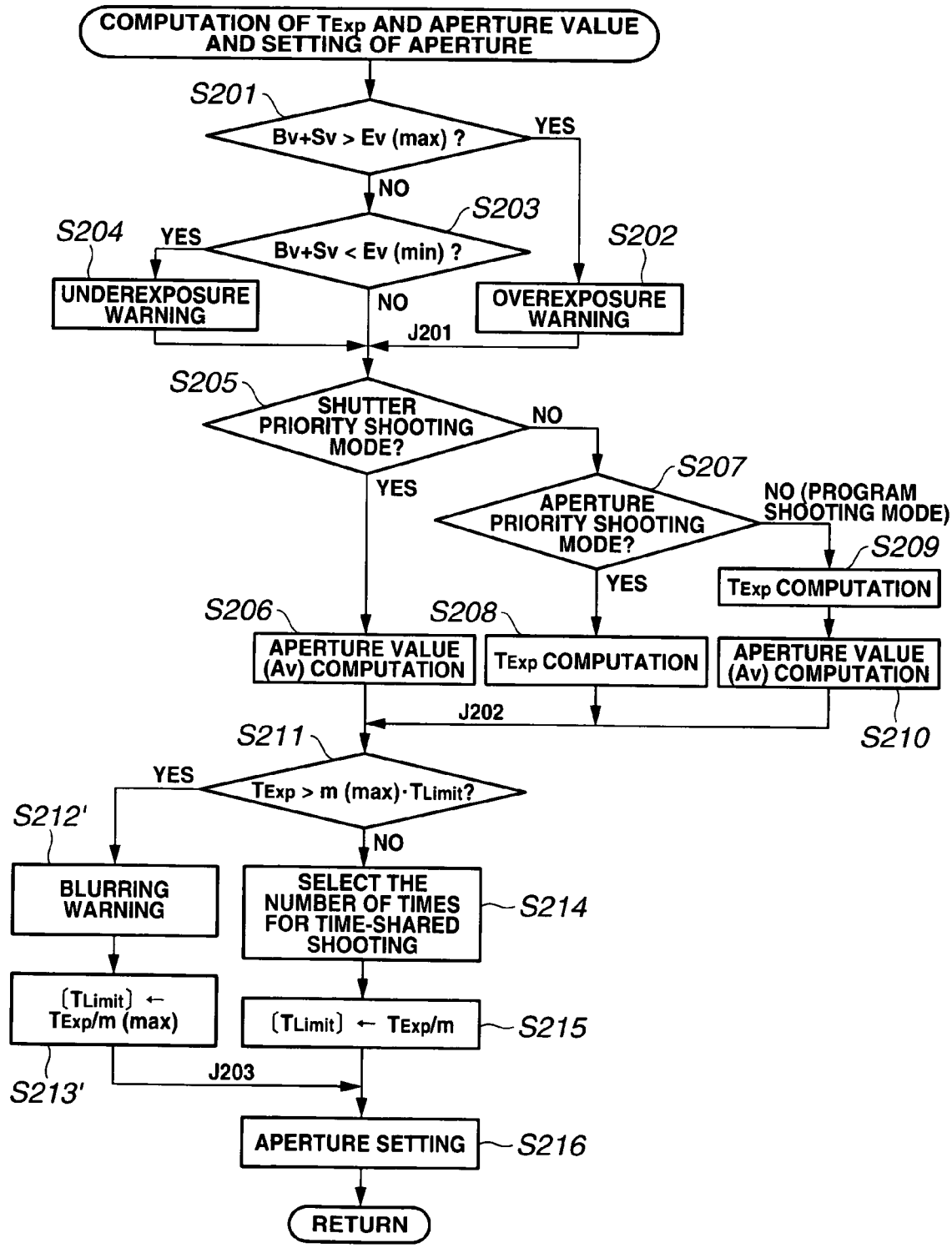
FIG. 15 is a flowchart showing another example of the subroutine for computation of TExp and aperture value and for aperture setting, in Embodiment 1.

FIG. 15 shows a modified example for improving such matters. FIG. 15 is a flowchart showing other example of the subroutine for computation of TExp and aperture value and for aperture setting. For those parts in FIG. 15 which are same as the process shown in FIG. 14, the same reference numerals are applied but explanations therefor are omitted.

If it is determined in the step S211 that TExp>m(max) TLimit is established, blurring warning display is performed by the liquid crystal display portion 12 (step S212'). This blurring warning display is to alert that there is a possibility that blurring occurs. It should be noted that when blurring warning display is performed, a warning beep may further be issued via the unshown speaker or the like.

Next, TExp/m(max) is stored in the memory [TLimit] which stores the blurring limit exposure time TLimit (step S213'). Thereafter, the process proceeds to J203.

By performing such a process shown in FIG. 15, the photographer can perform shooting with the intended shooting mode. Moreover, shooting can be performed with blurring warning display and the high shutter speed at which maximum blurring does not occur (i.e. the shutter speed obtained by dividing the exposure time TExp by the maximum value (max) of m), thus blurring is expected to be suppressed to a satisfying level.

In the flowcharts shown in FIG. 14 and FIG. 15, in the step S214 an optimum m is selected from among the time-shared shooting times m which are previously stored in the memory. However, a predetermined large value (m=10, for example) may be taken as one type of the value for m, and the blurring limit exposure time TLimit may be set to TExp/m. In this manner, it is only necessary to set the value of the substrate voltage VSUB controlling the accumulated charge amount Q(max) of the photodiodes 32, for the normal shooting and for the time-shared shooting. Accordingly, management of the characteristics of the image-capturing device becomes simple, contributing to improvement of the yield of the image-capturing device, and the configuration of the image-capturing device can be made simple.

As described above with reference to FIG. 14 or FIG. 15, in the present embodiment, when the computed exposure value is a value which cannot be controlled by the digital camera, the over exposure warning or under exposure warning is displayed accordingly. Furthermore, as described above with reference to FIG. 14 and FIG. 16, even when the shooting mode of the digital camera is set to any of the shutter priority shooting mode, aperture priority shooting mode, program shooting mode, camera shake can be prevented. Also when the computed exposure time is longer than an upper limit exposure time at which the possibility of the occurrence of camera shake can be ignored (when the shutter speed is low), warning display is performed in advance to notify the photographer to shoot with the camera shake prevention priority shooting mode. In this manner, camera shake can be prevented without causing confusion to the photographer.

Returning to the description of FIG. 13, after returning from the subroutine of the step S104 described above, next, it is determined whether the second release switch 18b is closed (step S105). Here, if the second release switch 18b is not closed, as long as the first release switch 18a is closed, the process is diverted to J102 to repeatedly perform the processes of the step S102 through S105 and wait for the second release switch 18b to be closed.

In this manner, if it is determined in the step S105 that the second release switch 18b is closed, an initial value "0" is stored in a memory [n] for storing n, which is the number of times that exposure is actually performed at the blurring limit exposure time TLimit (step S106). It should be noted that [ ] means the memory for storing the data in the parentheses. Therefore, [n] means the memory which stores a variable n in the parentheses.

Next, exposure is started (step S107) the substrate application high voltage pulse VSUB for forcibly ejecting the charges accumulated in the photodiodes 32 to a semiconducting substrate (substrate=longitudinal overflow drain VOFD) is repeatedly applied to the image-capturing device 1 as shown in FIG. 10. The point of time at which application of the high voltage pulse VSUB is ended and at which the value of the VSUB is set to a value (VSUB' shown in FIG. 8) corresponding to the abovementioned m is the point of time for starting exposure in the step S107.

Next, it is determined whether one time time-shared exposure is ended (step S108). Here, until one time of the time-shared exposure is ended, the process is diverted to J103 to wait until the time-exposure ends.

Further, when the one time time-shared exposure is ended, it is determined whether an absolute value |Px−Px0| of the blurring amount in the X direction from an exposure starting position described hereinafter, or an absolute value |Py−Py0| of the blurring amount in the Y direction from the exposure starting position is larger than a predetermined value a which is set in advance (step S118).

If it is determined that either one of the absolute values is larger than the predetermined value α, exposure is ended and a flag FLG is set to 1 (step S119), and thereafter the process proceeds to a process of a step S112 described hereinafter where reading of an image is performed. Since the effective region of an image in which blurring is corrected normally becomes narrow when the blurring amount is larger than predetermined amount, thus the time-shared shooting is ended to secure an effective region of a predetermined size. This is described hereinafter in detail.

The flag FLG which is set in the step S119 is set to 0 in advance when shooting is started. Setting the FLG to 1 indicates that a time-shared shooting is ended before the number of time-shared exposures reaches the defined value m.

Further, in step S118, if it is determined both of the |Px−Px0| and |Py−Py0| are equal to or less than α, a subroutine, "pixel value composition" (see FIG. 22), for combining an image obtained in the time-shared shooting is executed (step S109).

Figure 19:
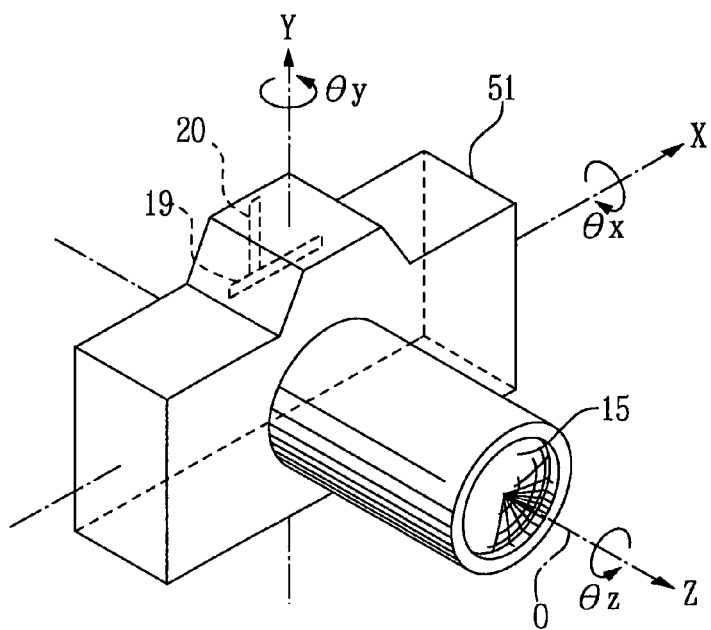
FIG. 19 is a figure showing coordinate axes and arrangement of two angular speed sensors, which are set in the digital camera, in Embodiment 1.
Figure 20:
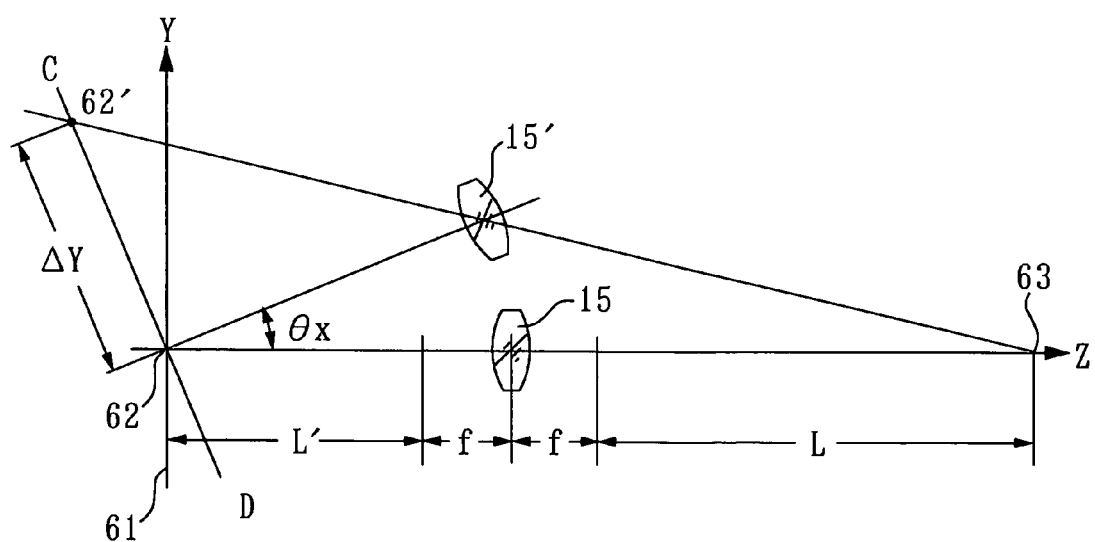
FIG. 20 is a figure showing a moving state of an image of a subject on an image-capturing area when the camera main body is moved a rotational angle θx, in Embodiment 1.
Figure 21:
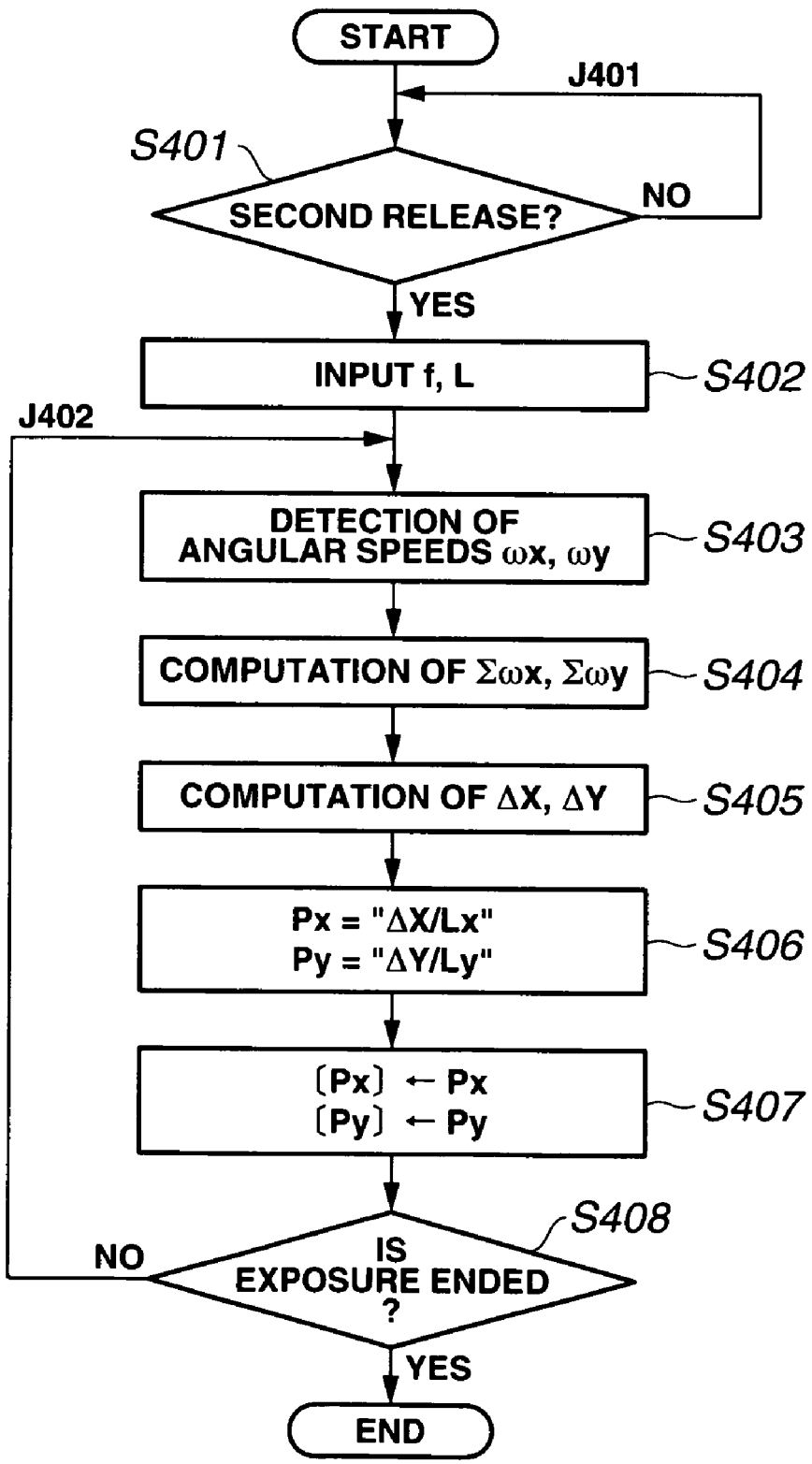
FIG. 21 is a flowchart showing a flow of a process for computing movement amounts ΔX, ΔY by means of a CPU, in Embodiment 1.

Before explaining the subroutine for pixel image composition, FIG. 19 through FIG. 21 are used for describing detection of blurring amount in the digital camera. First of all, FIG. 19 is a figure showing coordinate axes and arrangement of two angular speed sensors, which are set in the digital camera.

In FIG. 19, X-axis, Y-axis, and Z-axis at a certain time are set such that the normal direction of the Z-axis is the subject side along the optical axis O of the shooting lens 15, the normal direction of the X-axis is the right side of the digital camera in an image-capturing area perpendicular to the Z-axis when looking at the digital camera from the subject side in the horizontal direction, and the normal direction of the Y-axis is an upward direction of the digital camera, which runs through the intersection of the Z-axis with the X-axis and is perpendicular to the Z-axis and the X-axis. Rotational angles around the X-axis, Y-axis, and Z-axis are θx, θy, and θz respectively. The optical axis O of the shooting lens 15 matches the Z-axis at the above-described certain time, but when blurring occurs at other time, the optical axis O of the shooting lens 15 normally does not match the Z-axis.

A camera main body 51 of this digital camera is provided with the angular speed sensor 19 and the angular speed sensor 20 as described above.

The angular speed sensor 19 is for detecting angular speed which is an amount of change per unit time of the rotation angle θx around the X-axis.

The angular speed sensor 20 is for detecting angular speed which is an amount of change per unit time of the rotation angle θy around the Y-axis.

These two angular speed sensors 19, 20 are provided so as to be arranged in relation to the abovementioned X-axis, Y-axis, and Z-axis of the digital camera as shown in FIG. 19.

A detection signal which is output from each of the two angular speed sensors 19, 20 is converted into digital data by each of the A/D converters 21, 22, and then input to the CPU 7.

The CPU 7 acquires information related to the focal distance f from the shooting lens 15 (for example, if the shooting lens 15 is a power zoom lens, the information is acquired via the lens drive system 14, or if the shooting lens 15 is an interchangeable lens tube, the information is acquired via a communication contact point or the like).

Furthermore, the CPU 7 acquires subject distance information from the distance detection portion 23.

The information related to the focal distance f and the subject distance information are used in computation of blurring amount in the X direction and computation of blurring amount in the Y direction, as described hereinafter.

Next, the relationship between the blurring amount and blurring correction amount is described with reference to FIG. 20. FIG. 20 is a figure showing a moving state of an image of a subject 63 on an image-capturing area when the camera main body 51 is moved by the rotational angle θx.

If the digital camera is rotated by the rotational angle θx by shaking the digital camera, the shooting lens 15 is rotated and moved to a position shown by a reference numeral 15', and an image-capturing area 61 of the image-capturing device 1 also is rotated to a C-D area which is inclined by the angle θx.

Further, the image of the subject 63 which is positioned on the center position shown by a reference numeral 62 when blurring does not occur is moved to a position shown by a reference numeral 62' on the image-capturing area C-D after digital camera is shaken by the rotational angle θx.

Here, the geometrical positional relationship shown in FIG. 20 and an image formation formula of Newton shown in the following Equation 2 are used in which the focal distance of the shooting lens 15 is f, the distance between the focal point of the object space of the shooting lens 15 and the subject 63 when blurring does not occur is L, the distance between the focal point of the image space of the shooting lens 15 and an image position when blurring does not occur is L', and the amount of movement of the image position due to blurring is ΔY, whereby the movement amount ΔY is computed as shown by Equation 3.

$$L \cdot L' = f^2 \qquad \text{Equation 2}$$

$$\Delta Y = (1+\beta)^2 \cdot \theta_x \cdot f \qquad \text{Equation 3}$$

Here, β indicates a shooting magnification, and is f/L. Further, when performing computation of Equation 3, θx is a minutely small amount, thus approximation is performed until the first order of θx is reached.

The value of f in Equation 3 is input as lens information to the CPU 7 as described above. Further, the distance L which is required for computing β can be computed on the basis of information from the distance detection portion 23 shown in FIG. 1 (or the distance L may be obtained from the delivery of the shooting lens 15 when focusing the digital camera on the subject). Moreover, the angle θx in Equation 3 can be computed on the basis of the output from the angular speed sensor 19 described above.

By performing practical correction in relation to the movement amount ΔY obtained on the basis of Equation 3, even if the digital camera is shaken, an image related to the image signal output from the image-capturing device 1 can be prevented from being affected by the shaking of the digital camera.

As described above, since the angle θx is a minutely small amount, even if the image-capturing area C-D shown in FIG. 20 is tilted by the angle θx with respect to the Y-axis around the X-axis, the influence of the tilted image-capturing area on the image is not a problem, but the image may be affected by the movement amount ΔY.

Further, as with Equation 3, the movement amount ΔX of the image position at the time when blurring occurs by the rotational angle θy around the Y-axis is obtained as shown in the following Equation 4.

$$\Delta X = (1+\beta)^2 \cdot \theta_y \cdot f \qquad \text{Equation 4}$$

By differentiating the both sides of Equation 3 with respect to time, the following Equation 5 is obtained.

$$\frac{d(\Delta Y)}{dt} = (1+\beta)^2 \cdot f \cdot \frac{d\theta_x}{dt} \qquad \text{[Equation 5]}$$

In this Equation 5, d(θx)/dt in the right-hand side is the angular speed around the X-axis, thus an output of the angular speed sensor 19 can be used as is. Moreover, d(ΔY)/dt in the left-hand side in Equation 5 is image moving speed Vy in the Y-axis direction when an angular speed of d(θx)/dt is generated.

Similarly, regarding the movement amount ΔX of the image position in the X-axis direction at the time when blurring occurs by the rotational angle θy around the Y-axis, the following Equation 6 is obtained by differentiating the both sides of Equation 4 with respect to time.

$$\frac{d(\Delta X)}{dt} = (1+\beta)^2 \cdot f \cdot \frac{d\theta_y}{dt} \qquad \text{[Equation 6]}$$

In this Equation 6, d(θy)/dt in the right-hand side is the angular speed around the Y-axis, thus an output of the angular speed sensor 20 can be used as it is. Moreover, d(ΔX)/dt in the left-hand side in Equation 6 is image moving speed Vx in the X-axis direction when an angular speed of d(θy)/dt is generated.

Now, if the output d(θx)/dt of the angular speed sensor 19, which is detected at predetermined time ΔT (ΔT is a sampling interval at which the A/D converters 21, 22 convert the outputs from the angular speed sensors 19, 20 into digital signals, and is preferably same as or shorter than the blurring limit exposure time TLimit) intervals, is ωx1, ωx2, ωx3, ..., ωx(n-1), ωxn, the movement amount ΔY of the image position in the Y-axis direction after a time n×ΔT elapses is obtained as shown in the following Equation 7.

$$\Delta Y = (1+\beta)^2 \cdot f \cdot \Delta T \cdot \sum_{k=1}^{n} \omega_{xk} \qquad \text{[Equation 7]}$$

Similarly, if the output d(θy)/dt of the angular speed sensor 20, which is detected at each predetermined time ΔT (at the predetermined time ΔT intervals), is ωy1, ωy2, ωy3, ..., ωy(n-1), ωyn, the movement amount ΔX of the image position in the X-axis direction after the time n×ΔT elapses is obtained as shown in the following Equation 8.

$$\Delta X = (1+\beta)^2 \cdot f \cdot \Delta T \cdot \sum_{k=1}^{n} \omega_{yk} \qquad \text{[Equation 8]}$$

Blurring of two images which are exposed at time intervals of n×ΔT by the image-capturing device 1 can be computed by Equation 7 and Equation 8. Therefore, on the basis of the movement amounts (blurring amounts) ΔX, ΔY computed in these equations, addition is performed after moving pixel charges so as to correct the blurring of the two images, whereby an image after blurring correction can be generated.

FIG. 21 is a flowchart showing a flow of a process for computing movement amounts ΔX, ΔY by means of a CPU 7. This process is executed independently of the processes shown in FIG. 13 and the like, until exposure is ended after the second release switch 18b is closed.

Specifically, when this process is started, first, closure of the second release switch 18b is waited (specifically, the process is diverted to J401 until the second release switch 18b is closed) (step S401).

When it is detected that the second release switch 18b is closed, next, the focal distance f of the shooting lens 15 and the subject distance L are input (step S402). The focal distance f and the subject distance L may be computed in the process shown in FIG. 21. However, in order to compute blurring amount at higher speed cycle, the focal distance f and the subject distance L may be computed using other processor or the like, and the CPU 7 may input thus obtained computed data in the step S402. Accordingly, high-speed processing can be achieved, and high follow-up characteristics for real time can be obtained.

Next, the CPU 7 reads the outputs of the angular speed sensors 19, 20 via the A/D converters 21, 22, and thereby inputs the angular speeds ωx, ωy (step S403).

Then, the input angular speeds ωx, ωy are added to the cumulative added values of up to the previously detected value, whereby the cumulative added values Σωx, Σωy of up to the value detected this time are computed (step S404).

The cumulative added values Σωx, Σωy computed in the step S404 are substituted in Equation 7 and Equation 8 described above, whereby the movement amounts ΔY, ΔX of the image positions after the point of time when shooting of the first time-shared image of the plurality of time-shared images is ended are obtained (step S405).

Subsequently, Px="ΔX/LX" and Py="ΔY/Ly" are computed (step S406). It should be noted that Lx, Ly respectively represent the X direction, Y direction of one pixel 31 shown in FIG. 2, and the inside of " " means an integer value obtained by rounding off to the nearest whole number. Therefore, Px, Py are values in which the movement amounts ΔX, ΔY of the image position after the point of time when shooting of the first time-shared image is ended are expressed in pixel unit.

Next, the Px, Py are stored in corresponding memories [Px] [Py] (step S407). As described above, [ ] means the memory for storing the data in the parentheses.

Thereafter, it is determined whether exposure at the exposure time TExp is ended (step S408), and if the exposure is not ended, the process is diverted to J402 and the same process from the step S403 is repeatedly executed.

On the other hand, if it is determined in the step S408 that the exposure is ended, this process is finished.

Figure 22:
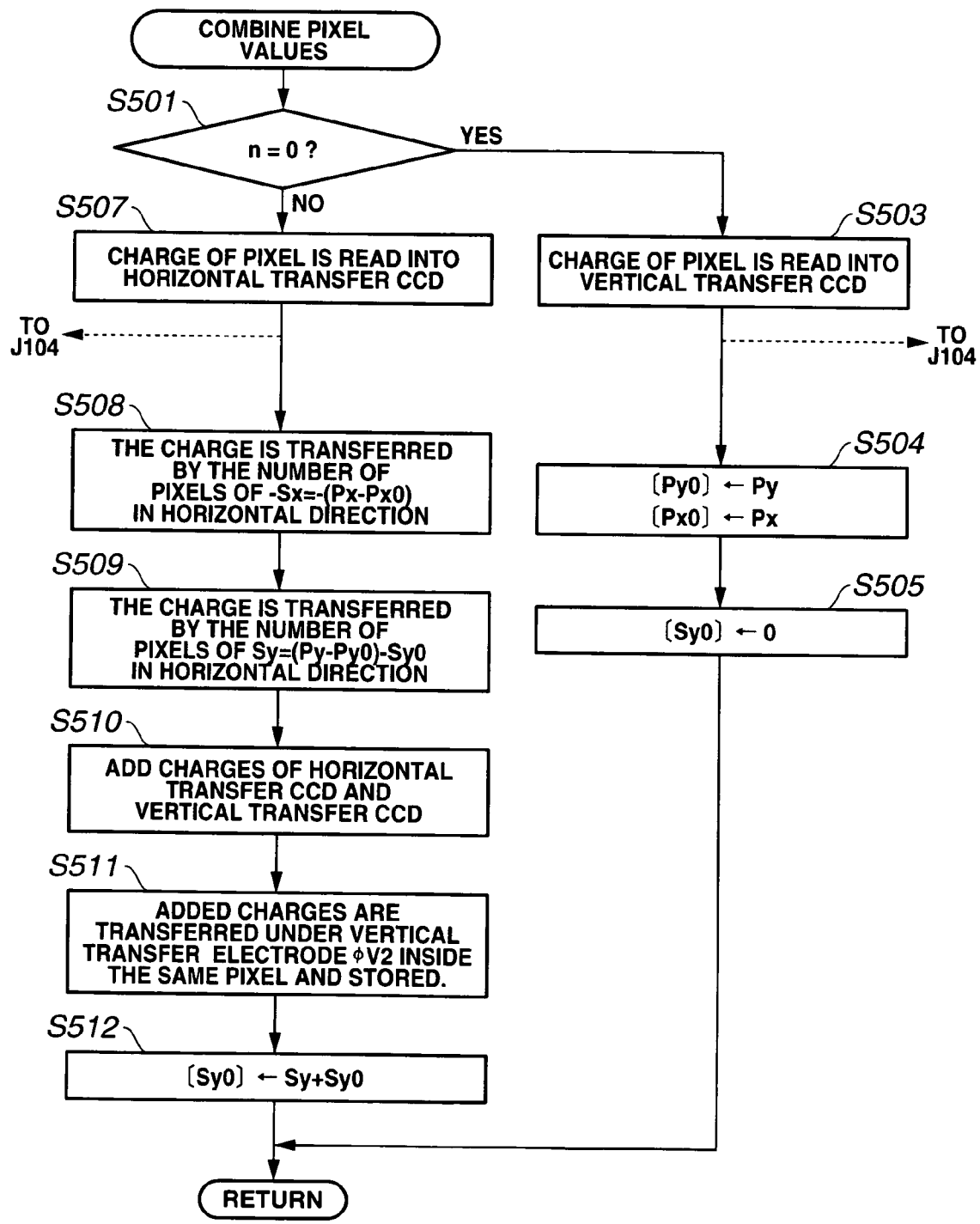
FIG. 22 is a flowchart showing a subroutine for pixel value composition in Embodiment 1.

Next, FIG. 22 is a flowchart showing a subroutine for pixel value composition.

When this process is started in the step S109 of FIG. 13, first, it is determined whether the number of times n that exposure is performed by the blurring limit exposure time TLimit is 0 (step S501).

Here, if n is 0, the transfer pulse of VH (15V) is applied to the vertical transfer electrode φV2, whereby charge of each pixel (specifically, each photodiode 32) of the image-capturing device 1 is read into the vertical transfer CCD 34 (step S503). A dashed arrow shown next to the step S503 is directed to J104 of FIG. 13 and indicates that readout of the charges accumulated in the photodiodes 32 is completed and at the same time the next exposure is automatically started.

Subsequently, the Py, Px are stored in the memories [Py0], [Px0] respectively, and new values Py0, Px0 are obtained (step S504). These Py0, Px0 are the blurring amounts Py, Px from when the CPU 7 starts inputting the angular speeds ωx, ωy until immediately after the first exposure is started by the photodiodes 32, and are expressed in pixel unit (the values stored in the memories [Px], [Py] in the step S407 of FIG. 21). Specifically, the Py0, Px0 are offset amounts at the time of the start of exposure.

Then, cumulative added value of the corrected amount of the blurring in the Y direction up until when the final (previous) time-shared exposure of the plurality of exposure operations is performed is stored in a memory [Sy0] (step S505).

On the other hand, if n=0 is not established in the step S501, transfer pulse of VH (15V) is applied to the horizontal transfer electrode φH2, whereby charge of each pixel (specifically, each photodiode 32) of the image-capturing device 1 is read into the horizontal transfer CCD 333 (step S507). A dashed arrow shown next to the step S507 is directed to J104 of FIG. 13 and indicates that readout of the charges accumulated in the photodiodes 32 is completed and at the same time the next exposure is automatically started.

Next, the image which is read out in the step S507 is transferred in the horizontal (X) direction by the number of pixels of −Sx (=−(Px−Px0)) (see FIG. 3) (step S508). Here, (Px−Px0) is blurring amount in the X direction from immediately after the start of the first exposure (specifically, offset amount is eliminated). A minus sign is provided in the equation showing the number of transfer pixels, because, by moving pixel charges in a direction opposite to the direction of blurring, new pixel charges to be read out are brought close to the pixel charges which have been added so far (see FIG. 3).

Moreover, the past added images are transferred in the vertical (Y) direction by the number of pixels of Sy (=(Py−Py0)−Sy0) (see FIG. 3) (step S509). Here, (Py−Py0) is blurring amount in the Y direction from immediately after the start of the first exposure (specifically, offset amount is eliminated), and Sy0 is blurring correction amount (cumulative blurring correction amount) in the Y direction which is obtained by performing correction from immediately after the start of the first exposure until the last time-shared exposure. Therefore, in the step S509, the difference between the amount of blurring in the Y direction from immediately after the start of the first exposure to the time-shared exposure of the present time, and the amount of blurring which is actually corrected by the last time-shared exposure, is the corrected amount related to the time-shared exposure of the present time. By employing such computation method, accumulation of computation errors can be prevented, compared to the case in which, of two continuous exposure operations, the blurring amount of the second image is obtained based on the blurring amount of the first image to perform blurring correction. As described above, in the computation of the step S406, since the value is rounded off to obtain a value in pixel unit, it is effective to employ the process shown in the step S509.

It should be noted that in the process described here, the image related to the first time-shared exposure and the added images which are successively added to the above image are not essentially moved from the same vertical transfer CCD 34 (these images are not moved to the horizontal transfer CCD 33, or to other vertical transfer CCD 34), thus, in the step S508, it is not necessary to compute the cumulative blurring correction amount (for example, Sx0) up to the last exposure, which corresponds to Sy0 described in the step S509.

The processes of the steps S508, S509 are for correcting blurring which is the integral multiple of one pixel, and adding two images. However, a single panel color image-capturing device, i.e. an image-capturing device having mosaic color filters on the front side of the image-capturing area, requires to be devised so that color signals are not combined with each other. For example, in the case of Bayer-arranged color filter, a mosaic filter in unit of 2×2 color filter is repeatedly arranged, thus signals of different colors are added up if blurring of the odd-number pixels are corrected and added up, whereby normal colors cannot be realized. Therefore, in order to solve such a problem, the minimum repetition cycle in the horizontal direction and the minimum repetition cycle in the vertical direction of the color filters (two pixels for each cycle in the case of the Bayer arrangement) may be taken as the minimum unit to transfer (or shift) an image, whereby blurring is corrected. Now, in the example of the Bayer arrangement, the blurring correction amount in the vertical direction may be taken as 2·"Sy/2", and the blurring correction amount in the horizontal direction may be taken as 2·"Sx/2". Here, Sx, Sy are values obtained in the steps S508, S509 described above.

Next, the image stored in the vertical transfer CCD 34 and the image stored in the horizontal transfer CCD 33 are transferred to under the transfer electrode φH0 (or the transfer electrode φV0) (specifically, intersection of the horizontal transfer CCD 33 and the vertical transfer CCD 34), whereby the two images are added up (step S510).

Subsequently, the added charges are transferred to under the vertical transfer electrode φV2, which is the charge holding portion inside the same pixel, and stored (step S511). This transfer and storage is performed in this manner in order to prevent the added up charges from interacting with the charges inside the horizontal transfer CCD 33, since, as described above, the transfer electrode φV0 and the horizontal transfer electrode φH0 are used in common.

Then, the transfer amount Sy and the past transfer amount Sy0 are added up and stored in the memory [Sy0], whereby the value obtained in this addition is taken as a new Sy0(step S512). Accordingly, the cumulative added values of the transfer amount in the Y direction up until the final (previous) time-shared exposure are stored in the memory [Sy0].

When the process of this step S512 or of the step S505 is ended, the process returns to the main routine shown in FIG. 13 from this subroutine for pixel value composition.

It should be noted hat in the step S503 shown in FIG. 22, the charges of the pixels related to the first time-shared exposure are read into the vertical transfer CCD 34, but instead, the charges of the pixels may be read into the horizontal transfer CCD 33 first, and thereafter transferred to under the vertical transfer electrode φV2 of the vertical transfer CCD 34 in the same pixel and stored temporarily. Even when such a process is carried out, the same operation as described above can be performed for the second and the following time-shared exposures. Therefore, in the configuration shown in FIG. 6, the two electrodes φH2 and φV2 are provided as the electrodes capable of reading out the charges of the photodiodes 32, but only either one of the electrodes φH2 and φV2 may be configured as the electrode capable of reading out the charges of the photodiodes 32.

Moreover, in the example shown in FIG. 22, of the two image, the image which is shot previously is stored in the vertical transfer CCD 34, the image which is shot at present time is stored in the horizontal transfer CCD 33, and the both images are shifted relatively by a predetermined amount and added up, whereby an image with corrected blurring is generated. However, the roles of the horizontal transfer CCD 33 and the vertical transfer CCD 34 may be switched so that, of the two image, the image which is shot previously is stored in the horizontal transfer CCD 33, and the image which is shot at present time is stored in the vertical transfer CCD 34.

Returning to the explanation of FIG. 13, once the process returns from the subroutine for pixel value composition of the step S109, n+1 is stored in the memory [n] for storing the number n of time-shared shootings which are already performed (step S110).

Then, it is determined whether the number n of time-shared shootings which are already performed is equal to the set number of time m that the time-shared showing is performed (step S1).

Here, if n=m is not yet established, the process is diverted to J103, and the process of the time-shared exposure and the process of pixel value composition are repeatedly performed as described above.

Further, if it is determined in the step S111 that n=m is established, the image signals within the vertical transfer CCD 34 are read to the outside of the image-capturing device 1 via the horizontal transfer CCD 42 and the amplifier 43 (see FIG. 12) (step S112).

Next, the image signals which are read from the image-capturing device 1 are processed by the CDS 2, and amplified by the gain control amplifier (AMP) 3, and thereafter converted into digital signals by the A/D converter 4 (step S113).

Subsequently, the image data obtained by digitalizing the image signals are subjected to a predetermined signal process by the information processing portion 8 (step S114).

The information processing portion 8 functions as the effective region extraction portion for extracting an image of a region in which blurring seems to be effectively corrected, from the image data which is output from the image-capturing device 1. An operation of the effective region extraction portion is described next.

Figure 33:
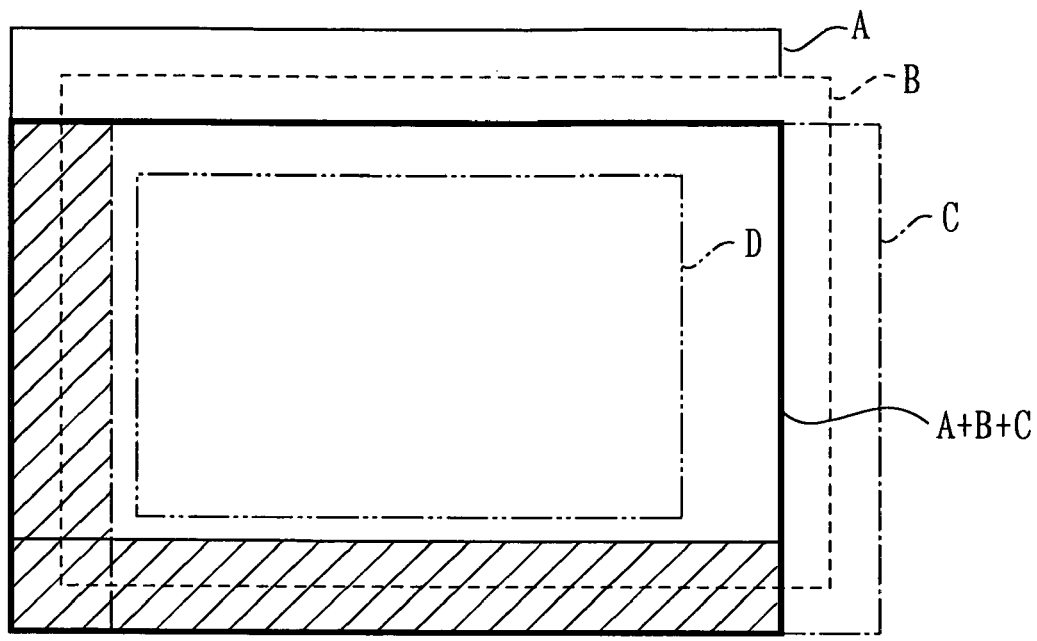
FIG. 33 is a figure showing the relationship between position of a time-shared image and a position of a composite image after blurring is corrected, in Embodiment 1.

FIG. 33 is a figure showing the relationship between position of a time-shared image and a position of a composite image after blurring is corrected. The operation of the effective region extraction portion is described with reference to FIG. 33.

Now, suppose that an image A is shot at an exposure time at which blurring can be tolerated (referred to as "time-shared image" hereinafter), and is stored temporarily in the vertical transfer CCD 34 shown in FIG. 6.

Next, suppose that a time-shared image B is shot and stored in the horizontal transfer CCD 33 shown in FIG. 6. It should be noted that relative blurring between the time-shared images A, B in FIG. 33 indicates blurring of the images.

Subsequently, the time-shared image A is transferred in the vertical direction by the vertical transfer CCD 34 so that the time-shared image B and an edge of the long side portion overlap with each other.

Then, the time-shared image B is transferred in the horizontal direction by the horizontal transfer CCD 33 so that the time-shared image A and an edge of the short side portion overlap with each other.

Thereafter, the time-shared images A, B with corrected relative positions in the vertical and horizontal directions are combined (added up) and stored in the vertical transfer CCD 34. Hereinafter, this combined image is called a composite image A+B.

Next, a time-shared image C is shot and stored in the horizontal transfer CCD 33. As with blurring correction performed in the time-shared images A, B as described above, relative blurring between the composite image A+B and the time-shared image C is corrected and subsequently combined, whereby a composite image A+B+C is generated.

When three time-shared shootings are ended, this composite image A+B+C is output from the image-capturing device 1.

As is clear from FIG. 33, the shaded region in the composite image A+B+C is a region lacking the data of at least one of the time-shared images A, B, C. Specifically, it can be considered that this shaded portion is not subjected to appropriate blurring correction. Therefore, an effective region in which blurring is corrected appropriately (for example, a region shown with a reference numeral D) needs to be extracted from the composite image A+B+C.

Now, suppose that the positive maximum value (including 0) of the blurring amount Sx in the horizontal (X) direction on the screen is Sx(max+) and the negative maximum value (including 0) is Sx(max−). Further, suppose that the positive maximum value (including 0) of the blurring amount Sy0 in the vertical (Y) direction on the screen is Sy0(max+) and the negative maximum value (including 0) is Sy0(max−). At this moment, a region in which Sx(max+) from the left end of the composite image A+B+C (however, blurring in the right direction of the screen in FIG. 33 is positive, and blurring in the left direction of the screen is negative) is eliminated, −Sx(max−) from the right end is eliminated, Sy0(max+) from the lower end (however, blurring in the upward direction of the screen in FIG. 33 is positive, and blurring in the downward direction of the screen is negative) is eliminated, and −Sy0 (max−) from the upper end is eliminated is a region obtained by adding up the pixels the number of which is equal to the number of time-shared shootings (a region in which blurring correction is performed normally). In the specific example shown in FIG. 33, for example, a composite image D is an image in which blurring is corrected normally.

Incidentally, blurring which occurs when holding a digital camera to shoot images is different every time each image is shot, hence the size of the composite image D changes for each image if some various measures are not applied. However, in such a circumstance, uniformity cannot be achieved in an obtained image, causing inconvenience in subsequent image processes. Therefore, in order to solve the above problem, each of maximum value Sx(max+), −Sx(max−), Sy0 (max+), and −Sy0(max−) is set to a predetermined value a on the presumption that all these values become the same value, and the composite image D is extracted on the basis of this predetermined value a.

Figure 34:
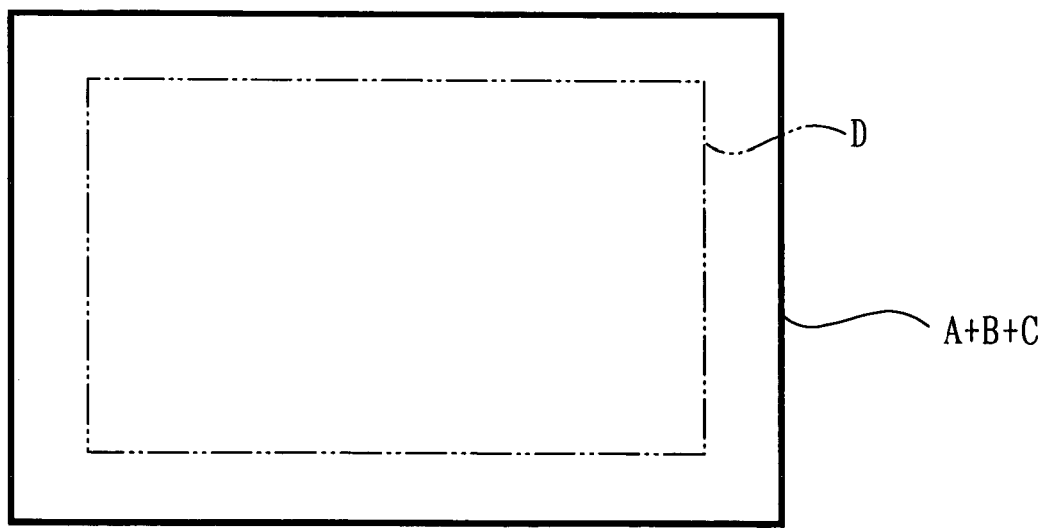
FIG. 34 is a figure showing the relationship between the composite image and an effective region in Embodiment 1.

Specifically, as shown in FIG. 34, as the composite image D of a region (effective region) in which blurring correction is considered to be executed normally, a predetermined region of the composite image A+B+C is set. Here, FIG. 34 is a figure showing the relationship between the composite image and the effective region. There is an advantage that the process becomes simple by determining the composite image D on the basis of the predetermined value a.

However, if the predetermined value a is set as a quite large value, the effective region of the composite image A+B+C becomes narrow. Therefore, how much the size of the effective region should be set is estimated next.

The visual angle at which a person having an eyesight of 1.0 can discriminate two points with the naked eye (referred to as "two-point discrimination resolving power" hereinafter) is approximately one minute of arc. If the size of blurring on an image exceeds this two-point discrimination resolving power, the person viewing the image can recognize this blurring. Therefore, the blurring limit exposure time TLimit described above becomes an exposure time in which the size of blurring on the image occurring within an exposure time becomes equal to or less than the visual angle of one minute arc of the two-point discrimination resolving power. In the technology of blurring correction according to the present embodiment, time-shared shooting is performed a plurality of times at an exposure time at which blurring equivalent to the two-point discrimination resolving power occurs, and relative blurring between images obtained in the time-shared shootings is corrected, and thereafter the images are added up. In this manner, the maximum blurring amount which can be corrected by means of this technology becomes m(max)×1 minute of arc with respect to the visual angle, where m(max) is the maximum value of the number of time-shared shootings.

Now, suppose that a shot image is printed on a cabinet-size paper (165 [mm]×120 [mm]), and this printed paper is placed 30 cm apart from a viewer and viewed. The length ΔL on the printing paper when viewed at a visual angle of m(max)×1' ("'" represents the minute of arc) is computed as follows:

$$\Delta L = m(max) \times 300 \times 2 \times 3.14 \times 1'/360 \times 60' [mm]$$

For example, if m(max) is 8, ΔL=0.7 mm. Since the amount of blurring within the blurring limit exposure time varies between individuals, it is only necessary to set ΔL as approximately 1% with respect to each full length of height and width of the printing paper (approximately 1 through 2 [mm] in the above example of the cabinet size paper), with estimation of some allowance. For the region represented by the ΔL of each edge on the right, left, top, and bottom of the screen, extraction is not performed by the effective region extraction portion. It should be noted that although an example in which m(max) is 8 is described here, more generally, it is only necessary to determine the size of the effective region in accordance with the maximum value m(max) of the number of time-shared shootings. Furthermore, FIG. 33 and FIG. 34 illustrate the blurring in an extremely exaggerated form for the purpose of clarification, thus the effective region seems quite narrow. However, since actual blurring is extremely small, it can be seen that the size of the image is hardly affected even if the effective region is extracted.

However, if the predetermined effective region D is set as described above, some photographers may cause larger-than-expected blurring, thus it is preferred that such measures are implemented. For example, when it is determined that a part of the image of the predetermined effective region D is lacking because of the large amount of blurring (specified number of time-shared shootings is not satisfied in at least a part of the effective region D), time-shared shooting is ended at that moment. Then, the composite image D is amplified in accordance with a degree which is below the specified number of time-shared shooting. At this moment, if the digital camera is set to the shutter priority shooting mode, the actual exposure time is shorter than the exposure time which is set by the photographer. However, such a case is rare, and the number of time-shared shootings below the defined number is small, thus it is considered that the actual short exposure time does not cause a problem.

Figure 35:
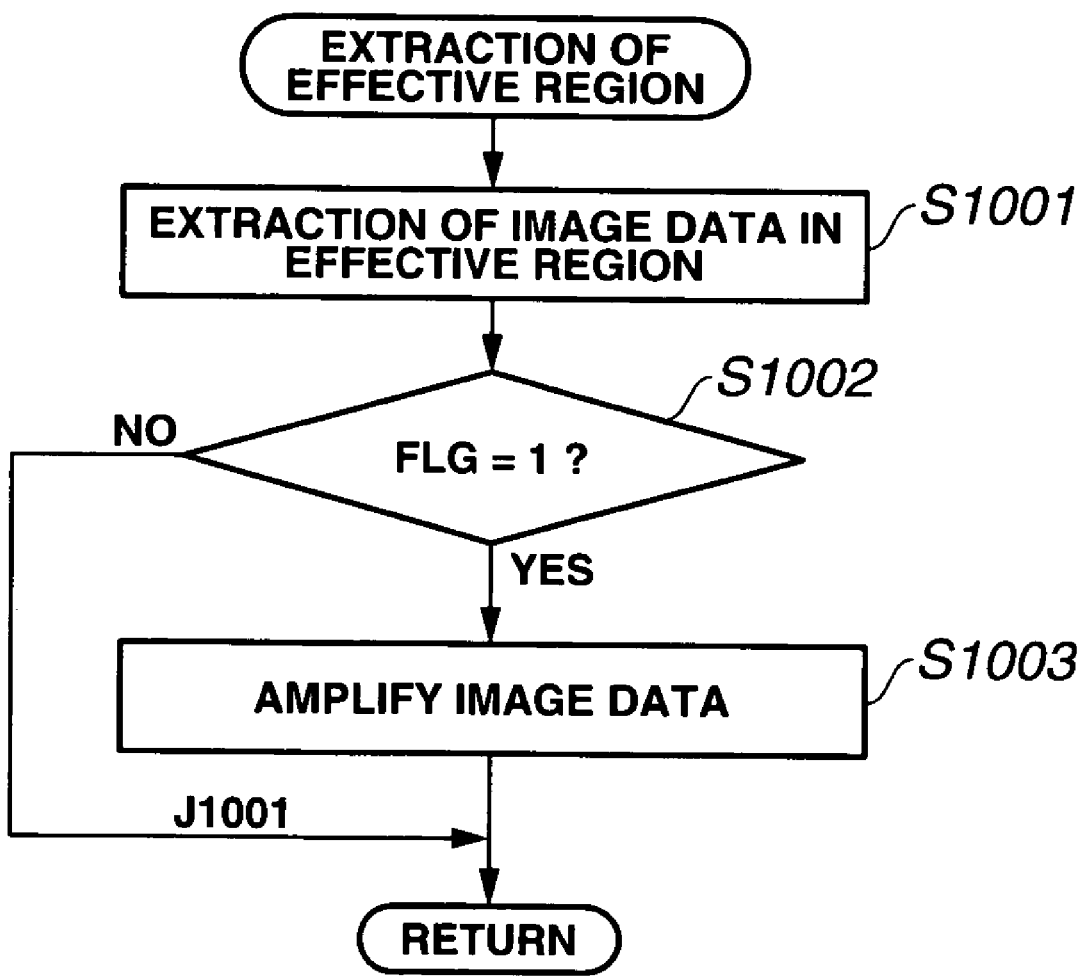
FIG. 35 is a flowchart showing a process for extracting image data of the effective region in Embodiment 1.

Next, the operation of the effective region extraction portion is described with reference to FIG. 35. FIG. 35 is a flowchart showing a process for extracting image data of the effective region. The process shown in FIG. 35 is a subroutine which is called according to need in the step S114 shown in FIG. 13.

The effective region extraction portion of the information processing portion 8 extracts image data of the previous determined region (the effective region D shown in FIG. 34) from the image data digitalized by the A/D converter 4 (corresponds to the image A+B+C shown in FIG. 34) (step S1001).

Next, it is determined whether FLG =1 is established (step S1002). This flag FLG is, as described above with reference to FIG. 13, "0" at initial setting, and is set to "1" when the number of time-shared shootings does not reach the specified value m.

Here, when FLG=1, the effective region extraction portion of the information processing portion 8 digitally amplifies the image data m/m' fold (step S1003). Here, m' is the number of times time-shared shooting is actually performed.

When the process of the step S1003 is ended or when it is determined in the step S1002 that FLG=1 is not established (in other words, when the specified number (m) of time-shared shootings is performed) (diverted to J1001), the process returns from this subroutine to the step S114 of FIG. 13, and other signal processing required in the information processing portion 8 is performed.

It should be noted that in the process of FIG. 35, the image of the predetermined effective region is extracted inside the image-capturing apparatus, but no limitation is made to the above. For example, as additional information of the image data, the abovementioned Sx, Sy0 (or even Sx, Sy and the like at the time of each time-shared shooting) are stored in the recording medium 1, and the process of extracting the image of the effective region may be performed on the basis of the information by means of other personal computer or the like.

Once the process of the step S114 of FIG. 13 is ended, next, the image data subjected to signal processing is stored temporarily in the DRAM 9 (step S115).

Thereafter, the imaged at a stored in the DRAM 9 is subjected to image compression by the compression/expansion portion 10 (step S116), the compressed image data is recorded in the recording medium 11 (step S117), and this process is ended.

It should be noted in the above description that, as described in the step S102 of FIG. 13, the blurring limit exposure time TLimit is set as a value which can be uniquely defined from the focal distance f of the shooting lens, as shown in Equation 1. However, the value shown in Equation 1 is only an average value obtained according to the empirical rules. On the other hand, the amount of blurring which actually occurs per unit of time varies according to individuals, the size of the camera, the shape of the camera, and the like. An example (modified example) of a technology which can respond to such variation is described hereinafter.

In this modified example, the blurring limit exposure time TLimit is measured before actual blurring is corrected, to perform further accurate blurring correction in consideration of the above-described variation.

Specifically, in this modified example, instead of the process of the step S102 shown in FIG. 13, a process of measuring and obtaining the blurring limit exposure time TLimit is performed. Therefore, the process of FIG. 13 excluding the step S102 is applied to this entire process, thus description thereof is omitted accordingly.

Of a time TLimit (x) required for the blurring amount in the X direction to reach a predetermined allowable blurring amount (allowable limit blurring amount) ax, and a time TLimit (y) required for the blurring amount in the Y direction to reach a predetermined allowable limit blurring amount ay, the above-described blurring limit exposure time TLimit is set as the time TLimit which is the one not longer than the other (i.e. the shorter one, if not equal).

The allowable limit blurring amounts ax, ay are described here.

A case in which an image is printed out on a printing paper and viewed is considered. Suppose that the distance between the eyes of a viewer and the printing paper is K, the width across the corners of the printing paper is Dp, and the blurring amount of the image is a distance $\Delta Dp$ on the diagonal line of the printing paper. If $\Delta Dp/K$ [radian] is equal to or less than the two-point discrimination resolving power $\Delta \phi$ of the naked eye of the viewer, that is, if $$\frac{\Delta D_p}{K} \le \Delta \phi \qquad \text{[Equation 9]}$$

is established, the blurring cannot be perceived by the eyes of the viewer viewing the printing paper.

Incidentally, suppose that the width across the corners of the image-capturing device (of the effective image-capturing region) is Di and the blurring amount on the image-capturing area of the image-capturing device (the length corresponding to the above $\Delta Dp$) is $\Delta Di$. Since the magnitude of the blurring amount on the printing paper with respect to the size of the printing paper, and the magnitude of the blurring amount on the image-capturing device with respect to the size of the image-capturing device correspond with each other, the following Equation 10 is established.

$$\frac{\Delta D_p}{D_p} = \frac{\Delta D_i}{D_i} \qquad \text{[Equation 10]}$$

Therefore, if the relationship shown in Equation 10 is used to eliminate $\Delta Dp$ from Equation 9, the following Equation 11 is obtained.

$$\Delta D_i \le \frac{D_i}{D_p} \cdot K \cdot \Delta \phi \qquad \text{[Equation 11]}$$

As is clear from Equation 11, the allowable blurring amount $\Delta Di$ on the image-capturing device is a value which is primarily determined by the size of the image-capturing device (Di) or viewing conditions (Dp, K) of the image. As with the example of the allowable blurring amount in the diagonal direction, allowable blurring amount $\Delta Xi$ of the image in the X direction and allowable blurring amount $\Delta Yi$ of the image in the Y direction on the image-capturing area of the image-capturing device can be obtained.

Now, suppose that the allowable blurring amount $\Delta Xi$ in the X direction and the allowable blurring amount $\Delta Yi$ in the Y direction are equal to each other, and $\Delta Xi=\Delta Yi=\gamma$ is established.

It should be noted that generally the two-point discrimination resolving power $\Delta \phi$ of naked eye is approximately one minute of arc, but this value is considered to be variable according to the type of the image, the form of the blurring, and individuals, thus $\Delta \phi$ may be selected accordingly in accordance with goals and objectives of the product.

Figure 23:
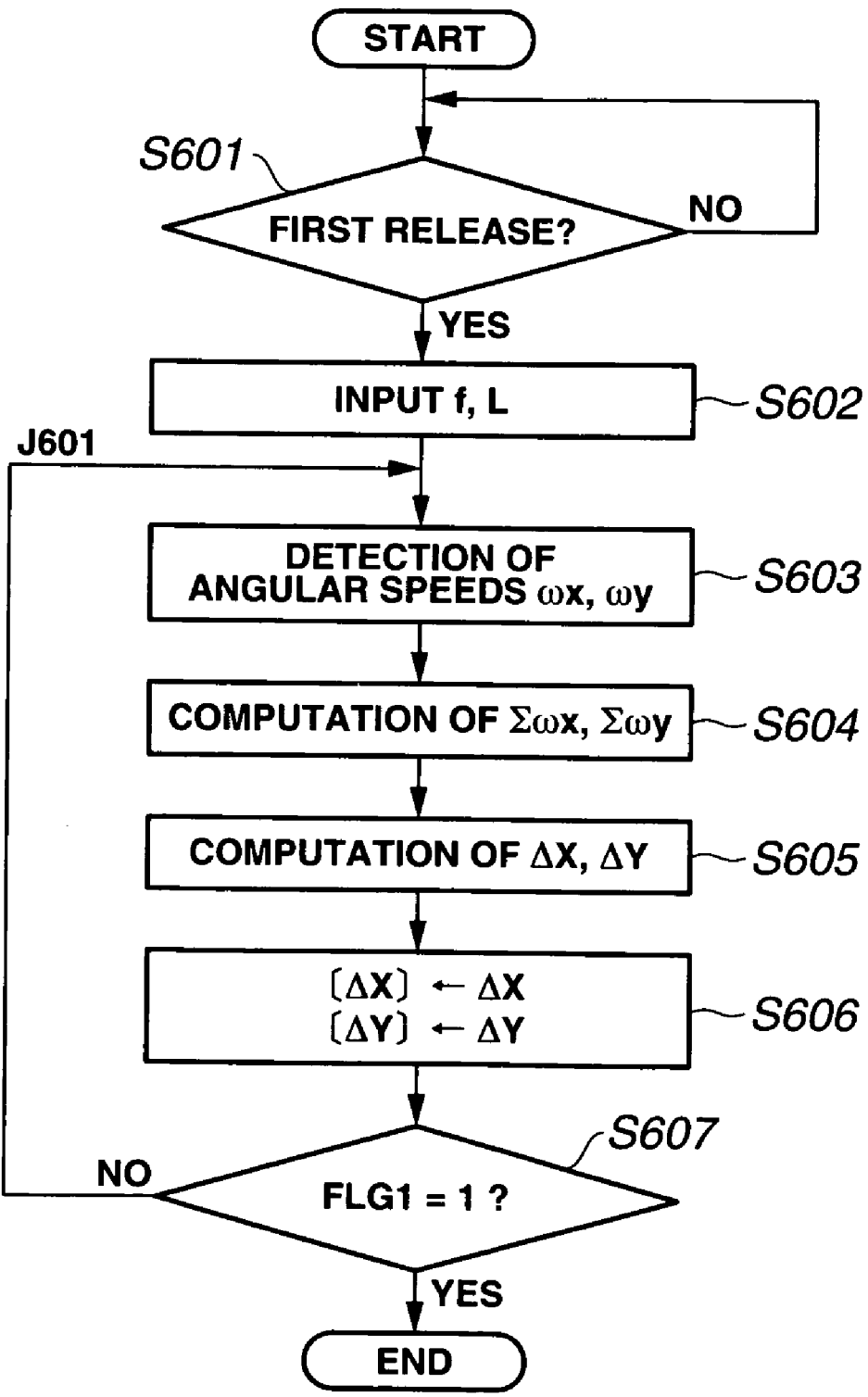
FIG. 23 is a flowchart showing a process of blurring amount computation, in Embodiment 1.

Next, a modified example of measurement of the blurring limit exposure time TLimit of each individual is described with reference to FIG. 23 and FIG. 24. FIG. 23 is a flowchart showing a process of blurring amount computation. In this description of FIG. 23, detailed descriptions of parts which overlap with those in FIG. 21 are omitted.

It should be noted that the process shown in FIG. 23 is executed independently of the processes shown in FIG. 13 and the like until FLG 1 becomes 1 after the first release switch 18a is closed.

When this process is started, first, closure of the first release switch 18a is waited (step S601).

When it is detected that the first release switch 18a is closed (that a first signal is generated), next, the focal distance f of the shooting lens 15 and the subject distance L are input (step S602). The focal distance f and the subject distance L may be computed in the process shown in FIG. 23. However, as described above, in order to compute blurring amount at higher speed cycle, the focal distance f and the subject distance L may be computed using other processor or the like, and the CPU 7 may input thus obtained computed data in the step S602. Accordingly, high-speed processing can be achieved, and high follow-up characteristics for real time can be obtained.

Processes of the subsequent steps S603 through S605 are the same as the processes of the steps S403 through S405 shown in FIG. 21.

Thereafter, $\Delta X$ computed in the step S605 is stored in a memory $[\Delta X]$, and $\Delta Y$ is stored in $[\Delta Y]$ (step S606).

Then, it is determined whether the FLG 1 is 1 (step S607). This FLG 1 is initially set to "0" in advance, when the entire process shown in FIG. 13 is started. Then, the FLG 1 is set to "1" when measurement of the blurring limit exposure time TLimit is ended, as described hereinafter with reference to FIG. 24.

If it is determined in the step S607 that the FLG 1 is not 1 (if the FLG 1 is 0), the process is diverted to J601, and computation of the blurring amount and computation of the cumulative added value described above are repeatedly performed.

On the other hand, if it is determined in the step S607 that the FLG 1 is 1, this process is ended.

Figure 24:
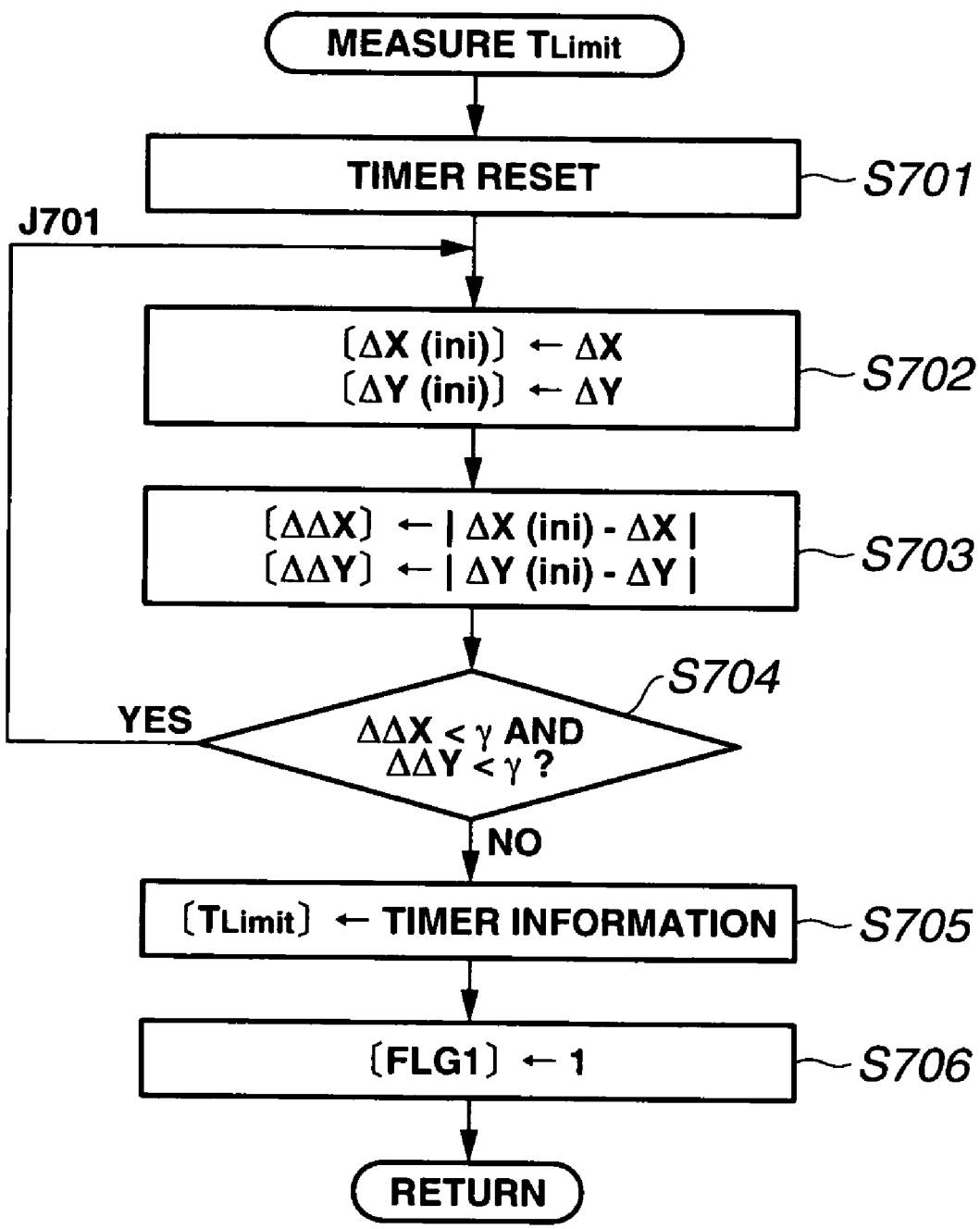
FIG. 24 is a flowchart showing a subroutine for measurement of TLimit in Embodiment 1.

Next, FIG. 24 is a flowchart showing a subroutine for measurement of TLimit. The subroutine shown in FIG. 24 is executed instead of the process of computing TLimit in the step S102 of FIG. 13.

Once this process is started, first, an unshown timer counter which is embedded in the CPU 7 is reset (step S701).

Next, $\Delta X$, $\Delta Y$ which are computed in the process shown in FIG. 23 are read out from the respective memories [$\Delta X$], [$\Delta Y$], and the values of the read $\Delta X$, $\Delta Y$ are newly stored in [$\Delta X(ini)$], [$\Delta Y(ini)$] respectively (step S702). The $\Delta X(ini)$, $\Delta Y(ini)$ are initial values of $\Delta X$, $\Delta Y$.

Subsequently, an absolute value of the difference between the $\Delta X(ini)$ and $\Delta X$ which is newly read out from the memory is obtained and then stored in a memory [$\Delta\Delta X$]. Similarly, an absolute value of the difference between the $\Delta Y(ini)$ and $\Delta Y$ which is newly read out from the memory is obtained and then stored in a memory [$\Delta\Delta Y$] (step S703).

Then, it is determined whether $\Delta\Delta X<\gamma$ and $\Delta\Delta Y<\gamma$ are established (step S704). Here, $\gamma$ is, as described with reference to Equation 9 through Equation 11 above, allowable blurring amount $\gamma$ when supposing that the X direction and Y direction are same.

If $\Delta\Delta X<\gamma$ and $\Delta\Delta Y<\gamma$, the process is diverted to J701, and the process of the step S703 is repeatedly executed. By performing this process, the blurring amount $\Delta\Delta X$ in the X direction and the blurring amount $\Delta\Delta Y$ in the Y direction from the time immediately after resetting the timer counter in the step S701 can be obtained.

In the step S704, if at least one of either $\Delta\Delta X$ and $\Delta\Delta Y$ is not under $\gamma$ (if at least one of them is equal to or more than the allowable blurring amount $\gamma$), information of the timer counter is stored in the memory [TLimit] (step S705). Therefore, this TLimit is the time required for the blurring amount to reach the allowable limit blurring amount $\gamma$, i.e. blurring limit exposure time).

Thereafter, 1 is stored in a memory [FLG 1] (step S706), and the process returns to the process shown in FIG. 13 from this process.

Further, as other modified example, a test shooting for computing the exposure time TLimit in which the abovementioned camera shake can be allowed may be performed before the photographer actually shoots the subject, the blurring limit exposure time TLimit may be computed on the basis of the blurring amount at the time of exposure and registered (stored in the EEPROM 24 or the like), and, in actual shooting, this blurring limit exposure time TLimit may be read out from the EEPROM 24 or the like and used. Moreover, a plurality of blurring limit exposure times TLimit may be obtained in the above manner, and the average value of the blurring limit exposure times may be registered. By doing so, it is no longer necessary to obtain blurring limit exposure time TLimit every time shooting is performed, and more accurate TLimit can be obtained. At this moment, it is conceivable that the same digital camera is shared by a plurality of photographers, thus blurring amount varies according to the skill of each photographer. Therefore, blurring amount may be measured and registered in advance for each photographer, and used by calling for the setting of the photographer when the digital camera is used.

In addition, as further modified example, out of the blurring amount in the X direction and the blurring amount in the Y direction within an exposure period (TExp) in actual blurring correction, the blurring amount which is not small (LBLUR) (i.e. the large one, if not equal) may be recorded, and TLimit may be obtained from the following equation:

$TLimit=TExp \cdot \gamma/LBLUR$

However, $\gamma$ is the abovementioned allowable blurring amount.

The image-capturing device 1 described above has a vertical transfer electrode and a horizontal transfer electrode for each photodiode 32 as can be seen in the configuration shown in FIG. 6, thus it is conceivable that the area occupied by the photodiode 32 becomes narrow and the sensitivity decreases. In order to improve this matter, a known photoconductive film-stacked type solid-state image-capturing device may be used as the image-capturing device. This photoconductive film-stacked type solid-state image-capturing device is a solid-state image-capturing device with a three-dimensional structure in which the photoelectric conversion function and the scan/read function can be implemented on different plane surfaces, wherein an ordinary IC technology is used to stack homogeneous photoconductive films on a silicon (Si) substrate with integrated scan portions, and photoelectric conversion is performed thereon. By employing such a configuration, the sensitivity of the photodiode can be increased.

According to such Embodiment 1, when blurring can occur in a digital camera, the exposure time is time-divided in accordance with the amount of the blurring, the blurring is corrected in response to a plurality of image signals obtained by time-sharing the exposure time, and the image signals of the corrected images are added up in the image-capturing device at high speeds in analog form, thus a complex mechanical mechanism for correcting blurring or electrical circuits outside the image-capturing device and the like are no longer required, and a high-quality image, which can respond to broad range of shutter speeds and in which blurring can be substantively ignored, can be obtained. Moreover, an image with an effective region, which is considered to be shared by all images shot in time-shared shooting, is extracted from a composite image in which blurring is corrected, a high-quality image in which blurring is corrected can be obtained easily.

At this moment, the time-shared images which are shot successively are stored in the vertical transfer register and the horizontal transfer register, and thereafter transferred using these vertical transfer register and horizontal transfer register, whereby blurring is corrected, thus regulation of the positions of the time-shared images which are successively shot can be performed at extremely high speeds.

Further, the vertical transfer register and the horizontal transfer register are respectively provided with four transfer electrodes which are applied with four-phase drive pulses for one pixel, the transfer can be performed without mixing the charges stored in the vertical transfer register with the charges stored in the horizontal transfer register.

Furthermore, as the blurring correction amount for shifting the pixel charges in the vertical direction or horizontal direction and correcting blurring, a value, which is obtained by deducting the cumulative added value of the blurring correction amount between the first time-shared exposure time and the previous time-shared exposure time (transfer amount)

from the blurring amount between immediately after the first time-shared exposure is started and the time-shared exposure of the present time, is used. Therefore, accumulation of computation errors can be prevented, and accurate blurring correction can be performed.

Moreover, if the brightness of a subject is low, the aperture opening is set large, and the accumulated charge amount of the image-capturing device at the exposure time at which the blurring amount reaches the allowable limit is set large, thus an image with good S/N in which blurring can be substantively ignored can be obtained.

At this moment, if there is a possibility that blurring may occur even when the size of the aperture opening is adjusted, the ISO sensitivity is also adjusted, blurring correction can be performed in response to a broader range of brightness of the subject.

The technology described in the present embodiment is a blurring correction technology which is capable of responding to blurring caused by change of the position of the light of the subject which enters the image-capturing area during an exposure time. Therefore, this technology is suitable in blurring correction in shooting a static image.

In addition, the above-described technology is for executing blurring correction in the image-capturing device. Therefore, there is an advantage that, by applying this technology to the main body of a digital camera with interchangeable lenses, blurring correction can be performed even when combining a conventional shooting lens having no blurring correction function with the camera with interchangeable lenses.

Furthermore, warning display is performed in the case of an exposure value at which the digital camera cannot be controlled, camera shake is prevented in any of the shooting modes, warning display is performed in advance, and the camera shake prevention priority shooting mode is set to shoot an image, when the computed exposure time is longer than the exposure time (threshold) at which camera shake may occur. Therefore, camera shake can be prevented without confusing the photographer.

Further, regardless of whether the shooting mode is the shutter priority shooting mode, the aperture priority shooting mode, or the like, blurring can be electronically corrected inside the image-capturing device while performing appropriate control of the exposure amount in which exposure control performed by each shooting mode is taken as the maximum priority, and an image in which blurring can be substantively ignored can be obtained.

Embodiment 2

FIG. 25 through FIG. 31 describe Embodiment 2 of the present invention. In Embodiment 2, the parts same as those of Embodiment 1 are applied with the same reference numerals and explanations thereof are omitted, thus only the main differences between the embodiments are described.

In Embodiment 1, the image-capturing device 1 with the configuration described with reference to FIG. 6 and the like needs to apply a significant change to the image-capturing portion of a conventional frame interline transfer CCD image-capturing device. However, the conventional frame interline transfer CCD image-capturing device has been subjected to various improvements and comprises today's excellent performance as technical outcomes which have been accomplished over the years. Moreover, various improvements have been carried out on the functions of the conventional interline transfer CCD image-capturing device by devising the configurations of the vertical transfer electrodes to perform pixel addition. Therefore, significantly improving the image-capturing portion may require a long time to solve new technical problems, which may impede the succession of the many years of technology.

Therefore, in order to solve such problems described above, in the present embodiment the configuration of the conventional interline transfer CCD image-capturing device is directly employed as the image-capturing portion, wherein only the accumulation portion is improved, and a frame interline transfer image-capturing device is put into practice.

The configuration of the entire digital camera related to the present embodiment is basically same as the one shown in FIG. 1, and operations of the entire digital camera are also basically same as those shown in FIG. 13. However, the configuration of the solid-state image-capturing device 1 is different, and, as described hereinafter with reference to FIG. 25, the content of the process of pixel value composition of the step S109 in the process shown in FIG. 13 is different in accordance with the different configuration of the solid-state image-capturing device 1. Therefore, in the present embodiment the configuration of the image-capturing device 1 and the operation of pixel value composition are mainly described, and detailed descriptions of other parts are omitted accordingly.

Figure 25:
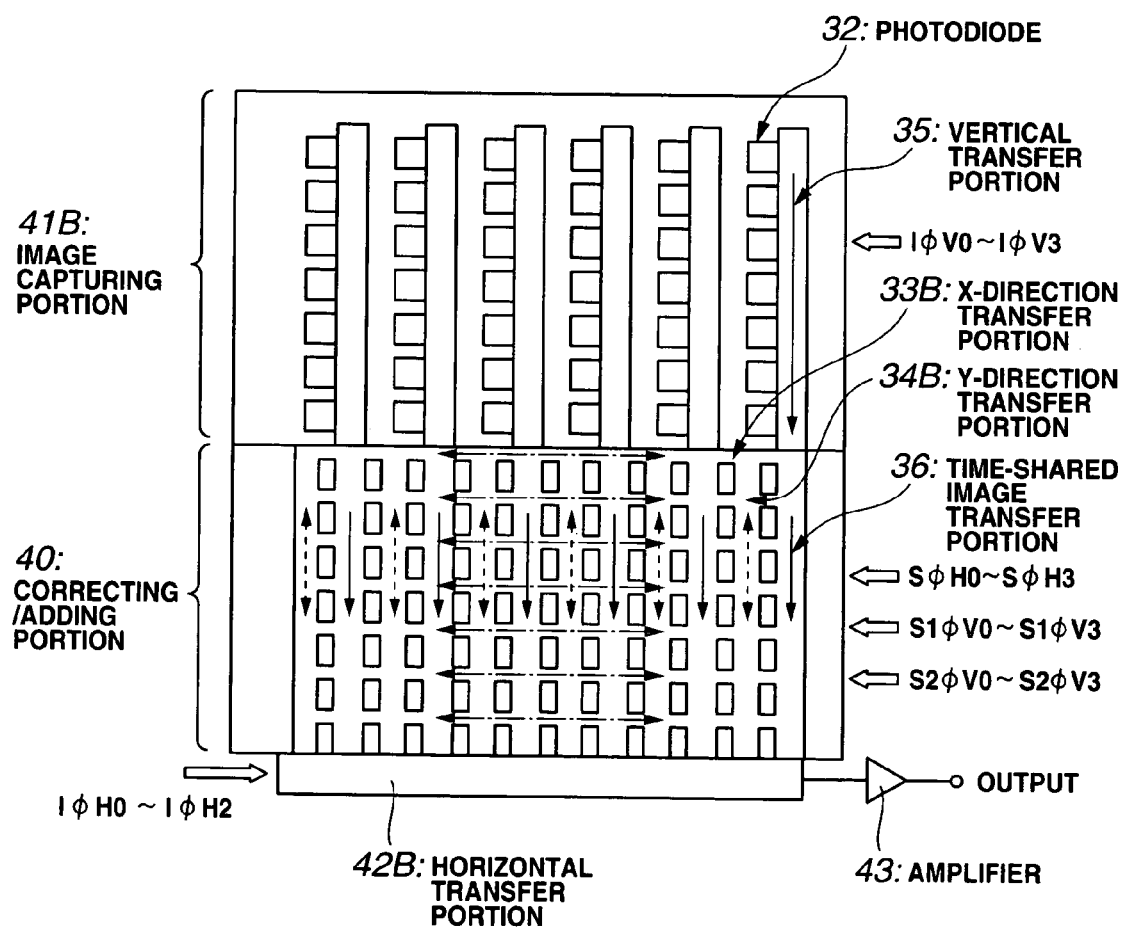
FIG. 25 is a figure showing a schematic configuration of the entire solid-state image-capturing device of Embodiment 2 of the present invention.

First of all, FIG. 25 is a figure showing a schematic configuration of the entire solid-state image-capturing device 1.

As shown in FIG. 25, the image-capturing device 1 comprises an image-capturing portion 41B, a correction/addition portion 40, and a horizontal transfer portion 42B.

The image-capturing portion 41B is a photoelectric conversion portion which converts an optical image obtained by the shooting lens 15 into an electric signal. Specifically, in the image-capturing portion 41B, a plurality of (substantively a number of) photodiodes (PD) 32 are arranged in a matrix form (see FIG. 26), and there is provided a vertical transfer portion 35 constituted by a vertical transfer CCD which is disposed in the form of a column so as to be adjacent to each column of the photodiode 32. This vertical transfer portion 35 is a charge transfer portion for transferring a charge, which is photoelectrically converted and accumulated by each photodiode 32, to the correction/addition portion 40 (=register portion) which is described hereinafter, and serves as a first transfer portion.

The correction/addition portion 40 is disposed adjacent to the image-capturing portion 41B and serves as an addition portion, a blurring correction portion, and a register portion for correcting relative blurring between a plurality of time-shared images transferred from the image-capturing portion 41B, adding up the corrected time-shared images, and storing the added images. The configuration of the correction/addition portion 40 is described in detail with reference to FIG. 26 hereinafter.

The horizontal transfer portion 42B is a read out portion and a transfer portion (second transfer portion) for reading out, to the outside of the image-capturing device 1, the images in which blurring is corrected by the correction/addition portion 40.

Signals which are read out from the horizontal transfer portion 42B are amplified in analog form by an amplifier 43.

Figure 26:
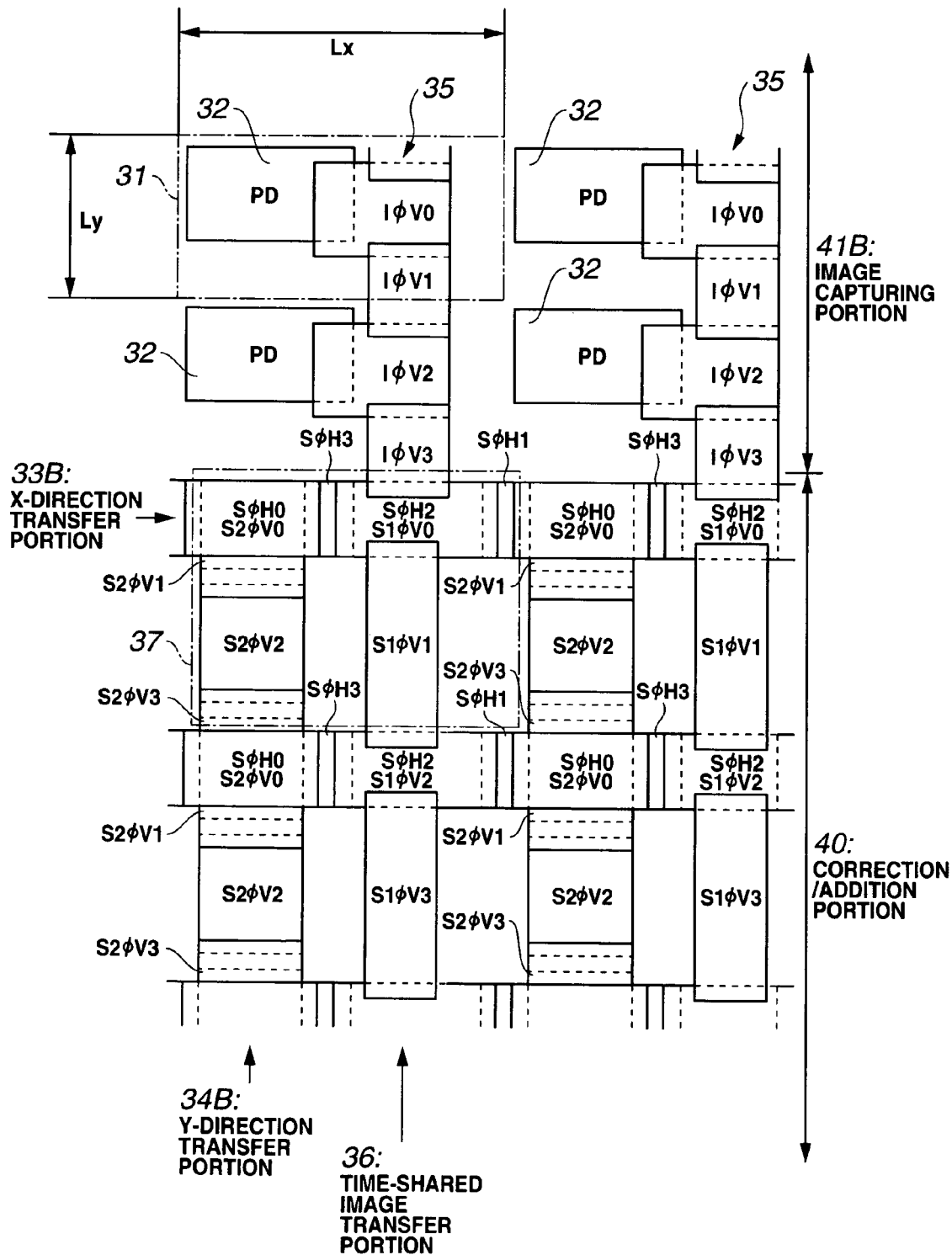
FIG. 26 is a figure showing an enlarged configuration of an image-capturing portion and of a correction/addition portion of the solid-state image-capturing device, in Embodiment 2.

As is clear from FIG. 25, the image-capturing device 1 of the present embodiment applies the frame interline transfer system (FIT system), and, as shown in FIG. 26, the image-capturing portion 41B is configured with an interline transfer system.

Next, FIG. 26 is a figure showing an enlarged configuration of the image-capturing portion 41B and of the correction/addition portion 40 of the solid-state image-capturing device 1.

It should be noted that IφV0 through IφV3, SφH0 through SφH3, S1φV0 through S1φV3, S2φV0 through S2φV3 indicate drive pulses for charge transfer as described hereinafter, and, for example, a description such as "transfer electrode IφV0" means "electrode which applies a drive pulse of IφV0".

The image-capturing portion 41B comprises the plurality of photodiodes (PD) 32 arranged in a matrix form, and the vertical transfer portion 35 for transferring charges, which are photoelectrically converted and accumulated by these photodiodes 32, to the correction/addition portion 40. Here, the vertical transfer portion 35 is constituted by including the vertical transfer electrodes IφV0 through IφV3 for applying transfer pulses.

One pixel 31 of the image-capturing portion 41B comprises one photodiode 32 and two vertical transfer electrodes. At this moment, there are two types for one pixel 31, the first one of which has the photodiode 32 and vertical transfer electrodes IφV0, IφV1, and the second one has the photodiode 32 and vertical transfer electrodes IφV2, IφV3. Regarding the size of this one pixel 31, the size in the horizontal direction (X direction) is Lx, and the size in the vertical direction (Y direction) is Ly.

Further, the correction/addition portion 40 comprises an X-direction transfer portion 33B, a Y-direction transfer portion 34B, and a divided-image transfer portion 36.

The divided-image transfer portion 36 is a transfer portion for transferring charges accumulated in the photodiodes 32 to the correction/addition portion 40, and constituted by including the vertical transfer electrodes S1φV0 through S1φV3 which are arranged in the vertical direction so as to continue to the vertical transfer portions 35 of the image-capturing portion 41B. These vertical transfer electrodes S1φV0 through S1φV3 are for applying pulses for transferring the charges transferred from the image-capturing portion 41B, to the correction/addition portion 40.

The X-direction transfer portion 33B is a transfer portion (first transfer register) for transferring, in the horizontal direction, charges transferred from the divided-image transfer portion 36, and is constituted by including the horizontal transfer electrodes SφH0 through SφH3 which are arranged in the horizontal direction so as to intersect with the divided-image transfer portion 36. These horizontal transfer electrodes SφH0 through SφH3 are for applying transfer pulses for transferring, in the horizontal direction, charges transferred to under the electrode S1φV0 electrode S1φV2 of the vertical transfer electrodes S1φV0 through S1φV3, by the amount corresponding to blurring in the X direction of the digital camera.

The Y-direction transfer portion 34B is a transfer portion (second transfer register) for adding a plurality of charges obtained by time-shared exposure, and transferring the added charges in the vertical direction, and is constituted by including the vertical transfer electrodes S2φV0 through S2φV3 which are arranged in the vertical direction so as to be adjacent to the arrays of the divided-image transfer portions 36 in the vertical direction and to intersect with the X-direction transfer portion 33B. These vertical transfer electrodes S2+V0 through S2φV3 are for storing an image obtained by adding up a plurality of time-shared images in which blurring is corrected, and for applying transfer pulses for transfer, in the vertical direction, the added images by the amount corresponding to blurring in the Y direction of the digital camera.

It should be noted that, out of the abovementioned electrodes, the electrode SφH2 is common with the electrode S1φV0 or electrode S1φV2. Further, the electrode SφH0 is common with the electrode S2φV0.

Each of the electrodes described above is constituted by polysilicon, and adjacent electrodes are disposed with an interlayer insulating layer therebetween. The adjacent electrodes are disposed so that end faces thereof are partially overlapped on each other when viewed from a direction perpendicular to the image-capturing area. In FIG. 26 the end faces of the electrodes shown with dashed lines indicate that the end face portions of the electrodes are disposed on lower portions of other electrodes.

Further, the electrodes which apply the same drive pulse are connected to each other by a predetermined wiring layer via a contact portion. However, in FIG. 26 illustration of the wiring between the electrodes is omitted to clarify the arrangement of the electrodes.

The correction/addition portion 40 comprises a plurality of registers 37 as one unit with respect to each pixel 31 of the image-capturing portion 41B, as shown by a range surrounded by dashed lines in FIG. 26 (it should be noted that, as described hereinafter, the image-capturing device 1 of the present embodiment can perform field readout suitable in shooting dynamic images, and full pixel readout suitable in shooting static images. When performing field readout, half of the registers 37 provided in the correction/addition portion 40 (same number in the horizontal direction, but half in the vertical direction) are used. On the other hand, when performing full pixel readout, all of the registers 37 provided in the correction/addition portion 40 are used.) In the register 37 as well, there are two types of electrode configurations.

First of all, a first register 37 is an electrode group having the electrodes SφH0, SφH3, SφH2, SφH1, electrodes S1φV0, S1φV1, and electrodes S2φV0 through S2φV3. Among these electrodes, the same electrode is placed on two sections as described above, thus the number of electrodes contained in the first register 37 is 8.

Moreover, a second register 37 is an electrode group having the electrodes SφH0, SφH3, SφH2, SφH1, electrodes S1φV2, S1φV3, and electrodes S2+V0 through S2φV3. Among these electrodes, the same electrode is placed on two sections as described above, thus the number of electrodes contained in the second register 37 is also 8.

Therefore, for the horizontal transfer electrodes SφH0 through SφH3 constituting the X-direction transfer portion 33B and the vertical transfer electrodes S2φV0 through S2φV3 constituting the Y-direction transfer portion 34B, all types of the electrodes are arranged one by one in either one of the first register 37 and the second register 37. Such arrangement is performed in order to prevent the charges stored under the horizontal transfer electrodes SφH0 through SφH3 and the charges stored under the vertical transfer electrodes S2φV0 through S2φV3 from interacting with one another when being transferred in accordance with blurring.

On the other hand, the vertical transfer electrodes S1φV0 through S1φV3 constituting the divided-image transfer portion 36 do not have to comprise a function of storing charges of immediately before addition (this function is performed by the X-direction transfer portion 33B and the Y-direction transfer portion 34B), only two type of electrodes are disposed in one register 37. Therefore, when one first register 37 and one second register 37 are combined to form a pair, every one of the all types of vertical transfer electrodes S1φV0 through S1φV3 constituting the divided-image transfer portion 36 is disposed. In this manner, the configurations of the electrodes can be simplified as much as possible.

The area of the electrode SφH1 and of the electrode SφH3 in the X-direction transfer portion 33B is narrower than the area of the electrode SφH0 and of the electrode SφH2, and the area of the electrode S2φV1 and of the electrode S2φV3 in the Y-direction transfer portion 34B is narrower than the area of the electrode S2ϕV0 and of the electrode S2ϕV2. Accordingly, the X-direction transfer portion 33B and the Y-direction transfer portion 34B are four-phase CCDs configured by alternately arranging the electrodes of relatively wide area and the electrodes of relatively narrow area.

At this moment, the electrode SϕH1 and the electrode SϕH3 of the X-direction transfer portion 33B are used only for charge transfer, and accumulation of the charges is performed only under the electrode SϕH0 and the electrode SϕH2. Similarly, the electrode S2ϕV1 and the electrode S2ϕV3 of the Y-direction transfer portion 34B are used only for charge transfer, and accumulation of the charges is performed only under the electrode S2ϕV0 and the electrode S2ϕV2.

By employing such uneven electrode configurations, the storage capacitor for the charges in the X-direction transfer portion 33B and the Y-direction transfer portion 34B can be enlarged, and the are of the correction/addition portion 40 can be narrowed to achieve miniaturization of the image-capturing device. Moreover, reducing the area of the substrate improves the yield of the image-capturing device at the time of production of the image-capturing device, and contributes to reduction of production costs.

It should be noted that, in order to prevent overflow of the charges in the potential well under the transfer electrode in an end portion of the X-direction transfer portion 33B and an end portion of the Y-direction transfer portion 34B, a mechanism for ejecting the charges to the drain is provided as described in Embodiment 1 (see FIG. 32). However, the same type of ejection mechanism cannot be provided on the side facing the horizontal transfer portion 42B, thus the charges, which are transferred to the end portion on the side facing the horizontal transfer portion 42B during an transfer operation for blurring correction, are ejected from an output portion of a horizontal transfer portion 42B via the horizontal transfer portion 42B.

In such a configuration, readout of pixel charges from the correction/addition portion 40 to the horizontal transfer portion 42B can be performed by means of two types of paths. Specifically, the Y-direction transfer portion 34B and the divided-image transfer portion 36 are both connected to a horizontal transfer portion 42B, and pixel charges can be transferred to the horizontal transfer portion 42B. Therefore, the first path is a path in which pixel charges are read out from the horizontal transfer portion 42B to the outside of the image-capturing device 1 via the Y-direction transfer portion 34B, and the second path is a path in which pixel charges are read out from the horizontal transfer portion 42B to the outside of the image-capturing device 1 via the divided-image transfer portion 36.

The first path is used when, as described hereinafter, transferring charges which are subjected to time-shared shooting, blurring correction, and addition, and are accumulated under the vertical transfer electrode S2ϕV2 of the Y-direction transfer portion 34B.

The second path is used when performing normal shooting and transferring the charges obtained in the normal shooting, via the divided-image transfer portion 36 in the same manner as in the normal frame interline transfer system. As described hereinafter, when performing normal shooting (only one exposure) in which a computed exposure time is shorter than the blurring limit exposure time TLimit, or when performing field readout for shooting dynamic images, the second path is used.

Then, as already described above, the transfer portion, in which the vertical transfer electrodes (S1ϕV0 through S1ϕV3) are disposed and which transfers the charges accumulated in the photodiodes PD to the correction/addition portion 40, is called "divided-image transfer portion 36". Moreover, the transfer portion, in which the horizontal transfer electrodes (SϕH0 through SϕH3) are disposed and which transfers the charges accumulated in the divided-image transfer portion 36 in the horizontal direction, is called "X-direction transfer portion 33B". Furthermore, the transfer portion, in which the vertical transfer electrodes (S2ϕV0 through S2ϕV3) are disposed and which adds a plurality of images obtained by time-shared exposure and transfers the added charges in the vertical direction, is called "Y-direction transfer portion 34B".

In addition, a vertical transfer CCD with the vertical transfer electrodes, which stores charges and transfers the charges in the vertical direction, is called "vertical transfer register". Moreover, a horizontal transfer CCD with the horizontal transfer electrodes, which stores charges and transfers the charges in the horizontal direction, is called "horizontal transfer register".

Figure 27:
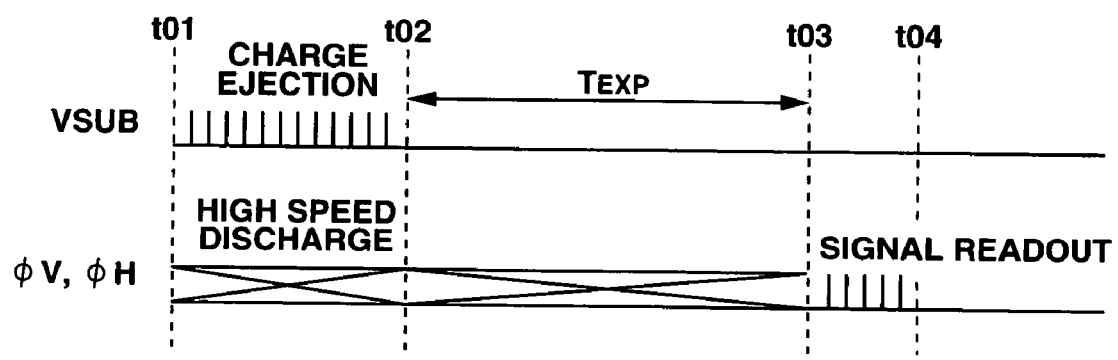
FIG. 27 is a timing chart showing a basic operation of the solid-state image-capturing device at the time of image-capturing, in Embodiment 2.

Next, FIG. 27 is a timing chart showing a basic operation of the solid-state image-capturing device 1 at the time of image capturing.

In FIG. 27, the VSUB is a substrate application high voltage pulse for forcibly ejecting the charges accumulated in the photodiodes 32 to a semiconducting substrate (substrate). Further, ϕV, ϕH are collective designations for the all transfer electrodes shown in FIG. 26.

When a shooting operation is started, a high voltage pulse is applied to the VSUB between a time t01 which is a predetermined timing to an exposure (charge accumulation) start time t02, and at the same time a high frequency transfer pulse is applied to the ϕV, ϕH. Consequently, the charges accumulated in the photodiodes 32 and the charges remaining in each of the transfer CCDs are all ejected.

Thereafter, when a signal for starting exposure operation is received, application of a high voltage pulse to the VSUB is stopped at the time t02, whereby charge corresponding to the intensity of the received light is accumulated in the photodiodes 32. Accumulation of the charges in the photodiodes 32 is performed continuously in the exposure time TExp between the time t02 to time t03. Then, this exposure time TExp is time-divided into time intervals so that blurring does not occur, and each time-shared image is repeatedly transferred and added up in response to blurring, whereby data of a single image of the exposure time TExp during which blurring correction is performed is obtained. This operation of the image-capturing device 1 during the exposure time TExp is described hereinafter in more detail with reference to FIG. 28 and FIG. 29.

When exposure is ended at the time t03, the images after blurring correction, which are accumulated in the potential ("potential" is omitted hereinafter) under the vertical transfer electrode S2ϕV2 of the Y-direction transfer portion 34B of the correction/addition portion 40, are read out from the image-capturing device 1 at normal read speed via the horizontal transfer portion 42B (See FIG. 25).

Figure 28:
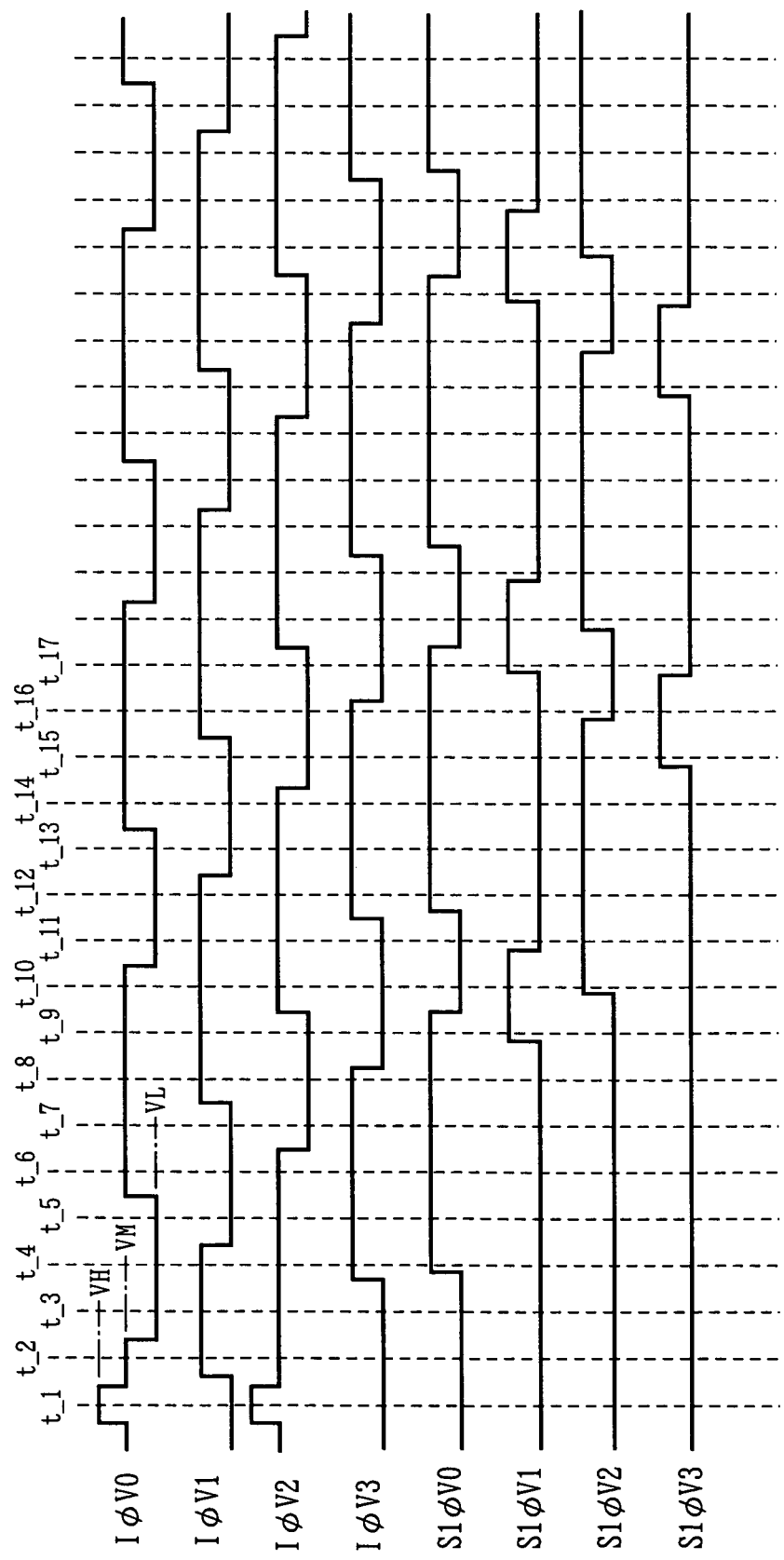
FIG. 28 is a timing chart showing an operation of transferring an image captured by the image-capturing portion of the solid-state image-capturing device to the correction/addition portion, in Embodiment 2.

Next, FIG. 28 is a timing chart showing an operation of transferring an image captured by the image-capturing portion 41B of the solid-state image-capturing device 1 to the correction/addition portion 40.

It should be noted that there are three values of voltages of drive pulses applied to the electrodes: a high voltage VH (15 [V]) which is a transfer pulse for readout; a medium voltage VM (0 [V]) for holding the charges; and a low voltage VL (−5 [V]) for forming a potential barrier which prevents mixing of the charges held under different electrodes. However, of these three values, electrodes applied with the high voltage VH are only the electrodes IϕV0, IϕV2 which are also gate electrodes.

Now, suppose that one of a plurality of time-shared exposure is ended, the high voltage VH (15 [V]) is applied to the electrode IϕV0 and the electrode IϕV2 at time t_1. At this moment, the electrodes IϕV1, IϕV3 and the electrodes S1ϕV0 through S1ϕV3 are all set to the low voltage VL (−5 [V]). Accordingly, charges accumulated in the photodiodes 32 are shifted to under the electrodes IϕV0, IϕV2 of the vertical transfer portion 35 respectively. Once this shifting is performed, the voltage applied to the electrodes IϕV0, IϕV2 becomes the medium voltage VM (0 [V]), and read charges are held (accumulated) under the electrode ϕH2.

At the same time when the voltage applied to the electrodes IϕV0, IϕV2 is changed from the high voltage VH (15 [V]) to the medium voltage VM (0 [V]), accumulation of charges for the next shooting is started in the photodiodes 32. Specifically, the next time-shared shooting is started.

At time t_2, the voltage of the electrode IϕV1 becomes the medium voltage VM, and the voltage of the electrodes IϕV0 through IϕV2 is the medium voltage VM, thus the charges shifted to under the IϕV0, IϕV2 from the photodiodes 32 at the time t_1 are dispersed and mixed under the electrodes IϕV0 through IϕV2. Therefore, charges related to two vertically continuing pixels are mixed here, in order to perform field readout as with the operation of the normal frame inter line transfer CCD. Therefore, in the next field the combination of the two vertically continuing pixels is changed and read out.

At time t_3, the voltage of the electrode IϕV0 becomes the low voltage VL, and the voltage of the electrodes IϕV1, IϕV2 is the medium voltage VM, thus the charges accumulated under the electrodes IϕV0 through IϕV2 at the time t_2 are moved to under the electrodes IϕV1, IϕV2.

At time t_4, the voltage of the electrode IϕV3 becomes the medium voltage VM, and the voltage of the electrodes IϕV1 through IϕV3 is the medium voltage VM, thus the charges accumulated under the electrodes IϕV1, IϕV2 at the time t_3 are moved to under the electrodes IϕV1 through IϕV3. At this moment, the voltage of the electrodes S1ϕV0 of the correction/addition portion 40 becomes the medium voltage VM, and the charges under the electrodes IϕV1 through IϕV3 corresponding to the pixel on the last stage of the image-capturing portion 41B are dispersed under the first electrode S1ϕV0 of the correction/addition portion 40 as well.

At time t_5, the voltage of the electrode IϕV1 becomes the low voltage VL, and the voltage of the electrodes IϕV2, IϕV3 is the medium voltage VM, thus the charges accumulated under the electrodes IϕV1 through IϕV3 at the time t_4 are moved to under the electrodes IϕV2, IϕV3. Moreover, the charges of the pixels on the last stage of the image-capturing portion 41B are moved to under the electrodes IϕV2, I+V3 and under the first electrode S1ϕV0 of the correction/addition portion 40.

At time t_6, the voltage of the electrode IϕV0 becomes the medium voltage VM, and the voltage of the electrodes IϕV0, IϕV2, IϕV3 is the medium voltage VM, thus the charges accumulated under the electrodes IϕV2, IϕV3 at the time t_5 are moved to under the electrodes IϕV0, IϕV2, IϕV3. Moreover, the charges of the pixels on the last stage of the image-capturing portion 41B are still accumulated under the electrodes IϕV2, IϕV3 and under the first electrode S1ϕV0 of the correction/addition portion 40.

At time t_7, the voltage of the electrode IϕV2 becomes the low voltage VL, and the voltage of the electrodes IϕV0, IϕV3 is the medium voltage VM, thus the charges accumulated under the electrodes IϕV0, IϕV2, IϕV3 at the time t_6 are moved to under the electrodes IϕV0, IϕV3. Moreover, the charges of the pixels on the last stage of the image-capturing portion 41B are moved to under the electrode IϕV3 and under the first electrode S1ϕV0 of the correction/addition portion 40.

At time t_8, the voltage of the electrode IϕV1 becomes the medium voltage VM, and the voltage of the electrodes IϕV0, IϕV1, IϕV3 is the medium voltage VM, thus the charges accumulated under the electrodes IϕV0, IϕV3 at the time t_7 are moved to under the electrodes IϕV0, IϕV1, IϕV3. Moreover, the charges of the pixels on the last stage of the image-capturing portion 41B are still accumulated under the electrode IϕV3 and under the first electrode S1ϕV0 of the correction/addition portion 40.

At time t_9, the voltage of the electrode IϕV3 becomes the low voltage VL, and the voltage of the electrodes IϕV0, IϕV1 is the medium voltage VM, thus the charges accumulated under the electrodes IϕV0, IϕV1, IϕV3 at the time t_8 are moved to under the electrodes IϕV0, IϕV1. At this moment, the voltage of the electrodes S1ϕV1 of the correction/addition portion 40 becomes the medium voltage VM, and the voltage of the electrodes S1ϕV0, S1ϕV1 of the correction/addition portion 40 is the medium voltage VM, thus the charges accumulated under the electrodes IϕV3, S1ϕV0 at the time t_8 are moved to under the electrodes S1ϕV0, S1ϕV1.

At time t_10, the voltage of the electrode IϕV2 becomes the medium voltage VM, and the voltage of the electrodes IϕV0 through IϕV2 is the medium voltage VM, thus the charges accumulated under the electrodes IϕV0, IϕV1 at the time t_9 are moved to under the electrodes IϕV0 through IϕV2. At this moment, the voltage of the electrodes S1ϕV0 of the correction/addition portion 40 becomes the low voltage VL, the voltage of the electrode S1ϕV2 becomes the medium voltage VM, and the voltage of the electrodes S1ϕV1, S1ϕV2 is the medium voltage VM, thus the charges accumulated under the electrodes S1ϕV0, S1ϕV1 at the time t_9 are moved to under the electrodes S1ϕV1, S1ϕV2.

By repeating the operations described above, the charges transferred in a filed accumulation mode are accumulated under the electrodes S1ϕV0 through S1ϕV3 (the divided-image transfer portion 36 shown in FIG. 26) of the correction/addition portion 40.

At the point of time when the image transfer from the image-capturing portion 41B to the correction/addition portion 40 is ended, the voltage of the electrodes S1ϕV0, S1ϕV2 is the medium voltage VM, and the voltage of the other electrodes S1ϕVL, S1ϕV3 is the low voltage VL in the correction/addition portion 40. Therefore, charges are accumulated under the electrode S1ϕV0 and electrode S1ϕV2.

Further, in FIG. 28, an example in which field readout is performed from the image-capturing device 1 is described, but the image-capturing device 1 of the present embodiment can also perform full pixel readout by changing the pulses applied to the electrodes. Here, full pixel read out is a read out process for simultaneously transferring all pixel charges from all photodiodes 32 provided in the image-capturing portion 41B to the vertical transfer portion 35, and thereafter transferring each pixel charge to the divided-image transfer portion 36 of the correction/addition portion 40 without mixing the charges of the two pixels described in the case of the time t_2 (mixing of the charges related to field readout). When full pixel read out is performed, at the point of time when image transfer from the image-capturing portion 41B to the correction/addition portion 40 is ended, the voltage of the electrodes S1ϕV0, S1ϕV2 is the medium voltage VM, and the voltage of the other electrodes S1ϕV1, S1ϕV3 is the low voltage VL in the correction/addition portion 40. Therefore, charges are accumulated under the electrode S1ϕV0 and electrode S1ϕV2.

Figure 29:
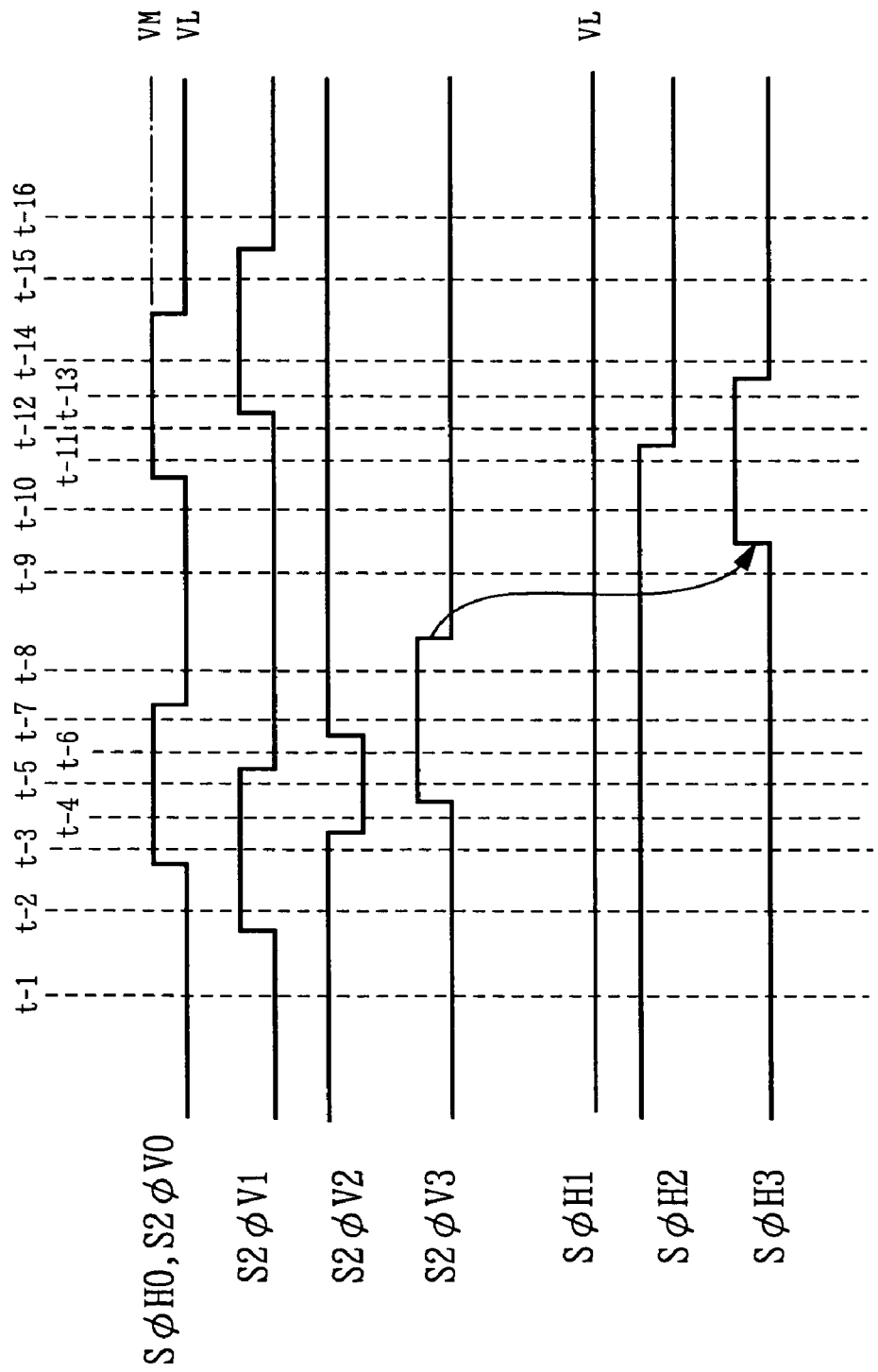
FIG. 29 is a timing chart showing a blurring correction operation and an addition operation performed in the correction/addition portion, in Embodiment 2.

Next, FIG. 29 is a timing chart showing a blurring correction operation and an addition operation performed in the correction/addition portion 40.

The outlines of the blurring correction operation and the addition operation in the correction/addition portion 40 of the image-capturing device 1 are as follows. Specifically, the correction/addition portion 40 transfers the past added images stored in the Y-direction transfer portion 34B, in the Y-direction transfer portion 34B first in the vertical direction so as to correct blurring amount in the vertical direction, thereafter transfers the latest image transferred from the image-capturing portion 41B to the correction/addition portion 40 and stored in the X-direction transfer portion 33B, in the X-direction transfer portion 33B in the horizontal direction so as to correct blurring amount in the horizontal direction obtained from the previous image capturing, and thereafter adds and stores the latest image and the added images under the electrodes S2ϕV0 through S2ϕV2 and the like of the Y-direction transfer portion 34B.

It should be noted that FIG. 29 shows an example in which the added images are shifted in an upward direction on the paper by one pixel.

At the time t_1, the voltage of the electrode SϕH2 and electrode S2ϕV2 becomes the medium voltage VM, and the latest image is stored under the electrode SϕH2 (electrode S1ϕV2 and electrode S1ϕV2) in the X-direction transfer portion 33B of the correction/addition portion 40, and the added images are stored under the electrode S2ϕV2 in the Y-direction transfer portion 34B. Of these images, the charges of the latest image are held (stored) as is under the electrode SϕH2 until the time t_9 is reached.

At the time t_2, the voltage of the electrode S2ϕV1 becomes the medium voltage VM, and the voltage of the electrodes S2ϕV1, S2ϕV2 is the medium voltage VM, thus the images stored under the electrode S2ϕV2 at the time t_1 (added images) are moved to under the electrodes S2ϕV1, S2ϕV0.

At the time t_3, the voltage of the electrode S2ϕV0 becomes the medium voltage VM, and the voltage of the electrodes S2ϕV0 through S2ϕV2 is the medium voltage VM, thus the images stored under the electrode S2ϕV1 and electrode S2ϕV2 at the time t_2 (added images) are moved to under the electrodes S2ϕV0 through S2ϕV2.

At the time t_4, the voltage of the electrode S2ϕV2 becomes the low voltage VL, and the voltage of the electrodes S2ϕV0, S2ϕV1 is the medium voltage VM, thus the images stored under the electrodes S2ϕV0 through S2ϕV2 at the time t_3 (added images) are moved to under the electrodes S2ϕV0, S2ϕV1.

At the time t_5, the voltage of the electrode S2ϕV3 becomes the medium voltage VM, and the voltage of the electrodes S2ϕV0, S2ϕV1, S2ϕV3 is the medium voltage VM, thus the images stored under the electrode S2ϕV0 and electrode S2ϕV1 at the time t_4 (added images) are moved to under the electrodes S2ϕV0, S2ϕV1, S2ϕV3.

At the time t_6, the voltage of the electrode S2ϕV1 becomes the low voltage VL, and the voltage of the electrodes S2ϕV0, S2ϕV3 is the medium voltage VM, thus the images stored under the electrodes S2ϕV0, S2ϕV1, S2ϕV3 at the time t_5 (added images) are moved to under the electrodes S2ϕV0, S2ϕV3.

At the time t_7, the voltage of the electrode S2ϕV2 becomes the medium voltage VM, and the voltage of the electrodes S2ϕV0, S2ϕV2, S2ϕV3 is the medium voltage VM, thus the images stored under the electrodes S2ϕV0, S2ϕV3 at the time t_6 (added images) are moved to under the electrodes S2+V0, S2ϕV2, S2ϕV3.

At the time t_8, the voltage of the electrode S2ϕV0 becomes the low voltage VL, and the voltage of the electrodes S2ϕV2, S2ϕV3 is the medium voltage VM, thus the images stored under the electrodes S2ϕV0, S2ϕV2, S2+V3 at the time t_7 (added images) are moved to under the electrodes S2ϕV2, S2ϕV3.

At the time t_9, the voltage of the electrode S2ϕV3 becomes the low voltage VL, and the voltage of the electrode S2ϕV2 is the medium voltage VM, thus the images stored under the electrodes S2ϕV2, S2ϕV3 at the time t_8 (added images) are moved to under the electrode S2ϕV2.

By performing such operations, the added images stored in the Y-direction transfer portion 34B are shifted by one pixel in the upward direction on the paper of FIG. 26. It should be noted that when moving the added images by the amount of a plurality of pixels, it is only necessary to repeatedly perform the similar operations for the number of pixels. Then, the charges for the added images under the electrodes S2ϕV2 are held (stored) as is until time t_12 described hereinafter is reached.

Once the added images are transferred by the predetermined number of pixels via the Y-direction transfer portion 34B, the voltage of the electrode SϕH3 of the X-direction transfer portion 33B is set to the medium voltage VM in synchronization with the voltage of the electrode S2ϕV3 becoming the low voltage VL.

Consequently, at time t_10 since the voltage of the electrodes SϕH2, SϕH3 is the medium voltage VM, the latest image transferred from the image-capturing portion 41B to the correction/addition portion 40 and stored under the electrode SϕH2 until the time t_9 is reached is moved to under the electrodes SϕH2, SϕH3.

At time t_11, the voltage of the electrode SϕH0 becomes the medium voltage VM, and the voltage of the electrodes SϕH0, SϕH2, SϕH3 is the medium voltage VM, thus the images stored under the electrodes SϕH2, SϕH3 at the time t_10 are moved to under the electrodes SϕH0, SϕH2, SϕH3.

At time t_12, the voltage of the electrode SϕH2 becomes the low voltage VL, and the voltage of the electrodes SϕH0, SϕH3 is the medium voltage VM, thus the images stored under the electrodes SϕH0, SϕH2, SϕH3 at the time t_11 are moved to under the electrodes SϕH0, SϕH3.

At time t_13, the voltage of the electrode S2ϕV1 becomes the medium voltage VM, and the voltage of the electrodes SϕH0 (S2ϕV0), SϕH3, S2ϕV1, S2ϕV2 is the medium voltage VM, thus the charges for the latest image stored under the electrodes SϕH0, SϕH3 at the time t_12, and the charges for the images stored under the electrode S2ϕV2 (added images) are dispersed under the electrodes SϕH0 (S2ϕV0), SϕH3, S2ϕV1, S2ϕV2. Therefore, at this point of time, the charges for the latest image and the charges for the added images are mixed with one another.

At time t_14, the voltage of the electrode SϕH3 becomes the low voltage VL, and the voltage of the electrodes SϕH0 (S2ϕV0), S2ϕV1, S2ϕV2 is the medium voltage VM, thus the images stored under the electrodes SϕH0 (S2ϕV0), SϕH3, S2ϕV1, S2ϕV2 at the time t_13 are moved to under the electrodes SϕH0 (S2ϕV0), S2ϕV1, S2ϕV2.

At time t_15, the voltage of the electrode SϕH0 (S2ϕV0) becomes the low voltage VL, and the voltage of the electrodes S2ϕV1, S2ϕV2 is the medium voltage VM, thus the images stored under the electrodes SϕH0 (S2ϕV0), S2ϕV1, S2ϕV2 at the time t_14 are moved to under the electrodes S2ϕV1, S2ϕV2.

At time t_16, the voltage of the electrode S2φV1 becomes the low voltage VL, and the voltage of the electrode S2φV2 is the medium voltage VM, thus the images stored under the electrodes S2φV1, S2φV2 at the time t_15 are moved to under the electrode S2φV2.

By performing such operations, the latest image and the time-shared images (added images) which are added up after the past blurring is corrected, are added up and stored under the electrode S2φV2 of the Y-direction transfer portion 34B.

It should be noted that the newly added images are stored under the electrode S2φV2 at the time t_16 in order to prevent the already added up images and the latest image from interacting with one another when transferring the next time-shared images in the X-direction transfer portion 33B (FIG. 26), as described above.

Moreover, the above has described only an operation of transferring the latest image from the electrode SφH2 of the X-direction transfer portion 33B to the electrode SφH0 inside the same register 37, but, by repeatedly performing a similar operation, the latest image can be shifted by one pixel in the left direction on the paper.

Also, the above has described an example in which the blurring amount in the Y direction is one pixel, but for more general blurring amount, transfer may be performed in the X direction and the Y direction by the amount corresponding to this blurring amount. At this moment, even when blurring in the X direction is in either the positive direction or negative direction in the X direction, blurring correction can be freely performed by controlling the phase of the pulse to be applied to the electrodes. The same is entirely true for blurring in the Y direction.

By performing such operations, the added images stored in the Y-direction transfer portion 34B are shifted by one pixel in the upward direction on the paper of FIG. 26. It should be noted that when moving the added images by the amount of a plurality of pixels, it is only necessary to repeatedly perform the similar operations for the number of pixels. Then, the charges for the added images under the electrodes S2φV2 are held (stored) as is until time t_12 described hereinafter is reached.

In this manner, four of the X-direction transfer portion 33B and the Y-direction transfer portion 34B of the correction/addition portion 40 of the image-capturing device 1 are provided per one pixel (however, the electrodes on the intersection (SφH0, S2φV0) are the same), whereby when transferring arbitrary amount of blurring corresponding to the blurring amount is performed in order to correct the blurring, charges for a new image inside the X-direction transfer portion 33B and the charges for the added images of the Y-direction transfer portion 34B are prevented from interacting with one another.

It should be note that when performing field readout as described with reference to the timing chart of FIG. 28, that is, when performing readout for mixing signal charges on the odd-numbered columns and with signal charges on the even-numbered column in the vertical transfer portion 35, the image data stored under one electrode S2φV2 of the Y-direction transfer portion 34B shown in FIG. 26 corresponds to 1 (horizontal direction)×2 (vertical direction) pixels (i.e. two pixels continuing in the vertical direction) of the pixels of the image-capturing portion 41B.

On the other hand, when performing full pixel readout as described above, the image data stored under one electrode S2φV2 of the Y-direction transfer portion 34B shown in FIG. 26 corresponds to 1 (horizontal direction)×1 (vertical direction) pixel (i.e. one pixel) of the pixels of the image-capturing portion 41B.

Therefore, when obtaining the transfer amount Py of the pixels in the Y direction from the blurring amount ΔY in the Y direction, Py="ΔY/(2·Ly)" in field readout, and Py="ΔY/Ly" in full pixel readout.

Figure 30:
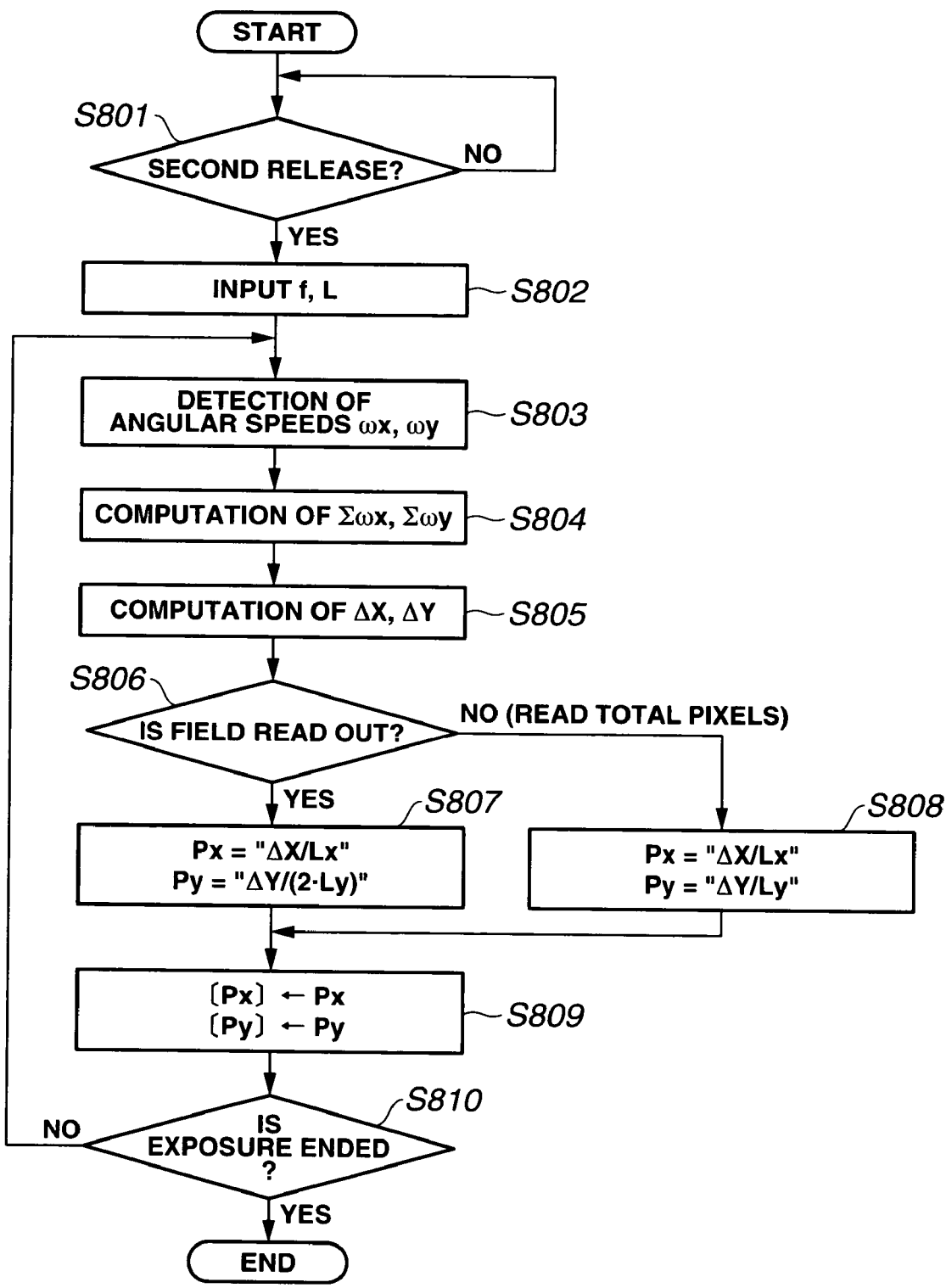
FIG. 30 is a flowchart showing a flow of a process for computing movement amounts ΔX, ΔY by means of a CPU, in Embodiment 2.

FIG. 30 is a flowchart showing a flow of a process for computing movement amounts ΔX, ΔY by means of the CPU 7, and shows a case in which the transfer amount Py of the pixels in the Y direction is obtained according to such a readout system described above. In FIG. 30, explanations of the parts same as those in FIG. 21 are omitted accordingly.

First of all, the processes between steps S801 through S805 in FIG. 30 are same as the processes between the steps S401 through S405 in FIG. 21.

After the process of the step S805 is performed, it is determined whether readout from the image-capturing device 1 is set as field readout (step S806).

Here, when field readout is set, Px="ΔX/Lx" and Py="ΔY/(2·Ly)" are computed (step S807).

On the other hand, if it is determined in the step S806 that field readout is not set, that is, when it is determined that full pixel readout is set, Px="ΔX/Lx" and Py="ΔY/Ly" are computed (step S808).

The subsequent processes of steps S809, S810 are same as the processes of the steps S407, S408 of FIG. 21.

Figure 31:
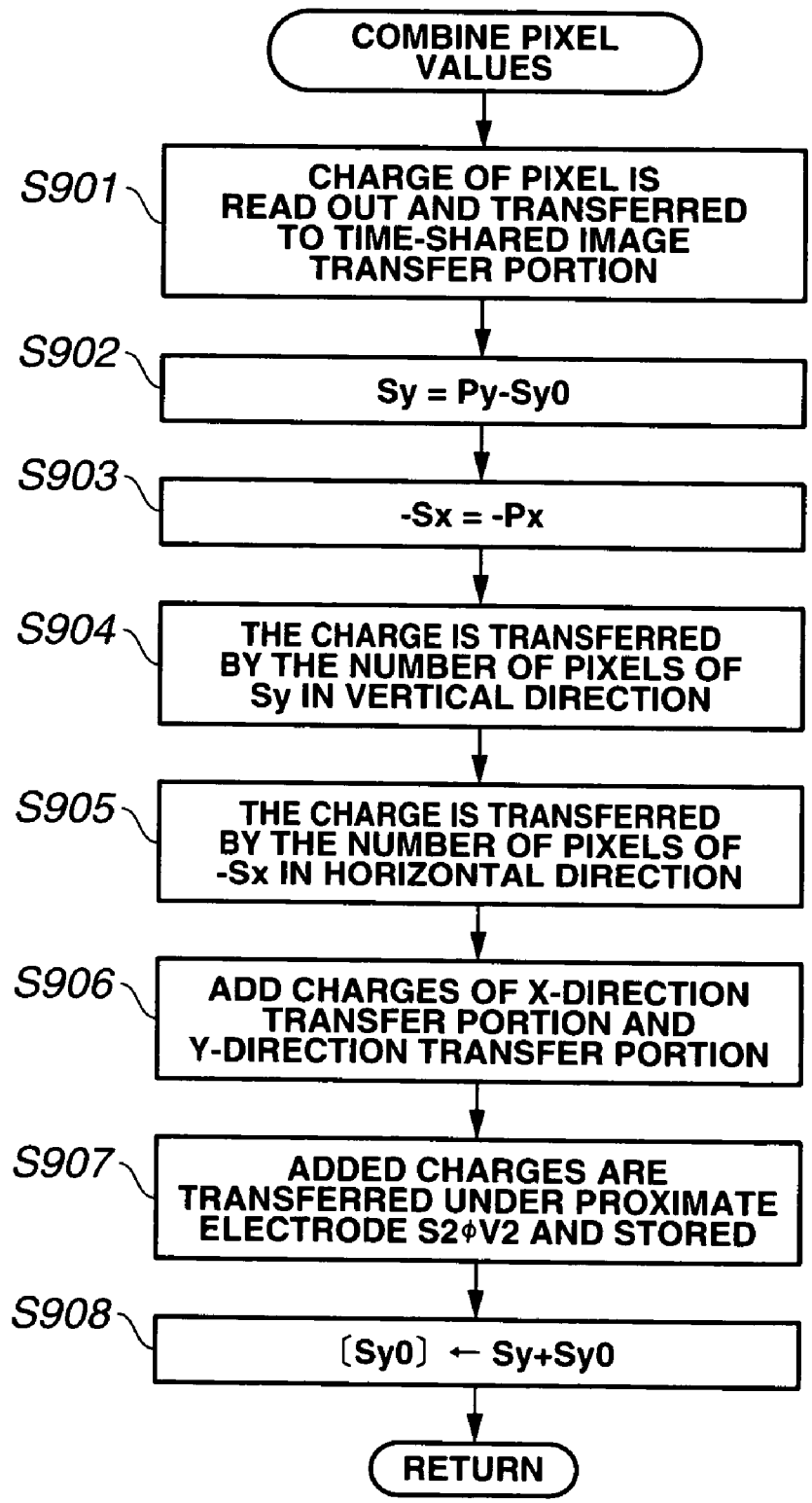
FIG. 31 is a flowchart showing a subroutine for pixel value composition in Embodiment 2.

Subsequently, FIG. 31 is a flowchart showing a subroutine for pixel value composition. The subroutine for pixel value composition shown in FIG. 31 is executed in the step S109 in the processes shown in FIG. 13, as with Embodiment 1 described above.

Specifically, when the process is started in the step S109 of FIG. 13, first, the charges of the photodiodes 32 in the image-capturing portion 41B are shifted to the vertical transfer portion 35, and further transferred to the divided-image transfer portion 36 of the correction/addition portion 40 (step S901). It should be noted that the photodiodes 32 start the next time-shared exposure immediately after shifting the pixel charges to the vertical transfer portion 35.

Next, transfer amount Sy (=(Py−Sy0 )) by which the previously shot images are transferred in the vertical direction (Y direction) (the transfer amount converted into the number of pixels in the correction/addition portion 40 as described above) is computed (step S902). Here, Py is blurring amount in the Y direction from immediately after the start of the first exposure, and Sy0 is blurring correction amount (cumulative blurring correction amount) in the Y direction which is obtained by performing correction from immediately after the start of the first time-shared exposure until the last time-shared exposure. Therefore, in the step S902, the difference between the amount of blurring in the Y direction from immediately after the start of the first time-shared exposure to the time-shared exposure of the present time, and the amount of blurring which is actually corrected by the last time-shared exposure, is the corrected amount related to the time-shared exposure of the present time. By employing such computation method, accumulation of computation errors can be prevented, compared to the case in which, of two continuous exposure operations, the blurring amount of the second image is obtained based on the blurring amount of the first image to perform blurring correction. As described above, in the computation of the step S807 or the step S808, since the value is rounded off to obtain a value in pixel unit, it is effective to employ the process shown in the step S902.

Subsequently, transfer amount −Sx(=−Px) by which the latest image which is shot at the present time is transferred in the horizontal direction (X direction) (the transfer amount converted into the number of pixels in the correction/addition portion 40 as described above) is computed in the similar manner (step S903). Here, Px is, as described above, blurring amount in the X direction from immediately after the start of the first time-shared exposure until the time-shared exposure of the present time. A minus sign is provided in the equation showing the number of transfer pixels, because, by moving pixel charges in a direction opposite to the direction of blurring, new pixel charges to be read out are brought close to the pixel charges which have been added so far.

It should be noted that in the process described here, after being stored in the Y-direction transfer portion 34B, the added images are not essentially moved from the same Y-direction transfer portion 34B (these images are not moved on the X-direction transfer portion 33B, or to other Y-direction transfer portion 34B), thus, in the step S903, it is not necessary to compute the cumulative blurring correction amount (for example, Sx0) up to the last exposure, which corresponds to Sy0 described in the step S902.

Next, the images which have been shot and added previously (images which are added up after relative blurring is corrected) are transferred in the vertical direction (Y direction) by the number of pixels of Sy via the Y-direction transfer portion 34B (step S904).

Subsequently, the latest image which is shot at the present time is transferred in the horizontal direction (X direction) by the number of pixels of −Sx via the X direction transfer portion 33B (step S905).

Then, the image stored in the X-direction transfer portion 33B and the images stored in the Y-direction transfer portion 34B are added up as described above with reference to FIG. 29 (step S906).

Thereafter, these added images are transferred to under the electrode S2ϕV2 in the lower part of the paper (i.e. in the same register 37) which is most proximate to the electrode S2ϕV0 (SϕH0) at the intersection of the X-direction transfer portion 33B and the Y-direction transfer portion 34B (step S907). This transfer is performed because, since the X-direction transfer electrode SϕH0 and the Y-direction transfer electrode S2ϕV0 are used in common, the image shot in the next time-shared shooting needs to be prevented from interacting with the added images when being transferred to the X-direction transfer portion 33B.

Then, the transfer amount Sy and the past transfer amount Sy0 are added up and stored in the memory [Sy0], whereby the value obtained in this addition is taken as a new Sy0 (step S908). Accordingly, the cumulative added values of the transfer amount in the Y direction up until the final (previous) time-shared exposure are stored in the memory [Sy0].

Once the process of this step S908 is performed, the process returns to the process shown in FIG. 13 from the subroutine for pixel value composition shown in FIG. 31.

Incidentally, when a static image is multi-pixelated so that the image-capturing device 1 can capture a fine static image, a process of adding and reading a plurality of image data items is performed in shooting a dynamic image which requires less number of pixels than the static image, so that high-speed image capturing and improvement of image quality can be achieved. When such pixel addition is performed in, for example, the image-capturing portion 41B (to cite a specific example, in field readout, when adding the charges on an odd-numbered line and the charges on an even-numbered line and performing readout), correction of the blurring amount varies compared to the case in which addition is not performed. When adding at least three image data items, correction of the blurring amount varies according to the added numbers. Moreover, if pixel addition is performed, the number of registers required for storing the image data also varies in the correction/addition portion 40. If the control of time-shared shooting and the control of pixel value addition in the correction/addition portion 40 are differentiated in response to each case described above, the control becomes complicated.

Therefore, in order to simplify the control, it is conceivable that the time-shared shooting and the pixel value addition in the correction/addition portion 40 are carried out only when, for example, performing full pixel readout which is frequently utilized in shooting of static images. In this case, time-shared shooting is not performed in other readout processes (for example, field readout and the like) (however, no limitation is made to the above). When time-shared shooting is performed a plurality of times, the images in the X-direction transfer portion 33B and the images in the Y-direction transfer portion 34B are added up and accumulated in the Y-direction transfer portion 34B, and the added images accumulated in the Y-direction transfer portion 34B are eventually transferred to the horizontal transfer portion 42B. On the other hand, when time-shared shooting is not performed even in full pixel readout, or when other readout process is performed, the images transferred from the vertical transfer portion 35 to the divided-image transfer portion 36 are transferred directly to the horizontal transfer portion 42B as is. Accordingly, such operations can respond to blurring correction on the static image, and the image-capturing device, which has the functions of pixel addition and like as with the conventional image-capturing device and which can be controlled relatively easily, is obtained. Moreover, at this moment, it is sufficient for the X-direction transfer portion 33B to have a function of transferring time-shared images at least twice (specifically, a function of accumulating added pixels is not required in the X-direction transfer portion 33B), and so the area for the electrodes in the X-direction transfer portion 33B can be narrowed down significantly. Here, focusing on narrowing down the area of the entire image-capturing device 1, the shape or size of each of the electrodes constituting the X-direction transfer portion 33B may be determined so that the longitudinal width of the X-direction transfer portion 33B becomes short. Accordingly, the entire area of the correction/addition portion 40 can be reduced.

According to Embodiment 2, substantively the same effects as with Embodiment 1 can be achieved, and, since the image-capturing device of the frame interline transfer system is employed, and the image-capturing portion and the correction/addition portion for accumulating images to correct blurring are provided individually on the image-capturing device, the configuration of the conventional image-capturing device can be directly applied as the image-capturing portion. Therefore, the advantages of the frame interline transfer system CCD image sensor and the many years of accumulated technical know-how to produce the solid-state image-capturing device can be continuously used "as is". Moreover, the versatility of the solid-state image-capturing device can be improved.

It should be noted in the above technology that the total exposure time for a single image is time-divided so that basically regular time intervals are obtained per blurring limit exposure time TLimit to perform each time-shared exposure. However, no limitation is made to this point, thus, for the partial exposure time in which blurring can be allowed, the total exposure time may be time-divided to obtain uneven time intervals. For example, when larger angular speed is detected by the angular speed sensor, the partial exposure time may be reduced. In this manner, if the partial exposure time is adoptively changed, the occurrence of blurring in a time-shared image can be suppressed more accurately.

Further, the technology of the digital camera described above is particularly suitable in blurring correction when shooting static images, and can be applied in blurring correction when shooting one frame of a dynamic image. Therefore, the technology of this digital camera can be applied not only to a digital still camera or analog still camera, but also to a digital video camera or analog video camera. Application of the technology is not limited to the above, thus the technology can be applied widely to devices for shooting images using a solid-state image-capturing device.

Moreover, the above has described the technology of blurring correction, with examples of the two-dimensional image-capturing device. A technology similar to the above technology can be applied to, for example, a scanner (particularly, a handy scanner or the like) using one-dimensional image-capturing device (a line sensor or the like), a copy machine, a facsimile, and the like to perform blurring correction. In this case, however, one transfer CCD following the array direction of a sensor is sufficient.

In addition, since the above-described technology is for adding up a plurality of images which are captured at approximately the same time, application of this technology to a purpose other than the blurring correction purpose is conceivable. For example, if the amount of charges which can be accumulated in the vertical transfer CCD or horizontal transfer CCD is larger than the amount of charges which can be accumulated in the photodiodes, this technology can be used as a technology of producing an image with a wider dynamic range.

[Appendages]

(Appendage 1)

An electronic blurring correction apparatus for correcting blurring of an image formed on an image-capturing area of a solid-state image-capturing device having a plurality of pixels arranged in a matrix form, to generate an image in which blurring is corrected, the electronic blurring correction apparatus comprising:

an image-capturing optical system for forming an image on the image-capturing area of the solid-state image-capturing device;

a blurring detection portion which detects blurring of the image;

an exposure amount control portion which controls the exposure amount of the solid-state image-capturing device;

an image-capturing portion which captures a plurality of images with a predetermined exposure amount by means of the solid-state image-capturing device on the basis of control performed by the exposure amount control portion;

an addition portion which adds up in an analog form the plurality of images captured by the image-capturing portion after relatively shifting the images in the image-capturing device based on the blurring detected by the blurring detection portion to generate an image in which blurring is corrected; and a readout portion which reads out charges of pixels added up by the addition portion, from the solid-state image-capturing device.

<Effect>

A highly accurate electronic blurring correction apparatus which can respond to a broad range of shutter speeds is obtained in which blurring of images captured by time-shared shooting, and the images are added up in an analog form inside the image-capturing device, thus a complex mechanical mechanism for correcting blurring is not longer required. Moreover, since blurring correction can be performed in a short amount of time, an electronic blurring correction apparatus which is suitable for blurring correction particularly in shooting static images is obtained.

(Appendage 2)

The electronic blurring correction apparatus according to Appendage 1, wherein the addition portion performs control so as to repeatedly execute an operation of correcting the relative blurring between the two images which are photographed in succession, thereafter adding up the two images in an analog form, further correcting relative blurring between the image after addition and an image obtained in the next shooting, and thereafter adding up the two images in an analog form.

<Effect>

Blurring correction and the process of adding the time-shared images can be performed at high speeds.

(Appendage 3)

The electronic blurring correction apparatus according to Appendage 2, wherein, on the basis the difference between the blurring amount of images of the photographed plurality of images, which are obtained between the start of exposure in the first image shooting and the end of exposure in the latest image shooting, and cumulative added value, of the plurality of images, of blurring correction amount from the first image to an image immediately before the latest image, the addition portion performs control so as to correct the blurring between the latest image and the already added image, and add up in an analog form the two images in which the blurring is corrected.

<Effect>

Highly accurate computation of the blurring amount can be performed.

(Appendage 4)

The electronic blurring correction apparatus according to Appendage 1, wherein the exposure amount control portion performs control so as to cause the solid-state image-capturing device to perform exposure a predetermined number of times for a preset exposure time which is equal to or shorter than blurring limit exposure time in which blurring is allowable.

<Effect>

Shooting of time-shared images in which blurring can be substantively ignored can be performed.

(Appendage 5)

The electronic blurring correction apparatus according to Appendage 4, wherein the exposure amount control portion generates the blurring limit exposure time on the basis of information on the focal distance of the image-capturing optical system.

<Effect>

Setting of the blurring limit exposure time can be performed by means of the empirical rules on the basis of the information on the focal distance of the image-capturing optical system, thus the blurring limit exposure time can be set easily without requiring different measurement or the like to be performed.

(Appendage 6)

The electronic blurring correction apparatus according to Appendage 4, wherein the blurring detection portion is for computing the blurring amount even before exposure is started, and the exposure amount control portion computes an exposure time which is the time for the blurring amount, which is computed by the blurring detection portion before exposure is started, to reach an upper limit of an allowable blurring amount, and generates the blurring limit exposure time on the basis of the computed exposure time.

<Effect>
Blurring correction in response to the characteristics of blurring made by photographers can be performed.

(Appendage 7)
The electronic blurring correction apparatus according to Appendage 4, wherein the exposure amount control portion computes an exposure time which is the time for the blurring amount, which is computed by the blurring detection portion at the time of exposure, to reach the upper limit of the allowable blurring amount, and generates the blurring limit exposure time on the basis of the computed exposure time.

<Effect>
Blurring correction in response to the characteristics of blurring made by photographers can be performed (Appendage 8)
The electronic blurring correction apparatus according to Appendage 1, wherein the exposure amount control portion comprises:
a photometry portion which acquires the brightness of a photographic subject;
a first exposure time generation portion which generates a first exposure time for obtaining optimum exposure on the basis of the brightness of the photographic subject acquired by the photometry portion;
a second exposure time generation portion which generates a second exposure time; and
an exposure time control portion which performs control so that the first exposure time becomes equal to the total exposure time when shooting is performed a predetermined number of times in succession in the second exposure time.

<Effect>
Control can be performed so that optimum exposure amount is obtained.

(Appendage 9)
The electronic blurring correction apparatus according to Appendage 8, further comprising:
a memory for storing the predetermined number of shootings for performing shooting in succession,
wherein the exposure time control portion controls the second exposure time generation portion so as to generate, as the second exposure time, a time obtained by dividing the first exposure time by the number of shootings.

<Effect>
An exposure time at which blurring certainly does not occur can be set as the second exposure time, and the exposure amount of an image obtained by combining a plurality of images can be made optimum. Moreover, since the number of shootings is determined beforehand, saturated charges of image signals of the solid-state image-capturing device can be controlled easily.

(Appendage 10)
The electronic blurring correction apparatus according to Appendage 9, further comprising a display portion for performing warning display for warning about the possibility of the occurrence of blurring, if the second exposure time, which is generated by the second exposure time generation portion, is longer than an exposure time in which blurring can be suppressed to an allowable level.

<Effect>
The photographer can perceive the possibility of the occurrence of blurring.

(Appendage 11)
The electronic blurring correction apparatus according to Appendage 8, further comprising a memory for storing a plurality of shooting numbers which can be selected as the predetermined number of shootings for shooting in succession, wherein the exposure time control portion controls the second exposure time generation portion so as to select, from the shooting numbers stored in the memory, an integer, which is larger and most proximate to a value obtained by dividing the first exposure time by the second exposure time, as a shooting number, and to generate, instead of the second exposure time and as a new second exposure time, a time obtained by dividing the first exposure time by the shooting number.

<Effect>
An exposure time at which blurring certainly does not occur can be set as the second exposure time, and the exposure amount of an image obtained by combining a plurality of images can be made optimum.

(Appendage 12)
The electronic blurring correction apparatus according to Appendage 8, wherein
the image-capturing optical system comprises an aperture, and
the electronic blurring correction apparatus further comprises:
an aperture value setting portion for setting an aperture value of the image-capturing optical system; and
a memory for storing the number of shootings for shooting in succession,
the aperture value setting portion changing the aperture value of the image-capturing optical system if the first exposure time is longer than a third exposure time which is the product of the second exposure time and the maximum value of the number of shootings stored in the memory, so that the first exposure time becomes equal to or less than the third exposure time.

<Effect>
If the first exposure time for obtaining optimum exposure cannot be sufficiently divided to the second exposure time in which blurring can be suppressed to the allowable level, the aperture value is controlled automatically, thus, for example, even in a range in which the digital camera does not operate continuously throughout the shutter priority shooting mode, aperture priority shooting mode, or program shooting mode, optimum exposure control can be performed while preventing blurring from occurring.

(Appendage 13)
The electronic blurring correction apparatus according to Appendage 12, further comprising a display portion for displaying change of the aperture value when the aperture value of the image-capturing optical system is changed by the aperture value setting portion.

<Effect>
Change of the aperture value is displayed, thus confusion is not caused to the photographer.

(Appendage 14)
The electronic blurring correction apparatus according to Appendage 12, further comprising an ISO sensitivity change portion for substantively changing an ISO sensitivity by changing an amplification factor of an image obtained from the image-capturing device, wherein, when the aperture value to be changed by the aperture value change portion is beyond a range which can be set as the aperture value of the image-capturing optical system, the ISO sensitivity change portion changes the ISO sensitivity so that the ISO sensitivity falls in the settable range.

<Effect>

Even in the case of a limit value to which the exposure time and the aperture value can be set, the ISO sensitivity can be further changed, thus optimum exposure control can be performed while preventing blurring in a wider range.

(Appendage 15)

The electronic blurring correction apparatus according to Appendage 14, further comprising a display portion for performing warning display for warning about the possibility of the occurrence of blurring when the ISO sensitivity to be changed by the ISO sensitivity change portion is beyond a settable range.

<Effect>

The photographer can perceive the possibility of the occurrence of blurring.

(Appendage 16)

The electronic blurring correction apparatus according to Appendage 1, further comprising an accumulated charge amount control portion which performs control so that, as the number of pixels to be added up by the addition portion increases, a maximum accumulated charge amount of charges which can be accumulated in the pixels of the solid-state image-capturing device decreases.

<Effect>

Since the charges accumulated in the pixels are controlled in accordance with the number of shootings, the charges of a composite image can be prevented from overflowing in the register portion.

(Appendage 17)

The electronic blurring correction apparatus according to Appendage 16, wherein the solid-state image-capturing device is a CCD solid-state image-capturing device with a longitudinal overflow structure configured on a semiconductor substrate, and the accumulated charge amount control portion controls the level of reverse bias voltage applied to the semiconductor substrate, and thereby controls the maximum accumulated charge amount at which the charges accumulated in the pixels start to be ejected to the semiconductor substrate side.

<Effect>

The level of the amount of charges accumulated in the pixels can be controlled accurately, thus overflow of the charges in the register for accumulating composite images can be prevented reliably.

(Appendage 18)

The electronic blurring correction apparatus according to Appendage 1, further comprising an effective region extraction portion which extracts an image of an effective region which is considered to be shared by all images shot by the image-capturing portion, from composite images added up by the addition portion.

<Effect>

An image of an effective region which is considered to be shared by all images shot by the image-capturing portion is extracted from composite images added up by the addition portion, thus a high-quality image in which blurring is corrected can be obtained easily.

(Appendage 19)

The electronic blurring correction apparatus according to Appendage 18, wherein the size of the image of the effective region and the position of same within the composite image are determined beforehand.

<Effect>

The size of the image of the effective region and the position of same within the composite image are determined beforehand, thus image data of the effective region can be extracted using a simple process.

(Appendage 20)

The electronic blurring correction apparatus according to Appendage 18, wherein the exposure amount control portion, when judged that an image shot by the image-capturing portion lacks a part of the image of the effective region, performs control so as to end the shooting performed by the image-capturing portion.

<Effect>

A region in which blurring cannot be corrected appropriately can be prevented from being included in the effective region, thus a high-quality image in which blurring is corrected can be obtained easily.

(Appendage 21)

The electronic blurring correction apparatus according to Appendage 20, wherein, when shooting is ended before the number of shootings performed by the image-capturing portion reaches a predetermined number, the effective region extraction portion amplifies the composite image of the effective region.

<Effect>

When shooting is ended without sufficient exposure, amplification is performed to compensate the insufficiency, thus an image with optimum exposure can be obtained.

(Appendage 22)

The electronic blurring correction apparatus according to Appendage 1, wherein the addition portion comprises:

a first transfer register which stores a first image captured by the image-capturing portion and transfers the first image in a first direction;

a second transfer register which stores a second image captured at different time than the first image and transfers the second image in a second direction intersecting with the first direction, and adds up the first image and the second image after relatively shifting the first image and the second image in the first transfer register and the second transfer register respectively, and stores the added images in the first transfer register or the second transfer register.

<Effect>

The blurring between the image stored in the first transfer register and the image stored in the second transfer register can be corrected at high speeds.

(Appendage 23)

The electronic blurring correction apparatus according to Appendage 22, wherein the image-capturing portion comprises a photoelectric conversion portion which has a plurality of pixels arranged in a matrix form in a line direction and a column direction, the first transfer register is disposed adjacent to each line of pixels of the photoelectric conversion portion, and the second transfer register is disposed adjacent to each column of pixels of the photoelectric conversion portion.

<Effect>
The vertical transfer register of a conventional interline transfer system solid-state image-capturing device can also be used as a transfer register for correcting blurring, thus there is an advantage that a comparatively simple configuration can be obtained.

(Appendage 24)
The electronic blurring correction apparatus according to Appendage 22, wherein the first transfer register and the second transfer register are provided inside the solid-state image-capturing device, independently of the image-capturing portion.

<Effect>
It is not necessary to newly provide a transfer register for blurring correction between the lines of pixels of the conventional interline transfer system image-capturing portion, thus the aperture ratio of the pixels (photodiodes) is not reduced.

(Appendage 25)
The electronic blurring correction apparatus according to Appendage 22, further comprising a charge ejection portion for ejecting charges which are transferred to end faces of the first transfer register and second transfer register, from the first transfer register and the second transfer register.

<Effect>
By performing charge transfer inside the transfer registers, which is associated with blurring correction, the charges are prevented from being accumulated in the end faces of the transfer registers and overflowing.

(Appendage 26)
The electronic blurring correction apparatus according to Appendage 1, wherein the solid-state image-capturing device is a single panel color solid-state image-capturing device having mosaic color filters arranged on the front side of the image-capturing area, and the addition portion stakes the minimum repetition cycle in the horizontal direction and the minimum repetition cycle in the vertical direction of the color filters as the minimum unit to relatively shift the plurality of images inside the solid-state image-capturing device on the basis of blurring detected by the blurring detection portion, adds up the plurality of images in an analog form, and generates an image in which blurring is corrected.

(Appendage 27)
A solid-state image-capturing device, comprising:
a photoelectric conversion portion having a plurality of pixels arranged in a matrix form;
a first transfer register which stores a first image, which is obtained by reading out charges of the photoelectric conversion portion, and transfers the first image in a first direction;
a second transfer register which stores a second image, which is obtained by reading out the charges of the photoelectric conversion portion at time different from the time at which the first image is captured, and transfers the second image in a second direction intersecting with the first direction; and
an addition portion which adds up, in an analog form, the first image transferred by the first transfer register by a predetermined amount and the second image transferred by the second transfer register by a predetermined amount.

<Effect>
One of two images can be stored in the first transfer register and the other one can be stored in the second transfer register to adjust a relative position, and the images can be added up, thus a solid-state image-capturing device, which can perform blurring correction between images at high speeds, can be obtained.

(Appendage 28)
The solid-state image-capturing device according to Appendage 27, wherein the first transfer register is disposed adjacent to each line of pixels of the photoelectric conversion portion, and the second transfer register is disposed adjacent to each column of pixels of the photoelectric conversion portion.

<Effect>
One of the transfer registers for performing blurring correction and the vertical transfer register of a conventional interline transfer system CCD can be used in common, thus the size of the entire image-capturing device can be reduced.

(Appendage 29)
The solid-state image-capturing device according to Appendage 27, further comprising a charge transfer portion for transferring charges generated by the photoelectric conversion portion to a register portion comprising the first transfer register and the second transfer register.

<Effect>
Since the register portion for performing blurring correction is provided in a region different from the image-capturing portion, the design of the image-capturing portion can be made simple, and the technology of the conventional image-capturing portion can be inherited as is. Moreover, there is an advantage that smear can be reduced by obtaining a configuration having the characteristics of the frame interline transfer type CCD.

(Appendage 30)
The solid-state image-capturing device according to Appendage 29, further comprising a transfer portion for reading out the images stored in the register portion to the outside, wherein control is performed such that, when adding up a plurality of images and reading the plurality of images to the outside, the image stored in the second transfer register is read to the outside via the transfer portion, and when reading the images to the outside without adding up, images transferred from the photoelectric conversion portion via the charge transfer portion are read to the outside via the transfer portion.

<Effect>
The first transfer register only needs to transfer time-shared images, thus the area of the registers can be reduced.

(Appendage 31)
The solid-state image-capturing device according to Appendage 27, wherein the first transfer register and the second transfer register respectively comprise four transfer electrodes which are applied with four-phase drive pulses for one pixel which is the minimum unit to constitute an image.

<Effect>
Even when the first transfer register and the second transfer register are disposed such that they intersect with each other in vertical/horizontal direction, the two images stored in the transfer registers can be transferred independently.

(Appendage 32)
The solid-state image-capturing device according to Appendage 31, wherein one of the four transfer electrodes that the first transfer register has and one of the four transfer electrodes that the second transfer register has are the common electrode which can be shared, and the first transfer register and the second transfer register intersect with each other at the position of the shared electrode.

<Effect>

By sharing some of the electrodes of the first transfer register and the second transfer register, the area of the solid-state image-capturing device can be reduced and pixel addition can be performed easily.

(Appendage 33)

The solid-state image-capturing device according to Appendage 31, wherein the transfer electrodes are disposed such that electrodes with a relatively large area and electrodes with a relatively narrow area are disposed alternately.

<Effect>

The area of each transfer register can be reduced while satisfying required functions.

(Appendage 34)

The solid-state image-capturing device according to Appendage 32, wherein the first transfer register shifts the first image a predetermined amount with respect to the second image, the second transfer register shifts the second image a predetermined amount with respect to the first image, and the addition portion adds up the first image and second image after the predetermined shift, in the first transfer register or the second transfer register.

<Effect>

Pixel addition can be performed at high speed without requiring complex control to be performed.

(Appendage 35)

The solid-state image-capturing device according to Appendage 27, wherein the solid-state image-capturing device is a photoconductive film-stacked type solid-state image-capturing device.

<Effect>

The aperture ratio of, for example, the photodiodes performing photoelectric conversion can be increased.

(Appendage 36)

The solid-state image-capturing device according to Appendage 27, further comprising a charge ejection portion for ejecting charges which are transferred to end faces of the first transfer register and second transfer register, from the first transfer register and the second transfer register.

<Effect>

By performing charge transfer inside the transfer registers, which is associated with blurring correction, the charges are prevented from being accumulated in the end faces of the transfer registers and overflowing.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An electronic blurring correction apparatus to correct blurring of an image formed on an image-capturing area of a solid-state image-capturing device having a plurality of pixels arranged in a matrix form, to generate an image in which blurring is corrected, the electronic blurring correction apparatus comprising:

an image-capturing optical system to form an image on the image-capturing area of the solid-state image-capturing device;

a blurring detection portion which detects blurring of the image;

an exposure amount control portion which controls the exposure amount of the solid-state image-capturing device;

an image-capturing portion which captures a plurality of images with a predetermined exposure amount by means of the solid-state image-capturing device on the basis of control performed by the exposure amount control portion;

a first transfer register which stores a first image captured at a first time by the image-capturing portion and transfers the first image in a first direction;

a second transfer register which stores a second image captured at a second time, which is different from the first time at which the first image was captured, and transfers the second image in a second direction perpendicular to the first direction;

an addition portion which adds up the first image and the second image after relatively shifting the first image and the second image in the first transfer register and the second transfer register respectively, and stores the added images in the first transfer register or the second transfer register; and a readout portion which reads out charges of pixels added up by the addition portion, from the solid-state image-capturing device.

2. The electronic blurring correction apparatus according to claim 1, wherein the addition portion performs control so as to repeatedly execute an operation of correcting the relative blurring between the two images which are photographed in succession, thereafter adding up the two images in an analog form, further correcting relative blurring between the image after addition and an image obtained in the next shooting, and thereafter adding up the two images in an analog form.

3. The electronic blurring correction apparatus according to claim 2, wherein, on the basis the difference between the blurring amount of images of the photographed plurality of images, which are obtained between the start of exposure in the first image shooting and the end of exposure in the latest image shooting, and cumulative added value, of the plurality of images, of blurring correction amount between the first image and an image immediately before the latest image, the addition portion performs control so as to correct the blurring between the latest image and the already added image, and add up in an analog form the two images in which the blurring is corrected.

4. The electronic blurring correction apparatus according to claim 1, wherein the exposure amount control portion performs control so as to cause the solid-state image-capturing device to perform exposure a predetermined number of times for a preset exposure time which is equal to or shorter than blurring limit exposure time in which blurring is allowable.

5. The electronic blurring correction apparatus according to claim 4, wherein the exposure amount control portion generates the blurring limit exposure time on the basis of information on the focal distance for the image-capturing optical system.

6. The electronic blurring correction apparatus according to claim 4, wherein
the blurring detection portion is for computing the blurring amount even before exposure is started, and the exposure amount control portion computes an exposure time which is the time for the blurring amount, which is computed by the blurring detection portion before exposure is started, to reach an upper limit of an allowable blurring amount, and generates the blurring limit exposure time on the basis of the computed exposure time.

7. The electronic blurring correction apparatus according to claim 4, wherein the exposure amount control portion computes an exposure time which is the time for the blurring amount, which is computed by the blurring detection portion at the time of exposure, to reach the upper limit of the allowable blurring amount, and generates the blurring limit exposure time on the basis of the computed exposure time.

8. The electronic blurring correction apparatus according to claim 1, wherein the exposure amount control portion comprises:
a photometry portion which acquires the brightness of a photographic subject;
a first exposure time generation portion which generates a first exposure time for obtaining optimum exposure on the basis of the brightness of the photographic subject acquired by the photometry portion;
a second exposure time generation portion which generates a second exposure time; and
an exposure time control portion which performs control so that the first exposure time becomes equal to the total exposure time when shooting is performed a predetermined number of times in succession in the second exposure time.

9. The electronic blurring correction apparatus according to claim 8, further comprising a memory to store the predetermined number of shootings for performing shooting in succession,
wherein the exposure time control portion controls the second exposure time generation portion so as to generate, as the second exposure time, a time obtained by dividing the first exposure time by the number of shootings.

10. The electronic blurring correction apparatus according to claim 9, further comprising a display portion to perform warning display to warn about the possibility of the occurrence of blurring, if the second exposure time, which is generated by the second exposure time generation portion, is longer than an exposure time in which blurring can be suppressed to an allowable level.

11. The electronic blurring correction apparatus according to claim 8, further comprising a memory to store a plurality of shooting numbers which can be selected as the predetermined number of shootings for shooting in succession,
wherein the exposure time control portion controls the second exposure time generation portion so as to select, from the shooting numbers stored in the memory, an integer, which is not less than and most proximate to a value obtained by dividing the first exposure time by the second exposure time, as a shooting number, and to generate, in place of the second exposure time and as a new second exposure time, a time obtained by dividing the first exposure time by the shooting number.

12. The electronic blurring correction apparatus according to claim 8, wherein
the image-capturing optical system comprises an aperture, and
the electronic blurring correction apparatus further comprises:
an aperture value setting portion to set an aperture value of the image-capturing optical system; and
a memory to store the number of shootings for shooting in succession, and wherein
the aperture value setting portion changes the aperture value of the image-capturing optical system if the first exposure time is longer than a third exposure time which is the product of the second exposure time and the maximum value of the number of shootings stored in the memory, so that the first exposure time becomes equal to or less than the third exposure time.

13. The electronic blurring correction apparatus according to claim 12, further comprising a display portion to display change of the aperture value when the aperture value of the image-capturing optical system is changed by the aperture value setting portion.

14. The electronic blurring correction apparatus according to claim 12, further comprising an ISO sensitivity change portion to substantively change an ISO sensitivity by changing an amplification factor of an image obtained from the image-capturing device,
wherein when the aperture value to be changed by the aperture value change portion is beyond a range which can be set as the aperture value of the image-capturing optical system, the ISO sensitivity change portion changes the ISO sensitivity so that the ISO sensitivity falls in the settable range.

15. The electronic blurring correction apparatus according to claim 14, further comprising a display portion to perform warning display to warn about the possibility of the occurrence of blurring when the ISO sensitivity to be changed by the ISO sensitivity change portion is beyond a settable range.

16. The electronic blurring correction apparatus according to claim 1, further comprising an accumulated charge amount control portion which performs control so that, as the number of pixels to be added up by the addition portion increases, a maximum accumulated charge amount of charges which can be accumulated in the pixels of the solid-state image-capturing device decreases.

17. The electronic blurring correction apparatus according to claim 16, wherein the solid-state image-capturing device is a CCD solid-state image-capturing device with a longitudinal overflow structure configured on a semiconductor substrate, and the accumulated charge amount control portion controls the level of reverse bias voltage applied to the semiconductor substrate, and thereby controls the maximum accumulated charge amount at which the charges accumulated in the pixels start to be ejected to the semiconductor substrate side.

18. The electronic blurring correction apparatus according to claim 1, further comprising an effective region extraction portion which extracts an image of an effective region which is considered to be shared by all images shot by the image-capturing portion, from composite images added up by the addition portion.

19. The electronic blurring correction apparatus according to claim 18, wherein the size of the image of the effective region and the position of same within the composite image are determined beforehand.

20. The electronic blurring correction apparatus according to claim 18, wherein the exposure amount control portion, when judged that an image shot by the image-capturing portion lacks a part of the image of the effective region, performs control so as to end the shooting performed by the image-capturing portion.

21. The electronic blurring correction apparatus according to claim 20, wherein, when shooting is ended before the number of shootings performed by the image-capturing portion reaches a predetermined number, the effective region extraction portion amplifies the composite image of the effective region.

22. The electronic blurring correction apparatus according to claim 1, wherein the image-capturing portion comprises a photoelectric conversion portion which has a plurality of pixels arranged in a matrix form in a line direction and a column direction, the first transfer register is disposed adjacent to each line of pixels of the photoelectric conversion portion, and the second transfer register is disposed adjacent to each column of pixels of the photoelectric conversion portion.

23. The electronic blurring correction apparatus according to claim 1, wherein the first transfer register and the second transfer register are provided inside the solid-state image-capturing device, independently of the image-capturing portion.

24. The electronic blurring correction apparatus according to claim 1, further comprising a charge ejection portion to eject charges which are transferred to end faces of the first transfer register and second transfer register, from the first transfer register and the second transfer register.

25. The electronic blurring correction apparatus according to claim 1, wherein the solid-state image-capturing device is a single panel color solid-state image-capturing device having mosaic color filters arranged on the front side of the image-capturing area, and the addition portions takes the minimum repetition cycle in the horizontal direction and the minimum repetition cycle in the vertical direction of the color filters as the minimum unit to relatively shift the plurality of images inside the solid-state image-capturing device on the basis of blurring detected by the blurring detection portion, adds up the plurality of images in an analog form, and generates an image in which blurring is corrected.

* * * * *